A1

(12) United States Patent
Terpstra et al.

(10) Patent No.: US 12,406,054 B2
(45) Date of Patent: Sep. 2, 2025

(54) AUTOMATED PERSISTENT CONTEXT-AWARE DEVICE PROVISIONING

(71) Applicant: Dell Products L.P., Round Rock, TX (US)

(72) Inventors: John Henry Terpstra, Austin, TX (US); Jeroen Mackenbach, Roosendaal (NL); Anantha K Boyapalle, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 529 days.

(21) Appl. No.: 17/840,142

(22) Filed: Jun. 14, 2022

(65) Prior Publication Data

US 2023/0229758 A1    Jul. 20, 2023

Related U.S. Application Data

(63) Continuation-in-part of application No. 17/577,854, filed on Jan. 18, 2022, now Pat. No. 11,983,275.

(51) Int. Cl.
G06F 21/53       (2013.01)
G06F 21/51       (2013.01)
G06F 21/54       (2013.01)

(52) U.S. Cl.
CPC .............. *G06F 21/53* (2013.01); *G06F 21/51* (2013.01); *G06F 21/54* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 9,792,168 B2 | 10/2017 | Boyapalle et al. | |
| 11,201,785 B1 | 12/2021 | Kanevsky et al. | |
| 2005/0193385 A1* | 9/2005 | de Heer | H04L 12/4641 717/176 |
| 2013/0124843 A1* | 5/2013 | Bobzin | G06F 21/575 713/2 |
| 2015/0193620 A1* | 7/2015 | Khatri | G06F 21/575 713/2 |
| 2021/0235367 A1 | 7/2021 | Quinn et al. | |
| 2021/0368428 A1 | 11/2021 | Quinn et al. | |

* cited by examiner

Primary Examiner — Syed A Roni
(74) Attorney, Agent, or Firm — Larson Newman, LLP

(57) ABSTRACT

An information handling system may determine a personality flag value during a boot process, and execute a system update handler configured for connecting to a control plane. The system may also provision a software application in a current operating system environment or erase the existing operating system and provisional new environment including receiving the software application responsive to a secure profile and validating the software application prior to loading.

17 Claims, 44 Drawing Sheets

| FUNCTION | FIRMWARE-BASED AGENT | RUNTIME AGENT |
|---|---|---|
| ONBOARD VIA FDO | YES | YES |
| ATTESTING | YES | YES |
| MANAGE SBF | YES | ABLE TO SET BOOTOK FLAG TO "FAIL" FROM CONTROL PLANE |
| DECIDE ON BOOT PATH | YES | NO (SECURITY RISK) |
| PARTITION DISKS | YES, CONTROLLED FROM CONTROL PLANE ONLY | YES, ONLY FOR DISKS AND PARTITIONS THAT DO NOT CONTAIN THE OS IMAGES |
| DEPLOY RUNTIME OS | YES, FROM CONTROL PLANE ONLY – BOTH A/B | YES, B ONLY. SWITCH AT BOOT. |
| DIGITALLY SIGN RUNTIME OS | YES | NO |
| DOWNLOADING BLOBS FROM THE CONTROL PLANE PROVISIONING SERVER | YES | YES |
| UNPACK BLOBS | YES | CAN FULLY PROCESS HOSTED APPLICATIONS. CAN FULLY PROCESS DEPLOYMENT OF PROVIDER EDGE DEVICE SERVICES INTO ISOLATED SERVICES FILESYSTEM THAT DOES NOT IMPACT IMMUTABLE OS IMAGE-CONTAINING PARTITIONS |
| EXECUTE TEMPLATE/S OR INSTRUCTION SCRIPTS FROM BLOB | YES | YES – EXCLUDES OS SIGNING AND INSTALLATION PROCESS |
| INSTALL BLOB PAYLOAD CONTENTS (IF PROVIDED) | YES | YES, EXCLUDES INSTALLATION OF OS IMAGES |
| FILE AND/OR FILESYSTEM COPY AND/OR IMAGE REPLICATION | YES | YES |
| REBOOT SYSTEM | YES | YES |
| FACTORY RESET | YES, ONLY ON BOOTFAIL | NO, ONLY VIA MICRO AGENT ON BOOTFAIL |
| ABILITY TO SHIP BLANK SYSTEM | YES | NO |

*FIG. 3*

| FIELD | BYTE LENGTH | BYTE OFFSET | DESCRIPTION |
|---|---|---|---|
| HEADER | | | |
| SIGNATURE | 4 | 0 | 'BOOT'. SIGNATURE FOR THE BOOT OPTIMIZATION OPTIONS TABLE. |
| LENGTH | 4 | 4 | LENGTH, IN BYTES, OF THE ENTIRE BOOT TABLE |
| REVISION | 1 | 8 | 1 |
| CHECKSUM | 1 | 9 | ENTIRE TABLE MUST SUM TO ZERO. |
| OEMID | 6 | 10 | OEM ID. |
| OEM TABLE ID | 8 | 16 | FOR THE BOOT TABLE, THE TABLE ID IS THE MANUFACTURE MODEL ID. |
| OEM REVISION | 4 | 24 | OEM REVISION OF BOOT TABLE FOR SUPPLIED OEM TABLE ID. |
| CREATOR ID | 4 | 28 | VENDOR ID OF UTILITY THAT CREATED THE TABLE. |
| CREATOR REVISION | 4 | 32 | REVISION OF UTILITY THAT CREATED THE TABLE. |
| CMOS_INDEX | 1 | 36 | THIS VALUE INDICATES AT WHICH OFFSET IN CMOS MEMORY THE BOOT REGISTER IS LOCATED |
| RESERVED | 3 | 37 | THIS VALUE IS ZERO |

*FIG. 9*

| BIT | NAME | DESCRIPTION |
|---|---|---|
| 0 | PNPOS | INDICATES THAT A PLUG-AND-PLAY CAPABLE OS IS INSTALLED ON THE SYSTEM. THE SYSTEM FIRMWARE MUST CHECK THE STATE OF THIS BIT DURING ITS INITIALIZATION. IF THIS BIT IS NOT SET, THE SYSTEM FIRMWARE MUST ASSUME A LEGACY OPERATING SYSTEM AND CONFIGURE THE RESOURCES OF ALL DEVICES IT CONTROLS. IF THE BIT IS SET, THE SYSTEM FIRMWARE MUST ASSUME A PLUG AND PLAY OPERATING SYSTEM AND ONLY CONFIGURE DEVICES REQUIRED FOR BOOT AS PER THE PC98 SPECIFICATION. |
| 1 | BOOTING | INDICATES WHETHER OR NOT THE PREVIOUS BOOT WAS NOT COMPLETED. THE SYSTEM FIRMWARE MUST CHECK THE STATE OF THIS FLAG AT THE BEGINNING OF POST. IF THIS BIT IS SET, THE SYSTEM FIRMWARE WILL SET DIAG TO 1 TO INFORM IT AND OTHER COMPONENTS TO RUN A FULL DIAGNOSTIC SUITE. IF THIS BIT IS NOT SET, DIAG WILL BE CLEARED TO INFORM COMPONENTS TO SKIP ALL TESTS AND TO BEGIN LOADING THE BOOT SECTOR AS SOON AS POSSIBLE.<br><br>THIS BIT IS SET BY THE SYSTEM FIRMWARE AT THE EARLIEST POSSIBLE MOMENT OF POST.<br><br>THIS BIT IS CLEARED BY THE OS AFTER IT HAS COMPLETED ITS BOOT PROCEDURE. |
| 2 | DIAG | INDICATES WHETHER OR NOT TO RUN DIAGNOSTICS. THIS BIT IS SET BASED ON THE STATE OF BOOTING AT THE BEGINNING OF POST, OR BY THE OPERATING SYSTEM DURING THE PREVIOUS BOOT. IF SET AT THE BEGINNING OF POST, THIS BIT MUST REMAIN SET TO ALLOW THE OPERATING SYSTEM TO REQUEST DIAGNOSTIC BOOTS. IF SET DURING POST, THE SYSTEM FIRMWARE, OPTION ROMS, AND OPERATING SYSTEMS SHOULD RUN DIAGNOSTIC TESTS. IF NOT SET, THESE COMPONENTS MUST NOT RUN DIAGNOSTIC TESTS AND SHOULD BOOT THE MACHINE AS QUICKLY AS POSSIBLE. |

| BIT | NAME | DESCRIPTION |
|-----|------|-------------|
| 3 | SUPPRESSBOOTDISPLAY | INDICATES WHETHER OR NOT THE OS LOADER SHOULD UPDATE THE DISPLAY AFTER POST. THIS BIT MAY BE SET BY THE SYSTEM BIOS AT THE BEGINNING OF POST. OPTIONALLY, THIS BIT MAY BE SET BY THE BIOS IN THE S4 SHUTDOWN HANDLER, AND IN THIS CASE SHOULD REMAIN SET DURING SYSTEM POST.<br><br>IF SET DURING POST, THE OS LOADER MAY CHOOSE NOT TO ALTER THE DISPLAY OUTPUT PROVIDED BY THE BIOS UNTIL PROGRAM CONTROL HAS BEEN TRANSFERRED TO THE OPERATING SYSTEM. IF THIS BIT IS SET, THE SYSTEM BIOS IS RESPONSIBLE FOR SETTING THE DESIRED DISPLAY IMAGE AFTER POST, UNTIL THE OS BOOT OR HIBERNATE RESUME PROCESS IS COMPLETED BY THE OS LOADER, AND HANDOFF TO THE OS RESUME VECTOR OCCURS.<br><br>UNDER SOME CIRCUMSTANCES (E.G., ERROR CONDITIONS), THE OS MAY STILL NEED TO PROVIDE STATUS OR ERROR MESSAGES TO THE USER, AND SO MAY OPT TO REGAIN CONTROL OF THE DISPLAY.<br><br>IF THIS BIT IS CLEAR DURING POST, THE OS LOADER IS RESPONSIBLE FOR UPDATING THE DISPLAY DURING READ OF THE HIBERNATE IMAGE OFF OF THE DISK. THIS BIT IS OWNED BY THE BIOS, AND NOT RESET BY THE OS. |
| 4-6 | RESERVED | RESERVED. MUST BE 0. |
| 7 | PARITY | A PARITY BIT USED TO CHECK USED TO VERIFY THE INTEGRITY OF THIS REGISTER OR VARIABLE. THIS BIT SHOULD BE SET WITH ODD PARITY BASED ON THE CONTENTS OF THE REST OF THE REGISTER. IF THE SYSTEM FIRMWARE DETECTS THAT THE PARITY BIT IS NOT SET CORRECTLY, IT MUST ASSUME THE REGISTER OR VARIABLE IS CORRUPTED. |

*FIG. 10B*

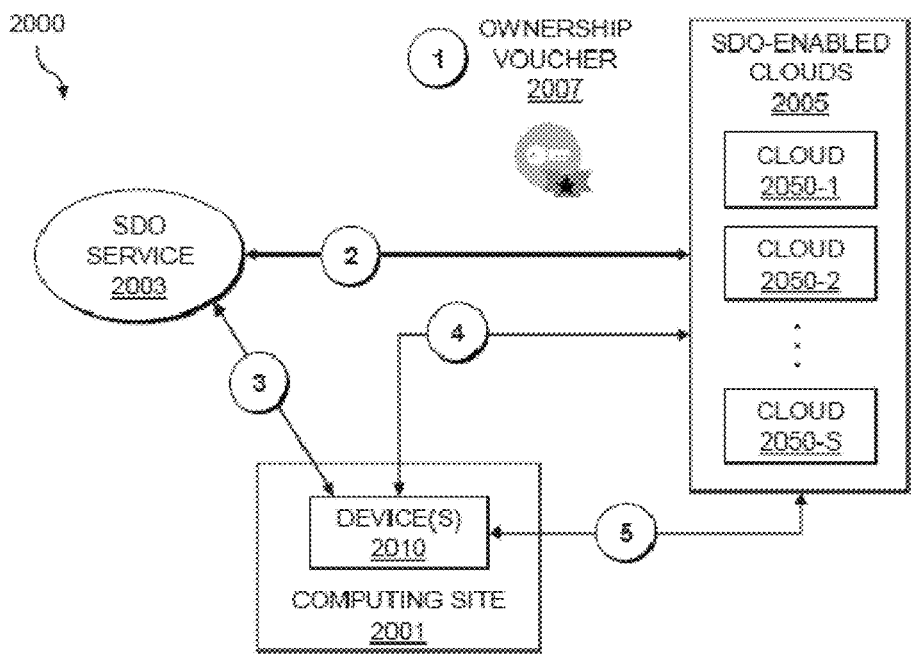
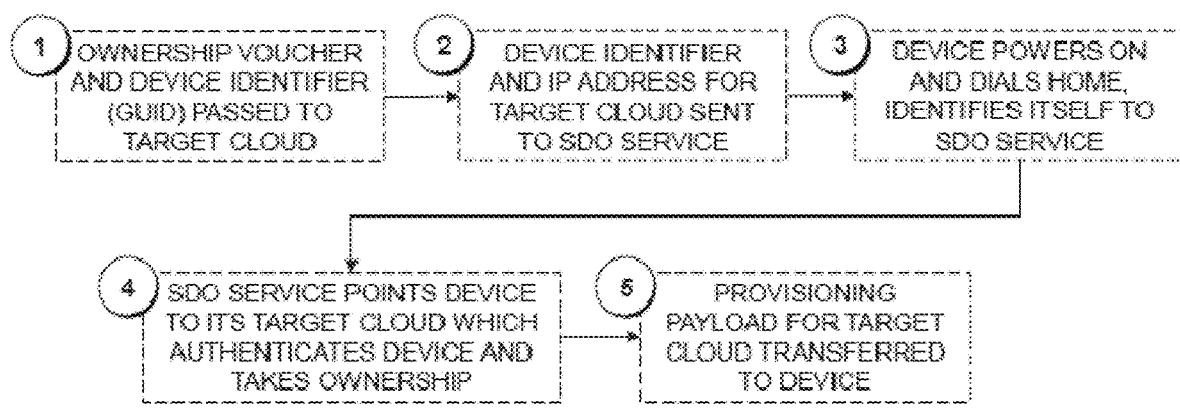
FIG. 20

AUTOMATED PERSISTENT CONTEXT-AWARE DEVICE PROVISIONING

CROSS-REFERENCE TO RELATED APPLICATION

This application is a Continuation-in-Part of U.S. patent application Ser. No. 17/577,854 entitled "MULTI-PHASE SECURE ZERO TOUCH PROVISIONING OF COMPUTING DEVICES" filed Jan. 18, 2022, now U.S. Pat. No. 11,983,275, Issued May 14, 2024, the disclosure of which is hereby expressly incorporated by reference in its entirety.

FIELD OF THE DISCLOSURE

The field relates generally to information processing, and more particularly to management of information processing systems.

BACKGROUND

Computing devices may be deployed to various customer or other end-user sites, such as "edge" computing sites which are remote from a management computing site operated by a manufacturer, vendor or other provider of such computing devices. In these and other cases, computing device onboarding is a complex task, particularly for computing devices that are to be provisioned remotely. Device onboarding and provisioning may include enabling computing devices to support various protocols and encryption for secure communication with the management computing site. Device onboarding and provisioning may be further utilized for enabling various functionality on the computing devices, including but not limited to functionality for access control, backup and storage, continuity and recovery, protection against hacking and viruses/malware, etc.

SUMMARY

An information handling system may determine a personality flag value during a boot process, and execute a system update handler configured for connecting to a control plane. The system may also provision a software application in a current operating system environment, including receiving the software application responsive to a secure profile and validating the software application prior to loading.

These and other illustrative embodiments include, without limitation, methods, apparatus, networks, systems and processor-readable storage media.

BRIEF DESCRIPTION OF THE DRAWINGS

FIG. 3 shows a table detailing functionality of firmware-based and runtime agents used for multi-phase secure zero touch provisioning of computing devices in an in illustrative embodiment.

FIG. 9 shows a table detailing the structure of a simple boot flag descriptor table that may be used on a computing device configured for multi-phase secure zero touch provisioning in an illustrative embodiment.

FIGS. 10A and 10B show tables detailing a format for a boot register or boot flag variable for communicating to firmware of a computing device about actions to be taken on subsequent boot of the computing device in an illustrative embodiment.

FIG. 20 shows another system architecture and process flow for secure device onboarding provisioning of computing devices in an illustrative embodiment.

DETAILED DESCRIPTION OF THE DRAWINGS

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
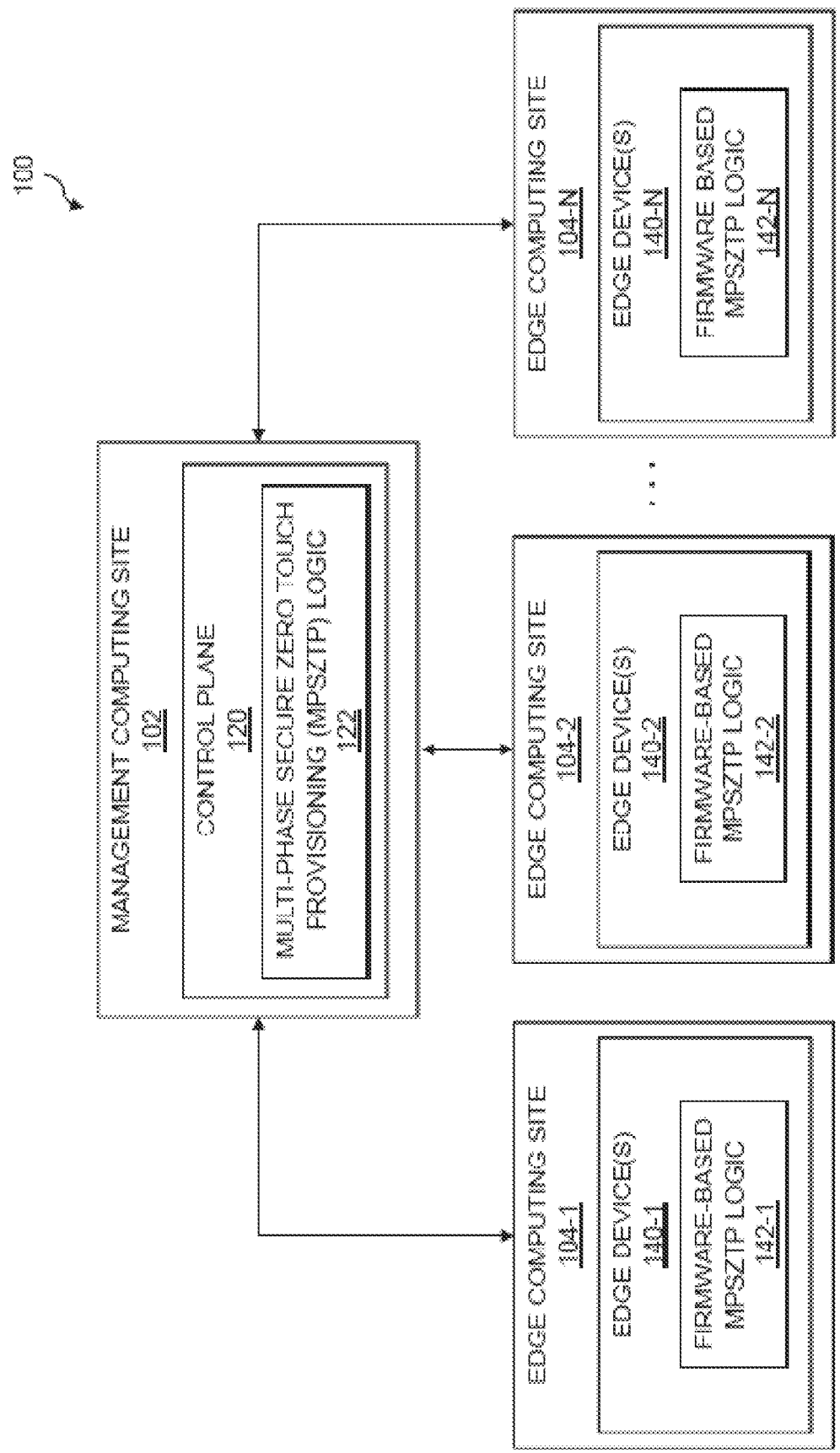
FIG. 1 is a block diagram of an information processing system configured for multi-phase secure zero touch provisioning of computing devices in an illustrative embodiment.

FIG. 1 shows an information processing system 100 configured in accordance with an illustrative embodiment. The information processing system 100 is assumed to be built on at least one processing platform and provides functionality for multi-phase secure zero touch provisioning (MPSZTP) between a management computing site 102 and a set of edge computing sites 104-1, 104-2, ... 104-N (collectively, edge computing sites 104). As used herein, "zero touch" provisioning refers to configuration or other provisioning of a computing device that does not require manual intervention. Thus, zero touch provisioning enables the computing device to be configured or otherwise provisioned without needing a human operator to physically type or otherwise provide input into a system console of the computing device being provisioned. As described in further detail below, zero touch provisioning in some cases only requires that a computing device be placed in some desired location and connected to power and a network (e.g., either via a physical network cable or via a wireless network interface). Zero touch provisioning advantageously enables provisioning of a computing device remotely (e.g., from a control plane 120 of the management computing site 102) and automatically. The edge computing sites 104 may represent different customer sites or other data centers or computing sites that are remote from the management computing site 102. In some embodiments, however, one or more of the edge computing sites 104 may be co-located with the management computing site 102 (e.g., at a same data center, a same cloud infrastructure, etc.). The management computing site 102, also referred to as a core computing site or core data center 102, is assumed to comprise a plurality of devices or nodes (e.g., physical and virtual computing resources or other information technology (IT) assets not shown in FIG. 1) that implement the control plane 120 providing MPSZTP logic 122 enabling provisioning and configuration of sets of edge devices 140-1, 140-2, ... 140-N (collectively, edge devices 140) deployed at the edge computing sites 104-1, 104-2, ... 104-N.

The edge devices 140-1, 140-2, ... 140-N are assumed to implement firmware-based MPSZTP logic 142-1, 142-2, ... 142-N (collectively, MPSZTP logic 142) that facilitates such provisioning through secure communication with the control plane 120 as the management computing site 102.

The edge devices 140 may comprise, for example, physical computing devices such as Internet of Things (IoT) devices, mobile telephones, laptop computers, tablet computers, desktop computers or other types of devices. Such devices are examples of what are more generally referred to herein as "processing devices." Some of these processing devices are also generally referred to herein as "computers." The edge devices 140 may also or alternately comprise virtualized computing resources, such as virtual machines (VMs), containers, etc.

The edge devices 140 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

Networks coupling the edge computing sites 104 and the management computing site 102 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

In some embodiments, the management computing site 102 and edge computing sites 104 collectively provide at least a portion of an information technology (IT) infrastructure operated by an enterprise. The IT infrastructure comprising the management computing site 102 and the edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the management computing site 102 and/or the edge computing sites 104. A given enterprise system may host assets that are associated with multiple enterprises (e.g., two or more different businesses, organizations or other entities). For example, in some cases different ones of the edge computing sites 104 are associated with different enterprises (e.g., different customers or end-users) which purchase devices from another enterprise that is an operator of the management computing site 102 (e.g., a manufacturer or vendor of the edge devices 140 deployed at the edge computing sites 104).

Although not explicitly shown in FIG. 1, one or more input-output devices such as keyboards, displays or other types of input-output devices may be used to support one or more user interfaces to the management computing site 102 and the edge computing sites 104, as well as to support communication between the management computing site 102, the edge computing sites 104, and other related systems and devices not explicitly shown.

The MPSZTP logic 122 and firmware-based MPSZTP logic 142 are configured to perform MPSZTP of the edge devices 140 as directed by the control plane 120. This may include, on one of the edge devices 140 utilizing a firmware-based agent running in firmware of that edge device to determine a boot flag status of that edge device. The edge device will execute, responsive to the boot flag status being a first value, a system update handler of the firmware-based agent. The system update handler is configured for provisioning of the edge device as directed by the control plane 120. This may include, but is not limited to, onboarding the edge device to the control plane 120 and, responsive to successful onboarding, receiving from the control plane 120 one or more payloads directing operations to be performed on the edge device. Such payload may include at least a portion of a secured runtime operating system image for a secured runtime operating system that is to be installed or otherwise provisioned on the edge device. Such provisioning includes digitally signing the image of the secured runtime operating system utilizing a hardware-based root of trust key of the edge device.

The edge device will execute, responsive to the boot flag status being a second value, a secured operating system boot handler of the firmware-based agent. The secured operating system boot handler is configured for validating the image of the secured runtime operating system and loading the secured runtime operating system on the edge device responsive to successful validation of the image of the secured runtime operating system. Validating the secured runtime operating system image comprises performing attestation of a signature of the image of the secured runtime operating system utilizing the hardware-based root of trust key of the edge device.

In some embodiments, operating system (OS) images, applications and other types of payloads that are to be downloaded to the edge devices 140 may be stored in a database or other data store. Such payloads may be stored as bundles of binary large objects (BLOBs) or in another suitable format. The database or other data store may be implemented using one or more of storage systems that are part of or otherwise associated with one or more of the management computing site 102 and the edge computing sites 104. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the management computing site 102 in the FIG. 1 embodiments, the control plane 120 or at least a portion thereof may in other embodiments be implemented at least in part externally to the management computing site 102, for example, as a stand-alone server, set of servers or other type of system coupled via one or more networks to the management computing site 102 and/or the edge computing sites 104.

The management computing site 102 and the edge computing sites 104 in the FIG. 1 embodiment are assumed to be implemented using at least one processing device. Each such processing device generally comprises at least one processor and an associated memory, and implements at least a portion of the functionality of the MPSZTP logic 122 and/or firmware-based MPSZTP logic 142.

It is to be appreciated that the particular arrangement of the management computing site 102 and the edge computing sites 104 illustrated in the FIG. 1 embodiment is presented by way of example only, and alternative arrangements can be used in other embodiments. As discussed above, for example, the control plane 120 may be implemented at least in part external to the management computing site 102 and the edge computing sites 104. At least portions of the MPSZTP logic 122 and firmware-based MPSZTP logic 142 may be implemented at least in part in the form of software that is stored in memory and executed by a processor.

It is to be understood that the particular set of elements shown in FIG. 1 for MPSZTP is presented by way of illustrative example only, and in other embodiments additional or alternative elements may be used. Thus, another embodiment may include additional or alternative systems, devices and other network entities, as well as different arrangements of modules and other components.

The management computing site 102, the edge computing sites 104 and other portions of the system 100, as will be described above and in further detail below, may be part of cloud infrastructure.

The management computing site 102, the edge computing sites 104 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The management computing site 102 and the edge computing sites 104, or components thereof, may be implemented on respective distinct processing platforms, although numerous other arrangements are possible. For example, in some embodiments at least portions of one or more of the edge computing sites 104 and the management computing site 102 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the management computing site 102 and the edge computing sites 104, or portions or components thereof, to reside in different data centers. Numerous other distributed implementations are possible.

Additional examples of processing platforms utilized to implement the management computing site 102, the edge computing sites 104 and other components of the system 100 in illustrative embodiments will be described in more detail below in conjunction with FIGS. 23 and 24.

It is to be appreciated that these and other features of illustrative embodiments are presented by way of example only, and should not be construed as limiting in any way.

Figure 2:
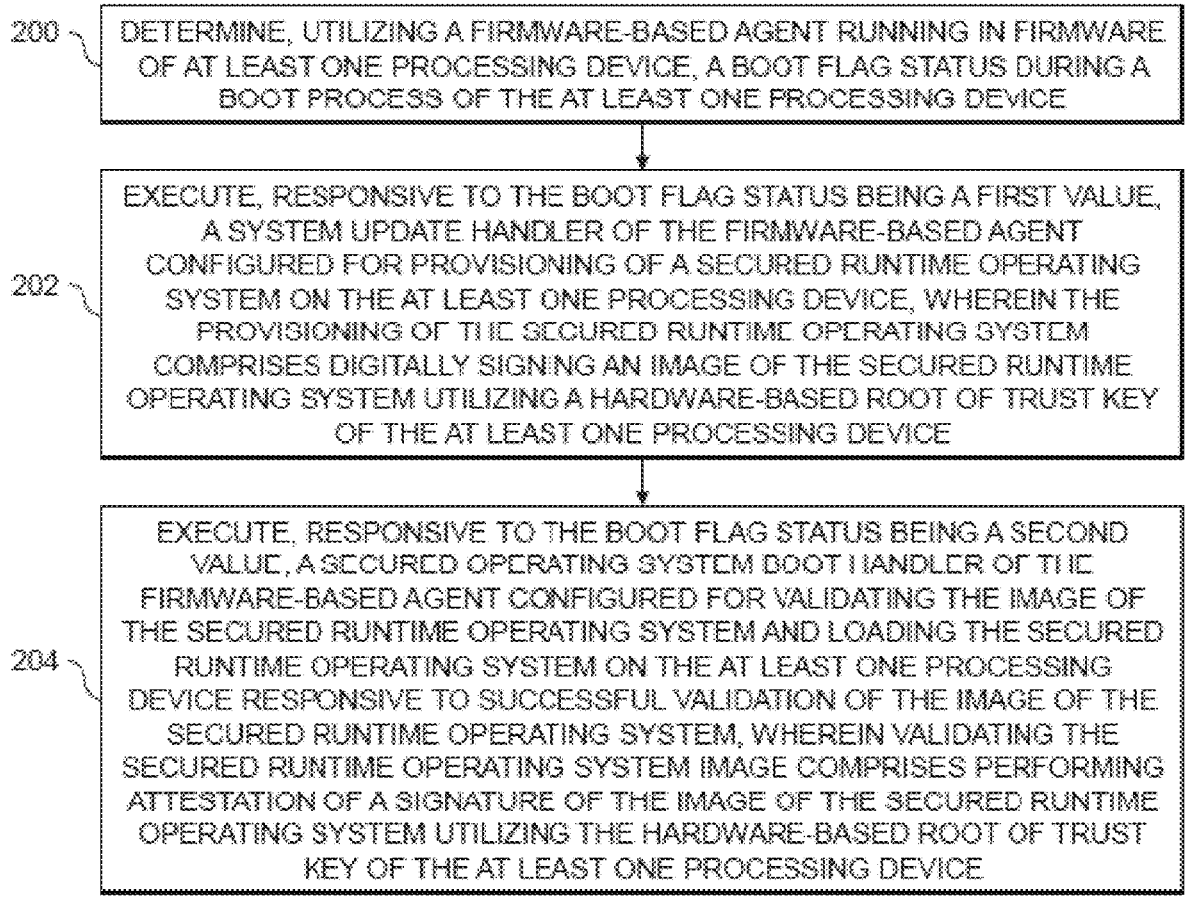
FIG. 2 is a flow diagram of an exemplary process for multi-phase secure zero touch provisioning of computing devices in an illustrative embodiment.

An exemplary process for multi-phase secure zero touch provisioning of computing devices will now be described in more detail with reference to the flow diagram of FIG. 2. It is to be understood that this particular process is only an example, and that additional or alternative processes for multi-phase secure zero touch provisioning of computing devices may be used in other embodiments.

In this embodiment, the process includes steps 200 through 204. These steps are assumed to be performed by the control plane 120 and the edge devices 140 utilizing the MPSZTP logic 122 and firmware-based MPSZTP logic 142. The process begins with step 200, determining, utilizing a firmware-based agent running in firmware of the at least one processing device (e.g., one of the edge devices 140), a boot flag status during a boot process of the at least one processing device. This may include intercepting a normal or conventional boot process of the at least one processing device. The firmware-based agent may comprise a recovery OS that executes within the firmware of the at least one processing device. The recovery OS may comprise an application that executes within the firmware of the at least one processing device, such as a Universal Extensible Firmware Interface (UEFI) application.

In step 202, responsive to the boot flag status being a first value, a system update handler of the firmware-based agent is executed. The system update handler is configured for provisioning of a secured runtime OS on the at least one processing device. Provisioning of the secured runtime OS comprises digitally signing an image of the secured runtime OS utilizing a hardware-based root of trust key of the at least one processing device. In step 204, responsive to the boot flag status being a second value, a secured OS boot handler of the firmware-based agent is executed. The secured OS boot handler is configured for validating the image of the secured runtime OS and loading the secured runtime OS on the at least one processing device responsive to successful validation of the image of the secured runtime OS. Validating the secured runtime OS image comprises performing attestation of a signature of the image of the secured runtime OS utilizing the hardware-based root of trust key of the at least one processing device. The FIG. 2 process may further comprise, responsive to the boot flag status being a third value, executing an unsecured OS boot handler of the firmware-based agent, the unsecured OS boot handler being configured for loading one or more unsecured OSes on the at least one processing device.

The system update handler of the firmware-based agent may provide various functionality, including functionality for onboarding the at least one processing device to a control plane configured for management of the at least one processing device and, once onboarded, to perform management operations on the at least one processing device as directed by the control plane. Onboarding the at least one processing device may comprise utilizing the system update handler to perform the steps of: establishing a first network connection with a rendezvous server; providing, to the rendezvous server, a device identifier of the at least one processing device; receiving, from the rendezvous server, a network address of an onboarding server of the control plane, the onboarding server being registered with the rendezvous server as an owner of the at least one processing device; establishing a second network connection with the onboarding server utilizing the network address received from the rendezvous server; receiving, from the onboarding server, an ownership voucher comprising a chain of trust associated with the at least one processing device; and updating a non-volatile memory of the at least one processing device to indicate successful onboarding of the at least one processing device responsive to verifying the chain of trust in the ownership voucher. The chain of trust in the ownership voucher may comprise a sequence of digital signatures signed by different entities in a supply chain between a manufacturer of the at least one processing device and the owner of the at least one processing device.

As noted above, once successfully onboarded to the control plane, the system update handler may be used for performing management operations on the at least one processing device as directed by the control plane. This may comprise utilizing any combination of a download instruction handler, a local storage handler, and a payload processor in one or more multiple phases or iterations to achieve MPSZTP (e.g., of the secured runtime OS, or one or more applications or functionality thereof). The download instruction handler is configured for receiving one or more payloads from one or more provisioning servers associated with the control plane. Each payload may be deployed or processed separately, and although the connection(s) to the one or more provisioning servers may take place immediately and sequentially in some cases, in other use cases there may be a time delay between deployment or processing of different ones of the payloads. For example, at least a first one of the one or more payloads may be deployed or processed while the computing device is in a first location while at least a second one of the one or more payloads may be deployed or processed while the computing device is in a second location. There may also be a delay of time between receipt of a given payload and deployment of the given payload (e.g., while actions are taken to complete provisioning of the given payload). Receiving the one or more payloads comprises utilizing the download instruction handler to perform the steps of: establishing a network connection with the provisioning server; downloading one or more binary large objects from the provisioning server; validating the downloaded one or more binary large objects; and parsing the validated one or more binary large objects to identify one or more deployment actions for one or more bundled parts of the validated one or more binary large objects.

The local storage handler is configured for performing one or more operations specified by the one or more received payloads on one or more target storage devices of the at least one processing device. The one or more operations may comprise at least one of: encrypting at least one of the one or more target storage devices; partitioning at least one of the one or more target storage devices; and performing a secure wipe of at least one of the one or more target storage devices.

The payload processor may comprise a payload deployment handler and a pre-action security handler configured for performing one or more operations specified by the one or more received payloads. The one or more operations performed by the payload deployment handler comprise locating a target storage device of the at least one processing device and deploying at least a portion of the one or more received payloads to the target storage device. The one or more operations performed by the pre-action security handler may comprise executing the one or more received payloads to at least one of: digitally sign the image of the secured runtime operating system and validate the image of the secured runtime operating system. The one or more operations performed by the pre-action security handler may also or alternatively comprise performing a firmware update for at least one of a UEFI module of the at least one processing device, an integrated peripheral of the at least one processing device, and a Peripheral Interconnect Component Express (PCIe) attached component of the at least one processing device. The one or more operations performed by the pre-action security handler may further or alternatively comprise a factory reset of the at least one processing device.

Illustrative embodiments provide techniques for multi-phase secure zero touch provisioning and recovery, with such techniques being referred to herein as MPSZTP. MPSZTP processes may be used for onboarding of computing devices (e.g., edge computing devices) that are deployed at various sites (e.g., customer sites or remote sites), where such onboarding is enabled via installation of a firmware-based tool (e.g., a Universal Extensible Firmware Interface (UEFI) Operating System (OS) firmware tool) on the computing devices by a manufacturer thereof. At manufacture, a computing device's Trusted Platform Module (TPM) will be initialized and an ownership token will be generated. Using MPSZTP processes, a computing device (e.g., an edge cloud endpoint device) so configured can be securely provisioned when booted into a factory-defaulted state. The MPSZTP processes described herein may be used or enabled on both public and private networks, and enable various types of provisioning of computing devices including but not limited to updating a boot image, committing an initial configuration, and executing arbitrary scripts to address auxiliary needs. The computing device, when provisioned using the MPSZTP processes, is subsequently able to establish secure connections with other systems. Full control of a payload delivery mechanism from a control plane (e.g., in a provider cloud operated by a manufacturer or owner of computing devices which are deployed at various remote sites) is also enabled using MPSZTP processes. MPSZTP processes may be further used to modify provisioned computing devices, including definition and instrumentation.

There is a need for a manufacturer or other owner or provider of computing devices that are to be deployed at remote computing sites (e.g., edge or customer computing sites) to securely provision such computing devices. Such secure provisioning is important not only to the customer or other end-user which will operate such computing devices, but also for the manufacturer or vendor of the computing devices (e.g., for protecting intellectual property, reputation, goodwill or market status, etc.). The MPSZTP processes described herein meet these and other needs. Advantageously, the MPSZTP processes described herein can utilize or leverage known industry standards will still enabling computing devices to be securely on-boarded and provisioned within a zero-trust environment. The ability to establish and maintain a known trusted state for each computing device (e.g., each edge device) is essential for establishing edge operating environment requirements of customers or other end-users.

The MPSZTP processes described herein are designed to perform secure device on-boarding, bare-metal device provisioning, and platform (e.g., OS, middleware, application code, etc.) provisioning all from a firmware-based application (e.g., aUEFI_OS application) that maintains an ability to intercept the boot and provisioning process. At the conclusion of the provisioning process, the computing device is secured by signing of an installed immutable OS image in readiness for boot time OS attestation. The complete process offers a high degree of assurance that the on-boarded device can be trusted.

Table 300 of FIG. 3 illustrates functionality that is offered through the firmware-based on-boarding process (e.g., utilizing a firmware-based agent, such as a UEFI_OS micro agent), as compared with what can be achieved via a runtime agent executing on the host OS of a computing device under "day 2" operations (e.g., following provisioning via the firmware-based application). Such functionality includes, for example, onboarding via Fast ID Online (FIDO) Device Onboarding (FDO) and attestation, both via the firmware-based agent and the runtime agent. Management of Simple Boot Flag (SBF) is enabled via the firmware-based agent. The runtime agent is enabled to set a BootOK flag to "FAIL" from the control plane. Decisions on boot path are illustratively enabled only via the firmware-based agent, as doing so via the runtime agent can present a security risk. Disk partitioning functionality is enabled in the firmware-based agent, and is controlled from the control plane only. Disk partitioning functionality is also enabled in the runtime agent, but only for disks and partitions that do not contain OS images. Deploying a runtime OS is enabled from the control plane for both "A/B" OSes via the firmware-based agent, but is only for the "B" OS via the runtime agent with switching at boot. The runtime OS may be digitally signed via the firmware-based agent, but not the runtime agent.

Downloading binary large objects (BLOBs) from a control plane provisioning server is enabled via both the firmware-based agent and the runtime agent. Unpacking BLOBs is also enabled via both the firmware-based agent and the runtime agent. More specifically, the runtime agent can fully process hosted applications and deployment of provider edge device services into an isolated services filesystem that does not impact the immutable OS image-containing partitions. Executing templates and/or instruction scripts from BLOBs is enabled via both the firmware-based agent and the runtime agent, though the runtime agent cannot do so for OS signing and installation processes. Similarly, installation of BLOB payload contents (if provided) is enabled via the firmware-based agent and the runtime agent, though the runtime agent cannot install OS images.

File and/or filesystem copy and/or image replication functionality is enabled via both the firmware-based agent and the runtime agent. Rebooting the system is also enabled via both the firmware-based agent and the runtime agent. Factory reset operation functionality is enabled only via the firmware-based agent (e.g., on BootFail condition). The ability to ship a blank system is also enabled only via the firmware-based agent.

Operators of edge computing sites and edge computing devices, referred to herein as edge operators, seek to reduce costs where possible. Edge operators must deploy edge computing devices at many locations (e.g., different remote or edge computing sites), across untrusted networks and potentially hostile environments. This is often done at significant cost, potentially requiring trained technicians to be sent to each remote site. This can be cost prohibitive, and does not scale well. Further, when an edge computing device fails while in service, the cost of remediation can escalate rapidly due to lost productivity, the cost of sending appropriate experts to the associated remote site where the failed edge computing device is located, and recovering abilities to restart production lines.

The MPSZTP processes provide a bootstrapping strategy enabling computing devices (e.g., edge devices) to securely obtain bootstrapping data with no installer action beyond physical placement and connecting network and power cables. As such, the MPSZTP processes enable non-technical personnel to bring up computing devices in remote locations without the need for any operator input. The MPSZTP processes provide functionality for updating the boot image, committing an initial configuration, and executing arbitrary scripts to address auxiliary needs on computing devices. The updated computing devices are subsequently able to establish secure connections with other systems. MPSZTP processes provide a mechanism for defining a computing device's "known good run state" in a manner similar to that of Kubernetes defining a desired state of each object.

The MPSZTP processes described herein provide advantages in various use cases. Exemplary use cases include, but are not limited to, establishing an edge cloud endpoint in a retail store, establishing an edge cloud endpoint to manage a factory production unit, etc. Establishing an edge cloud endpoint in a retail store allows a computing device, that is to be used in retail operations management (e.g., for a remote branch office or convenience store), to be connected to an Internet Protocol (IP) network. Assuming it is not possible to customize the IP network to provide any boot-strapping support, and with no other nearby device to leverage, the computing device has no recourse but to reach out to an Internet-based server from which it can be brought into service. MPSZTP processes may be used for bringing such devices into service securely. Establishing an edge cloud endpoint to manage a factory production unit covers scenarios where the environment differs only in that a computing device may additionally leverage nearby computing devices, which may direct it to use a local service from which it can be brought into services. If no such information is available, or the computing device is unable to use the information provided, it can then reach out to the network just as it would for the remotely administered network use case. It should be appreciated that these are only examples of use cases where the MPSZTP processes may be utilized. More generally, the MPSZTP processes may be utilized in any scenario in which it is desired to provide remote provisioning of a computing device, including where the computing device is to be deployed in an untrusted network or location.

Computing devices (e.g., edge cloud endpoint devices), when shipped from a factory, will hold sufficient information to onboard with a rendezvous service to allow installation or recovery over a network. Pre-provisioning at manufacture may be based on order entry details, and will be sufficient only to initiate the multi-phased onboarding process (e.g., using MPSZTP). From that point forward, all onboarding will be at the determination of the edge control plane. For recovery purposes, the Microsoft® SBF protocol may be utilized. The SBF protocol provides a very simple boot flag register or variable that can be used by any OS to communicate boot options to the system firmware and add-in card option read-only memories (ROMs). This allows firmware and OSes to automatically optimize their behavior and boot performance based on the installed OS and previous boot cycle history. The use of SBF is defined by specifications. The system will have a Basic Input/Output System (BIOS) UEFI module, referred to herein as a UEFI_OS module and which is an example of what is more generally referred to herein as a firmware-based agent, that will be responsible for determining the status of the computing device, to initiate MPSZTP processing, and then to hand-off execution to an installed and previously secured OS. The UEFI_OS module includes a micro kernel that has sufficient intelligence to: (1) securely deploy a multi-phased full system OS, plus application libraries and a runtime framework together with all vendor-led applications following a flexible pre-defined configuration that is entirely specified from the control plane; and (2) by use of the SBF, recover the OS and application code in case of failure. A companion software module (e.g., the runtime agent) is created and installed into the runtime OS to provide a remote management service, the purpose of which is to receive and process instructions from the control plane using the same base-line secure transfer protocols as shall be used by a MPSZTP handler of the firmware-based agent (e.g., the UEFI_OS module). The use of a single secure control protocol advantageously simplifies the overall design of the control plane.

In some embodiments, MPSZTP processes comply with the IEC62443 risk-based cyber security approach for Industrial Automation and Control Systems (IACS). In an ever-expanding range of domains and industries, such as power and energy supply and distribution, transport, etc., IACS technologies are central to critical infrastructure. Implementing IEC62443 can mitigate the effects of, and often prevent, successful cyber-attacks. IEC62443 can also bolster security throughout the lifecycle and reduce costs. The MPSZTP processes enable very tight control via a firmware-based agent (e.g., the UEFI_OS module) that a manufacturer or provider of a computing device owns, and is completely independent of any payload being deployed. As noted above, this firmware-based agent (e.g., the UEFI_OS module) may be referred to as the UEFI_OS or UEFI_OS micro agent.

Bare-metal device provisioning and bootstrapping will now be described. A bare-metal computing device holds a firmware-based secure boot ROM (e.g., a UEFI secure boot ROM), and the system as a whole is capable of TPM-based Integrity Measurement Architecture (IMA) for measuring boot security, where each boot stage is reported into the TPM's Platform Configuration Register (PCR) registers. IMA security may be defined using various Trusted Computing Group (TCG) Extensible Firmware Interface (EFI) Platform and Protocol specifications. With IMA security, it is possible to assure a high level of confidence regarding: (1) platform consistency and integrity (e.g., a failure of IMA will fail the boot process and initiate a recovery); and (2) device trustworthiness that can be communicated to the control plane.

Figure 4A:
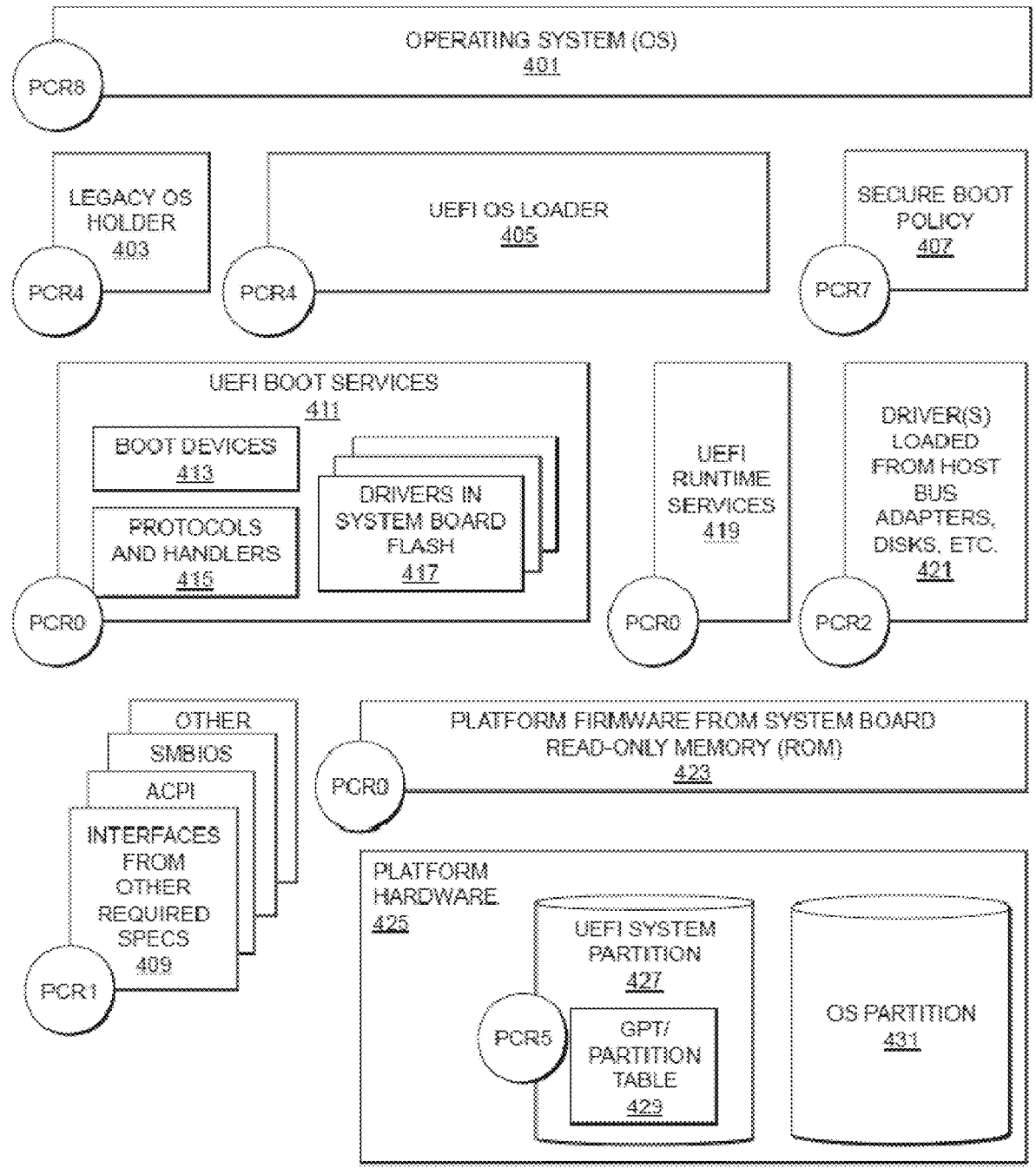
FIGS. 4A and 4B show a system architectures and a table detailing use of platform configuration registers for enabling multi-phase secure zero touch provisioning of computing devices in an illustrative embodiment.
Figure 4B:

FIG. 4A illustrates a PCR mapping of UEFI components, including: an OS 401 mapped to PCR8; a legacy OS holder 405 mapped to PCR4; a UEFI_OS loader 405 mapped to PCR4; a security boot policy 407 mapped to PCR7; UEFI boot services 411, including boot devices 413, protocols and handlers 415, and drivers in system board flash 417, mapped to PCR0; UEFI runtime services 419 mapped to PCR0; drivers loaded from host bus adapters (HBAs), disks, etc. 421 mapped to PCR2; interfaces from other required specifications 409 (e.g., Advanced Configuration and Power Interface (ACPI), System Management BIOS (SMBIOS), etc.) mapped to PCR1; platform firmware from system board ROM 423 mapped to PCR0; and platform hardware 425 including a UEFI system partition 427 (e.g., including Globally Unique Identifier (GUID) Partition Table (GPT) table 429) mapped to PCR5, and OS partition 431. Table 450 of FIG. 4B illustrates PCR usage of the PCR indexes PCR1 through PCR15.

Figure 5A:
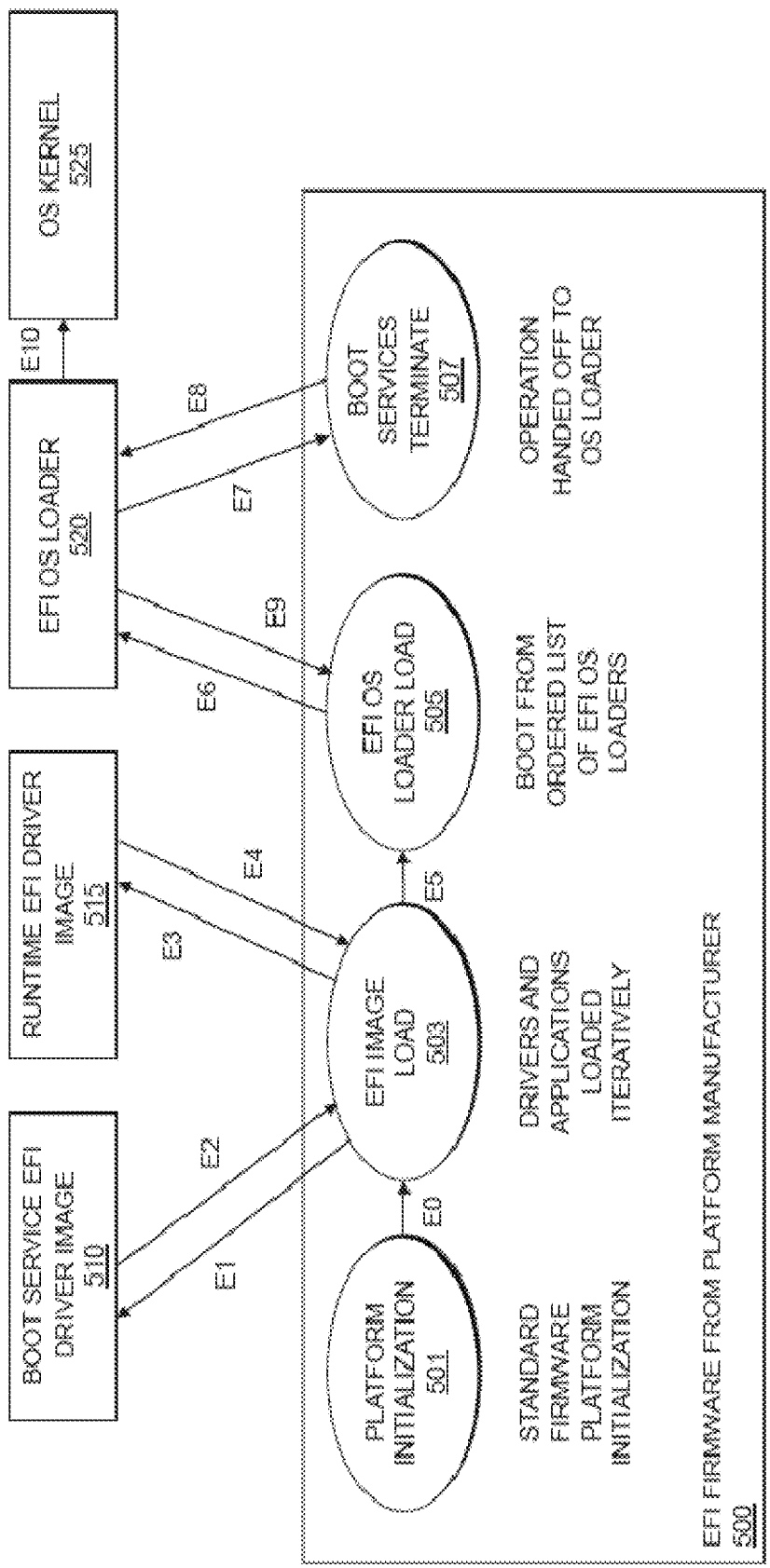
FIGS. 5A and 5B show a universal extensible firmware interface boot process without and with use of a firmware-based agent for multi-phase secure zero touch provisioning of computing devices in an illustrative embodiment.
Figure 5B:
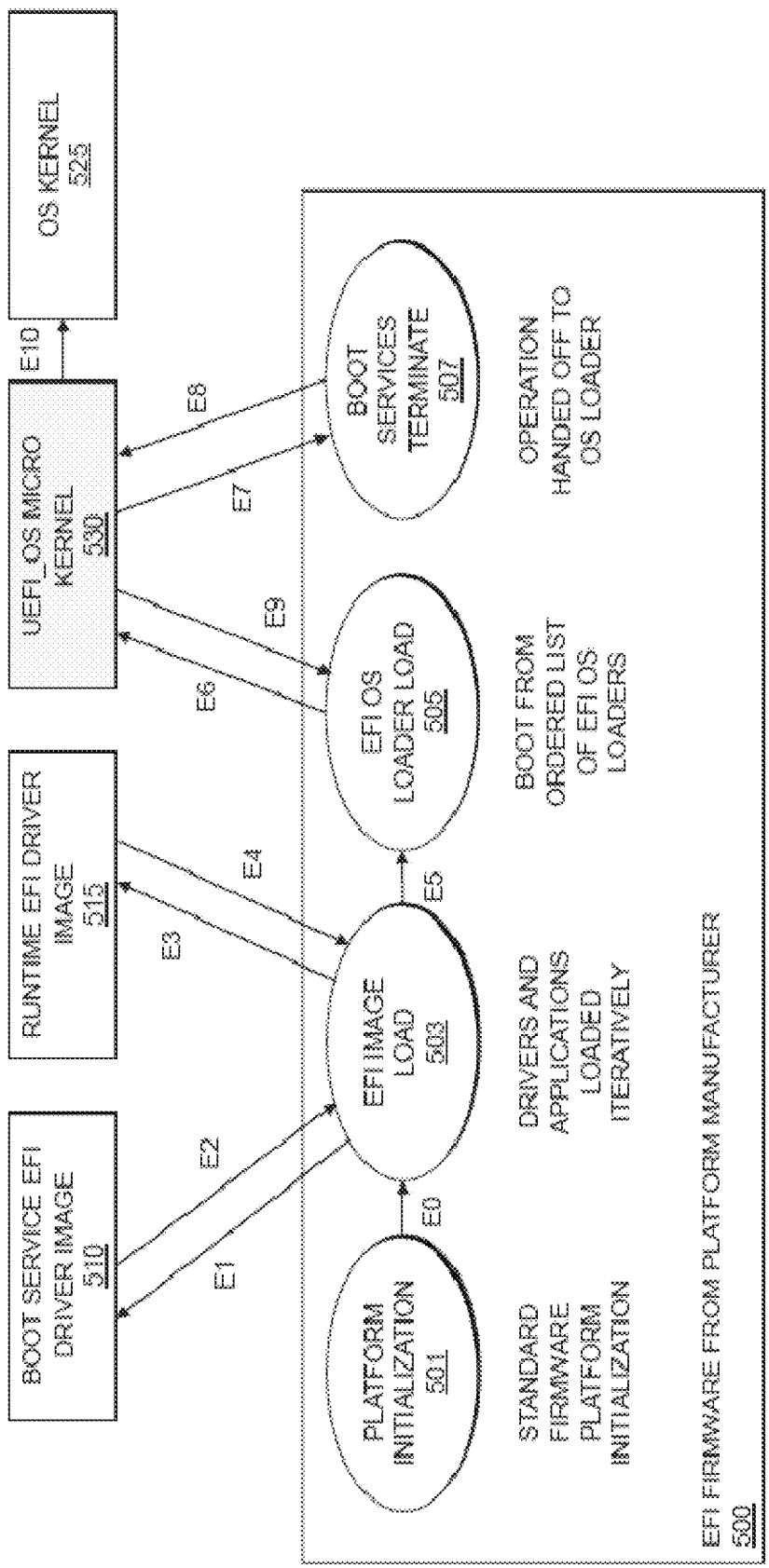

The firmware-based agent (e.g., the UEFI_OS module) will process edge computing device power-up boot handling processes. A standard server or gateway device UEFI platform boot process is illustrated in FIG. 5A. In this process, EFI firmware from a platform manufacturer 500 performs platform initialization 501, which is a standard firmware platform initialization. In step E0, EFI image load 503 is performed, where drivers and applications are loaded iteratively. This includes steps E1 and E2 which access a boot service EFI driver image 510 and steps E3 and E4 which access a runtime EFI driver image 515. After EFI image load 503, step E5 progresses to EFI OS loader load 505 in which the system boots from an ordered list of EFI OS loaders. This includes steps E6 through E8, which utilize EFI OS loader 520 and proceed through a boot services terminate stage 507 where operation is handed off to the EFI OS loader 520. In step E10, the OS kernel 525 is loaded. FIG. 5B illustrates a firmware-based agent-driven process for computing device power-up boot handling, where the firmware-based agent is implemented as UEFI_OS micro kernel 530 that replaces the EFI OS loader 520.

Figure 6:
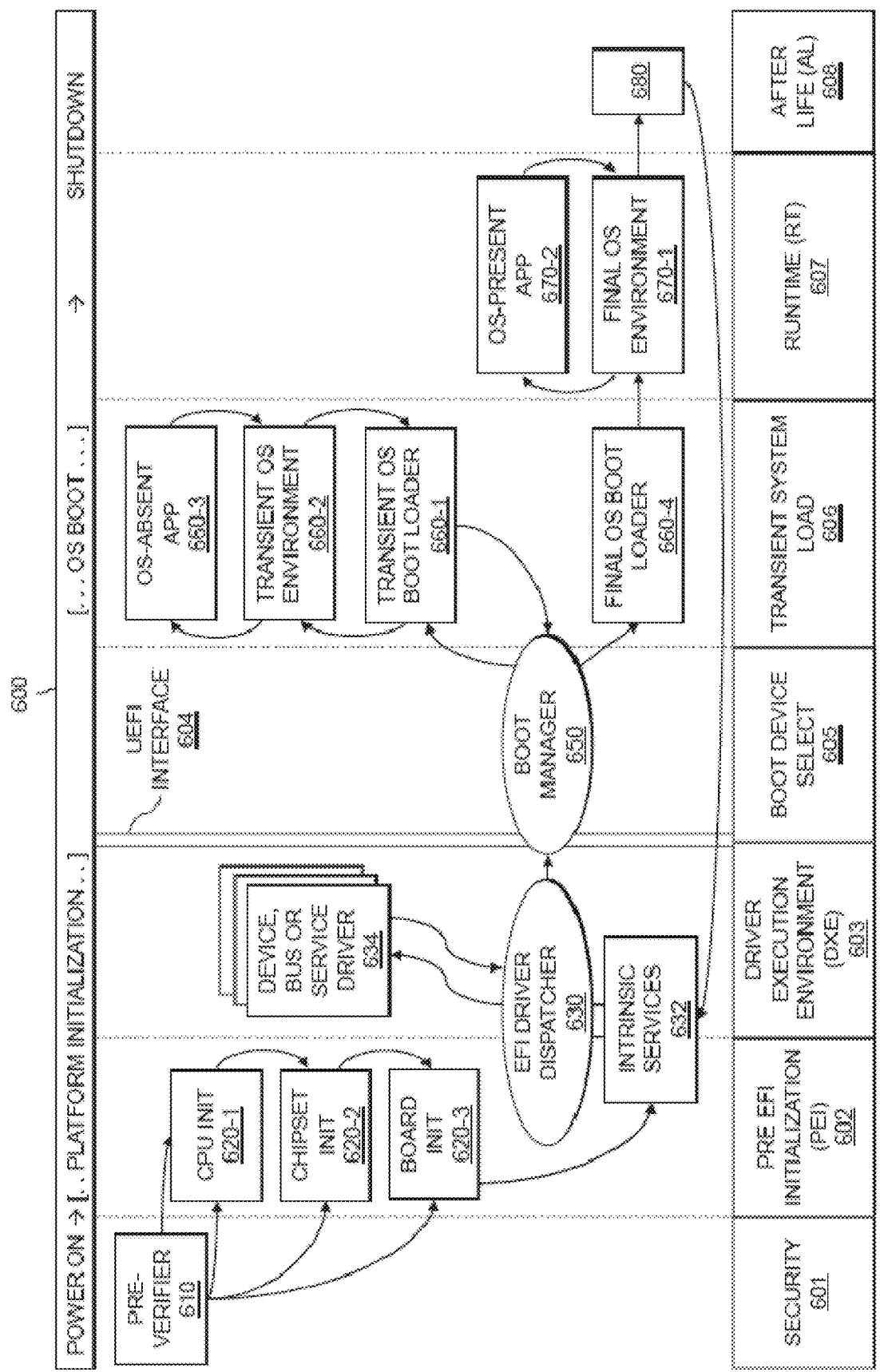
FIG. 6 shows implementation of a universal extensible firmware interface-based tool within a boot process for enabling multi-phase secure zero touch provisioning in an illustrative embodiment.

FIG. 6 illustrates location of the UEFI_OS micro kernel 530 within the boot process. The boot process 600 of FIG. 6 proceeds from power-on to platform initialization, OS boot and shutdown in a set of stages including a security (SEC) stage 601, a pre-EFI initialization (PEI) stage 602, a driver execution environment (DXE) stage 603, a boot device select (BDS) stage 605, a transient system load (TSL) stage 606, a runtime (RT) stage 607 and an after life (AL) stage 608. In the SEC stage 601, a pre-verifier 610 acts to verify various elements that are loaded in the PEI stage 602, including a CPU initialization element 620-1, a chipset initialization element 620-2 and a board initialization element 620-3. In the DXE stage 603, an EFI driver dispatcher 630 uses intrinsic services 632 to load various device, bus or service drivers 634. The SEC stage 601, PEI stage 602 and DXE stage 603 represent existing UEFI Power-On Self-Test (POST) and hardware attestation. From the DXE stage 603, processing is handed over to the UEFI interface 604, which represents the UEFI_OS micro kernel 530 or other firmware-based agent that establishes initial control plane functions in the BDS stage 605 using boot manager 650. The UEFI interface 604 and UEFI_OS micro kernel 530 will in the TSL stage 606 handle all boot time attestation, provisioning phases and handover to a secured OS. This will proceed from a transient OS bootloader 660-1, to a transient OS environment 660-2, to an OS-absent application 660-3, and then to a final OS bootloader 660-4. In the RT stage 607, the final OS environment 670-1 is loaded (e.g., which is a secured OS through the use of UEFI interface 604 and UEFI_OS micro kernel 530), and includes an OS-present application 670-2. In the RT stage 607, the secured OS is running and a local runtime agent is now in control of the system. In the AL stage 608, various elements 680 access the intrinsic services 632 of the EFI driver dispatcher 630.

Figure 7:
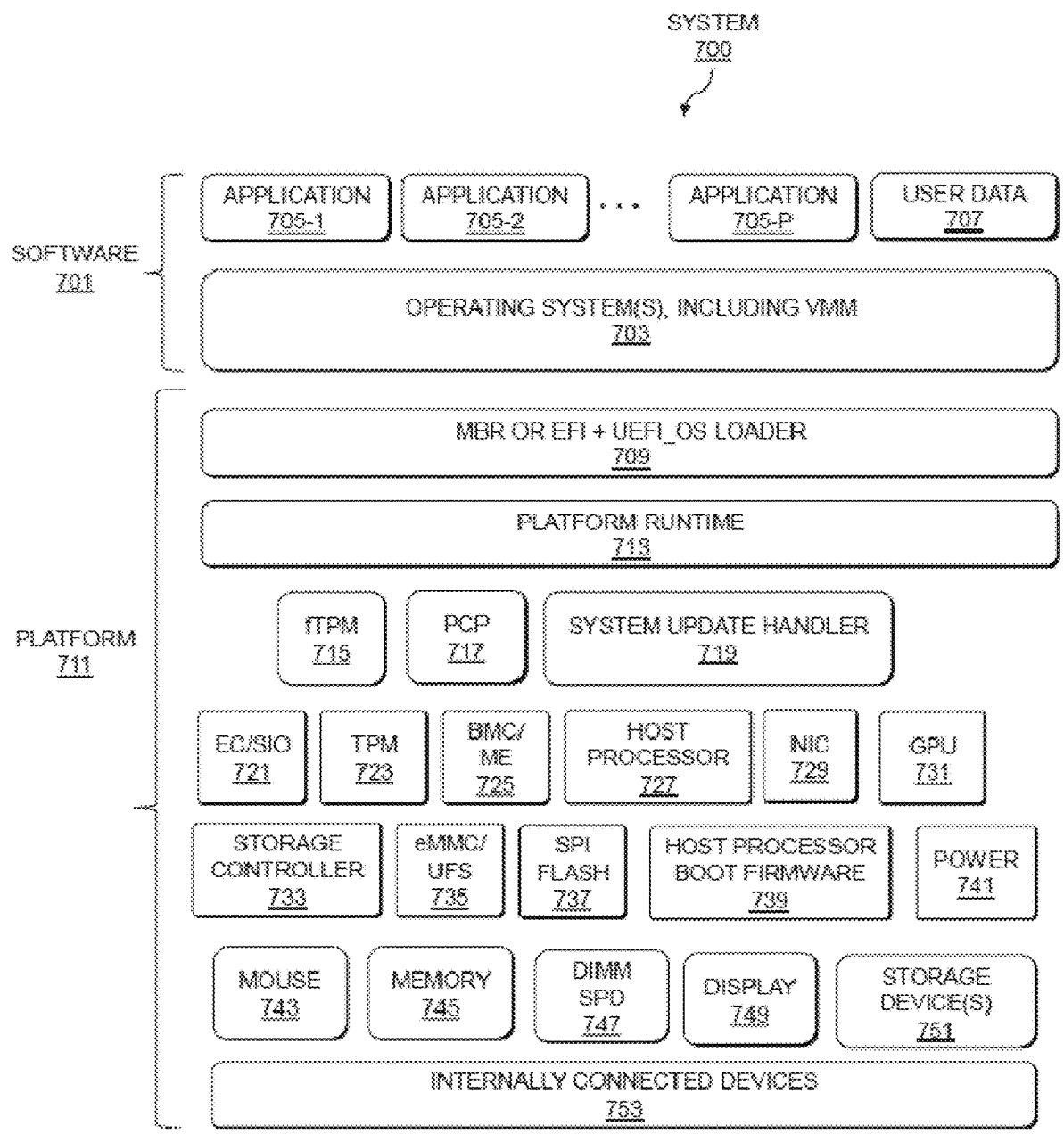
FIG. 7 shows system architecture for a device configured with a firmware-based agent for multi-phase secure zero touch provisioning in an illustrative embodiment.

FIG. 7 shows a high level architecture of a system 700 comprising software 701 including one or more OSes and a Virtual Machine Monitor (VMM) 703, a set of applications 705-1, 705-2, . . . 705-P (collectively, applications 705) and user data 707. The system 700 further comprises a platform 711, which includes a Master Boot Record (MBR) or EFI and UEFI OS loader 709, a platform runtime 313, a firmware TPM (fTPM) 715, Platform Certificate Profile (PCP) 717, a system update handler 719, an Embedded Controller (EC)/Serial Input/Output (SIO) integrated circuit 721, a TPM 723, a Baseboard Management Controller (BMC)/Management Engine (ME) 725, one or more host processors 727, one or more Network Interface Cards (NICs) 729, one or more Graphic Processing Units (GPUs) 731, one or more storage controllers 733, an Embedded Multimedia Card (eMMC)/Universal Flash Storage (UFS) component 735, a Serial Peripheral Interface (SPI) flash component 737, host processor boot firmware 739, power 741, a mouse 743, memory 745, Dual In-Line Memory Module (DIMM) Serial Presence Detect (SPD) 747, display 749, one or more storage devices 751 (e.g., one or more Hard Disk Drives (HDDs) and/or Solid State Drives (SSDs)), and internally connected devices 753 (e.g., one or more webcams, fingerprint readers, smartcards, etc.).

The UEFI_OS micro kernel 530 and on-boarding agent will now be described in further detail. The UEFI_OS will serve as the UEFI micro kernel that hosts the initial onboarding agent and boot time validating/attestation environment. The UEFI_OS illustratively meets the following specifications:

1. The UEFI_OS will be built as an EFI module that can take the place of the UEFI OS Loader in the traditional platform boot process;
2. The UEFI_OS is capable of being built to run on various architecture platforms, including Intel X86_64 (AMD64) and ARMv8 Aarch64 CPU architecture platforms;
3. The UEFI_OS micro kernel should be minimal (e.g., as small as possible) while enabling operation. This may be achieved by the UEFI_OS micro kernel:
   a. Being built with the minimum essential kernel drivers;
   b. Depending as far as possible on UEFI runtime drivers (separately loaded);
   c. Having the ability to bring up a network interface that is capable of connecting securely to a routed IP network using Dynamic Host Control Protocol (DHCP)-client from a local or a routed DHCP server;
   d. Having the ability to perform Domain Name Service (DNS) resolver operations from an external DNS server;
   e. Having the ability to connect with the control plane, to establish a secure transport connection; and
   f. Having the minimum infrastructure and libraries needed to host the UEFI onboarding agent and support only critical functions necessary to deploy bundles that are pulled from the control plane; and
4. The UEFI_OS is capable of being located into the smallest Non-Volatile Random-Access Memory (NVRAM) storage space necessary, and leaves sufficient room to store boot flag information, and to store boot initialization and status data.

The UEFI micro agent will be built into the UEFI_OS operating system image. The UEFI micro agent provides a tool responsible for pre-provisioning of the computing device, initial FDO, OS provisioning, and initial securing of the computing device's OS image(s). The UEFI_OS micro agent comprises a tiny UEFI ROM (e.g., which may as small as or smaller than 4 megabytes (MB)) Linux kernel with an encapsulated filesystem. The UEFI_OS will be the default factory boot option. The computing device is capable of being ordered with the UEFI_OS disabled, and the traditional UEFI OS loader handling enabled. In this case, the computing device is not capable of being managed via the control plane. There is also a means of disabling the UEFI_OS by orchestration from the control plane, with no other pathway to disable the use of the UEFI_OS. The UEFI_OS micro agent further comprises a SBF implementation, where if the boot OK flag failed to set the computing device is reset to a factory default state, and where if the boot OK flag is set the computing device boots normal and jumps to disk boot. The UEFI_OS micro agent further provides secure boot and IMA boot handoff from UEFI to a disk-based OS over TPM. A reserved NVRAM area may be used to store device-specific information such as a machine identifier (Machine_ID) and a machine OS identifier (Machine_OS_ID). The OS will use the TPM for storing security sensitive data, such as a machine_hash (Machine_Hash), machine OS hash (Machine_OS_Hash) and binary BLOB hashes (e.g., for VM images, container images, etc.).

The UEFI_OS micro agent may utilize various tools, including trust handling tools, cryptography tools, disk image handling utilities, disk partition tools, filesystem driver tools that support formatting and mounting of various filesystems (e.g., ext3, ext4, btrfs, xfs, NTFS/NTFS4, FAT, DOS), and bundle processing tools. The bundle processing tools provide functionality for downloading of bundles (e.g., BLOBs) from the control plane provisioning servers, unpacking bundles, installing bundles, and performing file copy and/or image replication. The trust handling tools may include TPM tools (e.g., tpm2-tools, swtpm-tools, clevis-pin-tmp2), PCR tools such as EFI_vars tools, Public Key Infrastructure (PKI) tools, and Machine Owner Key (MOK) tools. The cryptography tools may include OpenSSL, python3:passlib, and ca-certificates tools. The disk image handling utilities may include Linux Standards Base (LSB) tools such as tar, dd, cpio, and compression and decompression tools such as xv, gzip, zip, and rar.

The UEFI_OS micro agent provides various functions. On powerup, the UEFI_OS micro agent provides for device attestation. The UEFI_OS micro agent also provides functionality for secure device on-boarding (e.g., FDO or Secure Device Onboarding (SDO) processing described in further detail below). Functionality is also provided for re-MOK when a new system image has been installed, and for Transmission Control Protocol (TCP)/IP and DHCP/DNS client implementation (e.g., for web-based image acquisition, deployment and installation). The UEFI_OS micro agent also provides binary package deployment tooling functionality, including disk imaging tooling, disk partition tooling, filesystem mounting primitives, tooling to download and install update packages (e.g., containing application libraries, application support frameworks, and applications), and file copy and/or image replication tooling.

Figure 8:
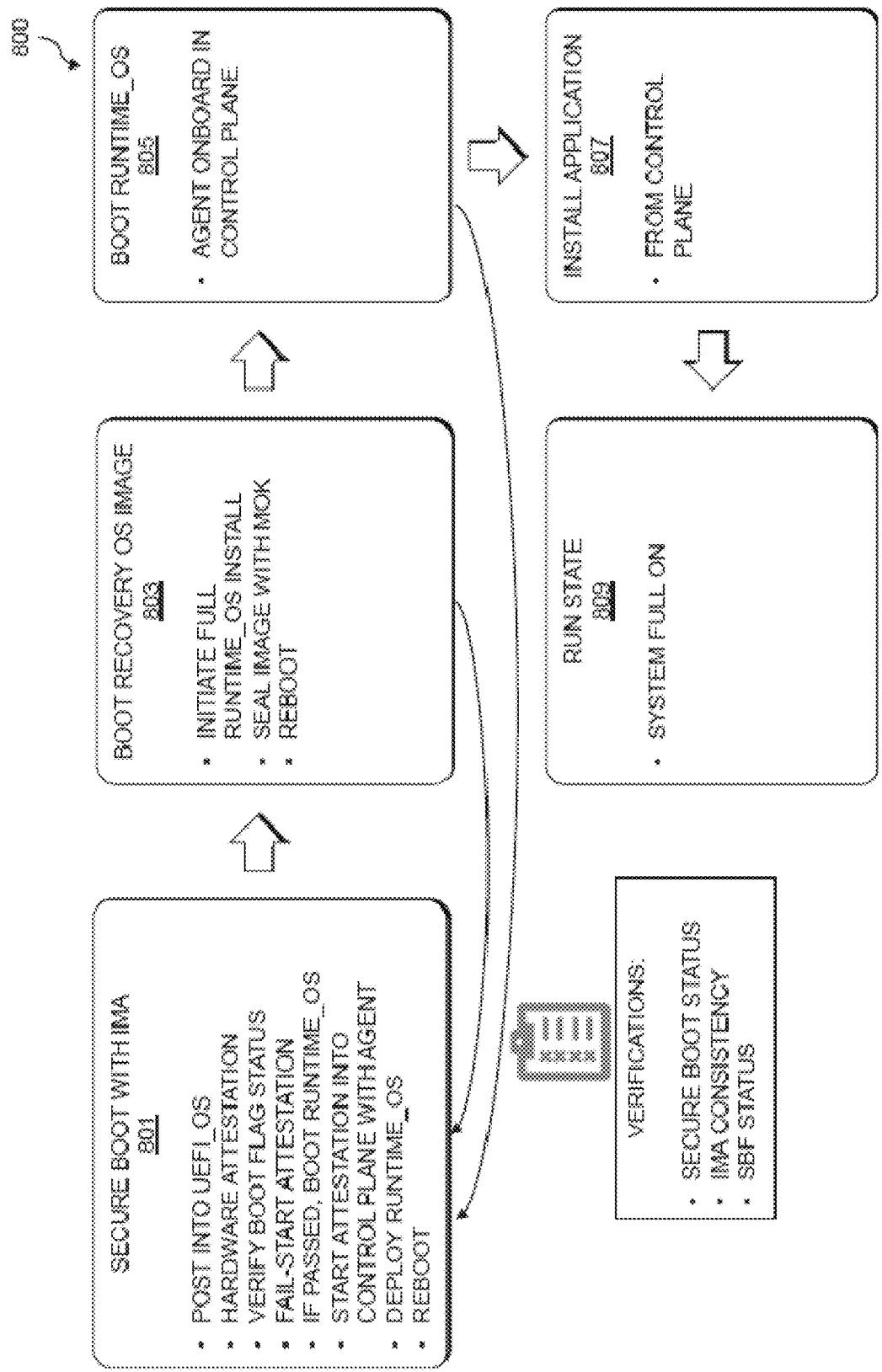
FIG. 8 shows a process flow for installation or recovery of software on a computing device utilizing firmware-based and runtime agents configured for multi-phase secure zero touch provisioning in an illustrative embodiment.

The UEFI_OS enables a computing device (e.g., an edge device) to be brought into initial service sufficient for "day 1" operations. An extended daemon or microservice will then take over for all communications with the control plane for "day 2" and beyond operations. As shipped from the factory, the computing device will hold sufficient information to obtain its redirect information from a manufacturer or vendor's rendezvous server to allow installation or to permit recovery over a network connection. FIG. 8 illustrates a process flow 800 for such installation or recovery. The process flow 800 begins with a secure boot with IMA 801. This includes a POST into the UEFI_OS, followed by hardware attestation and verifying the boot flag (e.g., SBF) status. Fail-start attestation is then performed (e.g., for FDO or SDO). If passed, the runtime OS is booted and attestation into the control plane is performed with the agent. The runtime OS is then deployed and the system is rebooted. Next, the recovery OS image is booted 803. This includes initiating a full runtime OS installation, sealing the runtime OS image with the MOK, and rebooting the system. The runtime OS is then booted 805, which includes the agent onboarding into the control plane. Next, applications are installed 807 from the control plane. In the run state 809, the system is fully on. Verifications are performed in steps 803 and 805, where such verifications include the secure boot status, IMA consistency and SBF status.

The handover to device provisioning includes a handover of the trusted chain from the hardware, firmware, rendezvous server, and the deployed or runtime OS under the supervision of the control plane. Such handover will be managed by means of root of trust (e.g., TPM) and UEFI vars PCR IMA measurement on the computing device. Each phase in the boot process will initiate a re-on-boarding via the UEFI micro kernel OS handlers. Based on the different boot phases, the control plane will maintain the device status and, on successful completion of each phase, the UEFI_OS micro agent or deployed computing device's OS runtime agent will report its runtime status back to the control plane. The status of the SBF will determine whether to boot an installed OS (an "A" or "B" image), or to enter a system update handler (e.g., system update handler 719 in the system 700) process. In all cases, the SBF status and the action taken as a result of the SBF status is reported to the control plane at an appropriate point in the boot process.

In illustrative embodiments, SBF is utilized. On a PC-AT BIOS computer, a BOOT register is defined in main Complementary-Metal-Oxide-Semiconductor (CMOS) memory (e.g., typically accessed through I/O ports 70h/71h on Intel® Architecture platforms). The location of the BOOT register in CMOS is indicated by a BOOT table found via the ACPI Root System Description Table (RSDT) table. On an EFI system, a SimpleBootFlag global variable is defined which is available both during boot and runtime. In either the PC-AT BIOS or EFI case, the OS writes to the BOOT register or SimpleBootFlag variable, as appropriate, to set options for subsequent boots. The system BIOS firmware and option ROM firmware read from the BOOT register or SimpleBootFlag variable during POST to determine what actions to take.

For PC-AT BIOS-based systems, the BOOT table provides the location of the BOOT register in CMOS. This table exists in ACPI reclaimable memory, and is located via the RSDT table using the "BOOT" signature. If this table is present on an EFI based system it is ignored by the EFI aware OS, EFI applications, EFI drivers and EFI Option ROMs and any other EFI executables, other than any designed for legacy BIOS compatibility. The structure of the BOOT table follows ACPI conventions, and contains the information shown in table 900 of FIG. 9.

As noted above, on a PC-AT BIOS-based system, the BOOT register exists in main CMOS memory (e.g., accessed by ports 70h/71h). On an EFI-based system, the SimpleBootFlag variable is stored in NVRAM as an 8-bit globally-defined variable with the standard VendorGuid for a globally-defined variable, per section 17.2 of the EFI 1.02 specification (e.g., {8BE4DF61-93CA-11d2-AA0D-00E098032B8C}). Both the BOOT register and SimpleBootFlag variable provide a mechanism for the OS to communicate back to the firmware about what actions need to be taken on the next boot. If an EFI firmware system maintains a legacy BIOS for backwards compatibility, it is responsible for maintaining congruency between the CMOS BOOT register and NVRAM variable. All EFI-aware operating systems and EFI executables, such as drivers, applications, or Option ROMs, must use the EFI SimpleBootFlag variable only. The format of both the register and variable is defined in tables 1000-1 and 1000-2 (collectively, table 1000) of FIGS. 10A and 10B.

During POST, the platform firmware "owns" the BOOT register or SimpleBootFlag variable, and can read and write to them as described below. On a PC-AT BIOS system, once the firmware has handed execution to the OS boot sector, the BOOT register is owned by the OS and can only be read or written to by the OS. On an EFI-based system, once Exit-BootServices( ) has been called the SimpleBootFlag variable is owned by the OS, and can only be read or written to by the OS. If the SimpleBootFlag variable is changed by the OS, the firmware must update the BOOT register (if one exists) for legacy compatibility. The firmware must not alter this register or variable while the OS owns it, with the exception of updating the CMOS BOOT register, if necessary, when an EFI-aware OS or executable writes to the SimpleBootFlag environment variable. It is not required to update the SimpleBootFlag environment variable if the CMOS BOOT register is updated.

A factory or manufacturer will build a customer's ordered configuration for a computing device (e.g., to be deployed at an edge or remote site) based on a Machine_ID and Bill of Materials (BOM). The device will be pre-provisioned with a MOK, which is stored in its TPM module. The MOK is signed with a Trusted Certificate Authority (CA) Certificate to generate a private key and a public key. The private key is stored in the TPM module. The public key shall be added to the rendezvous server, and into a Machine Registry database maintained at the control plane. At manufacturing, all EFI variables (e.g., ServiceTags, MacIDs, Universally Unique Identifiers (UUIDs), International Mobile Equipment Identities (IMEIs), etc.) will be recorded and attested to the control plane. They will be authenticated with the device IMA measurement on time of shipment and sealing in the factory.

The deployment of a computing device (e.g., edge cloud endpoint device) can follow any number of arbitrary steps, each taking place in alternate locations if necessary or desired. An OS image may be deployed to the computing device at the system integrator facility if so desired, and the remainder of deployment operations can be completed when the computing device arrives at its final destination (e.g., an edge or remote site, such as a customer site). In some embodiments, one method for device provisioning is enabled—control plane-driven deployment via TCP/IP. This will require DHCP-based provisioning of an IP network configuration (e.g., IP address, netmask, gateway address) and will require access to DNS-based resolver facilities. All pre-authentication is done via the rendezvous server, from which a redirect shall be provided to the control plane backend that shall control the remainder of the deployment process.

The deployment process is enabled to drive the entire deployment and on-boarding process, advantageously to the total exclusion of all manual interception. This will be completed with the help of: EFI vars (e.g., used when there is a need to update the OS); TPM registers for MOK-based secure boot (e.g., to assure signatures match, NVRAM to match OS configuration); an OS image (e.g., a pre-deployable installation OS, with full disk encryption and full OS fresh install capability); and run once or cloud-init startup scripts (e.g., pre-defined startup instances after full deployment). The OS image may be secured using various techniques. For example, the OS image may be digitally signed, digitally encrypted, may be compressed, hashed to create a Device_Hash and a Device_OS_Hash, etc.

Edge cloud endpoint devices (and other computing devices) are often used in areas that may have high volume human traffic throughfare, high humidity, high or low temperature, insecure network connectivity, extreme dust, vibration, and electrical (e.g., EMF) noise. The MPSZTP processes described herein enable such computing devices to be secured from the moment they are placed on location until they are removed at the end of their lifecycle. The MPSZTP processes utilize a control plane (e.g., which may be implemented as a cloud-based orchestration engine) and a computing device (e.g., an edge cloud endpoint device) that needs to be provisioned and managed. The control plane may be implemented on cloud-based infrastructure, including various components such as a rendezvous server, an onboarding server, a provisioning server, an application catalog, etc.

The provisioning and on-boarding of a computing device, in some embodiments, requires preparation of the computing device from initial boot. In the factory, such preparation includes device attestation, pre-provisioning of the computing device so that all firmware is up-to-date and fully attested, and disablement of all IO ports (e.g., such that the computing device can only be provisioned via the control plane). The computing device is then shipped to a customer location (e.g., a remote site). Upon initial boot, the computing device will perform the on-boarding process via the firmware-based agent (e.g., UEFI_OS). Through the control plane, all firmware configuration of the computing device is readied so that is can receive an OS.

The on-boarding process (e.g., performed upon initial boot via UEFI_OS micro agent or another firmware-based agent) may include one or more of:

1. Secure on-boarding of the computing device into the control plane ecosystem;
2. Secure deployment of an OS to the computing device, and attestation of the deployed OS;
3. Secure deployment of application software infrastructure and services that are required for third-party application hosting, and that will be deployed to the computing device for its intended service;
4. Rigorous attestation of all BLOBs that are downloaded by the computing device via the firmware-based agent (e.g., the UEFI_OS micro agent) or the runtime agent;
5. Completion of system attestation, signing and sealing of the active A/B OS images as an immutable system; and
6. Setting of the boot flag so that, upon reboot of the computing device, the UEFI boot chain loader will go directly to the installed OS on the active partition image.

When the computing device is in a known good run state, the control plane will deploy and manage applications on the computing device. This may include handover to a control plane-driven application store or equivalent, secure deployment of all application software and its attestation, secure configuration of application software in readiness for runtime operation, and rebooting to bring the computing device into service.

All operations on the computing device are assumed to take place in a zero trust environment. As such, some embodiments provide for all network transport operations to take place over a secured connection (e.g., using one or more of a private Virtual Private Network (VPN), Internet Protocol Security (IPsec), encrypted Virtual Local Area Network (VLAN), etc.). In some embodiments, the encrypted VLAN approach is the preferred alternative for securing network transport operations in the zero trust environment. Regardless of the transport layer security that is utilized, all network connections will use session-level encryption (e.g., using secured Secure Shell (SSH), Transport Layer Security (TLS), the use of Hypertext Transfer Protocol Secure (HTTPS) at a minimum for Representational State Transfer (REST)-related protocols, with Hypertext Transfer Protocol (HTTP) Strict-Transport-Security (HSTS) being preferred for REST transactions if it is feasible to do so, etc.).

Software, firmware and actions or instructions will be transferred from the control plane to the computing device in a signed package. The metadata for each package will specify the content type(s). In some cases, a digitally signed package may contain a singlet "action" package, or may contain one or more tuples with each tuple including a "binary payload" and an "action" package. Packages that are transferred between the computing device and the control plane will be handled using a secure transmission and validation protocol. In some embodiments, transmission of BLOBs by request from the computing device to the control plane will use the following protocol:

1. The package will be signed using the signing certificate and the public key (e.g., ownership token) of the specific target computing device prior to its transmission to the target computing device;
2. Upon receipt by the target computing device, the package will be digitally attested using its private key (e.g., a TPM-based private certificate). The digitally signed package will contain metadata that describes its content (e.g., a singlet containing an "action" component, or one or more tuples each including a "binary payload" and an "action" component);
3. Upon successful validation, the target computing device will calculate an acceptable Hash-based Message Authentication Code (HMAC) checksum (e.g., an MD5 hash) of the entire package or bundle. The target computing device will send a signed package containing the HMAC checksum data to the control plane for confirmation. The transaction metadata will describe the action pending upon successful receipt of the package from the target computing device;
4. Upon receipt of confirmation from the target computing device, the control plane will send to the target computing device a signed "confirm" or "deny" response. If the target computing device receives a deny response, it will perform an immediate factory reset and shutdown. The control plane will log the denial, and alert the preparer of the instruction/deployment package as to the success or failure of the transaction;
5. Upon receipt of confirmation that the HMAC checksum was confirmed, the target computing device will execute the "action" component of the package;
6. Upon completion of handling of the "action" component, the target computing device will send to the control plane a signed package containing the confirmation of completion. This signed package may include any log information that was specified/requested within the "action" package metadata; and
7. The control plane will issue a signed response. The signed response may instruct the target computing device to go live, and in going live to execute the secure device on-boarding (e.g., FDO or SDO) protocol. At conclusion of such processing, the target computing device will seal the OS portion of the system as an immutable module. The OS module may be duplicated into an A/B pair that may be used during system OS operational update processing, or that may be used to affect system recovery at any point when needed. This can be used for enabling a detailed recovery process hierarchy. One OS module (e.g., typically the "A" module) will be set as active in the boot flag.

Figure 11:
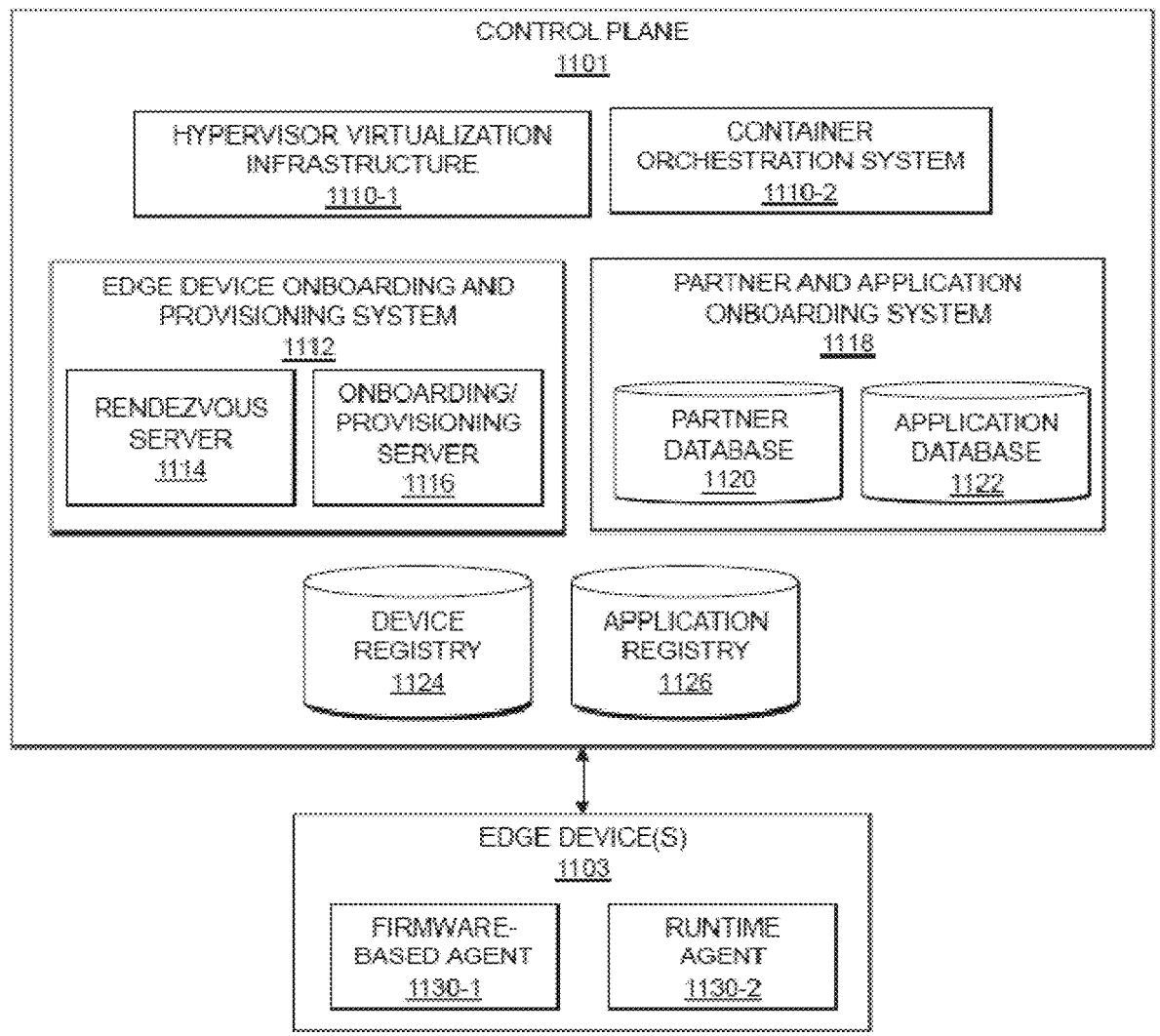
FIG. 11 shows details of an end-to-end tool chain providing functionality of a control plane configured for multi-phase secure zero touch provisioning of a set of edge devices in an illustrative embodiment.

The control plane may implement or utilize a tool chain that involves various components, as illustrated in FIG. 11. FIG. 11 shows the control plane 1101 (e.g., which may be cloud-based) communicating with one or more edge devices 1103. The control plane 1101 may implement hypervisor virtualization infrastructure 1110-1 and/or a container orchestration system 1110-2 (e.g., Kubernetes) to implement various tools (e.g., as virtual computing resources such as VMs or containers in a cloud infrastructure). Such tools illustratively include an edge device onboarding provisioning system 1112 having a rendezvous server 1114 and an onboarding/provisioning server 1116, a partner and application onboarding system 1118 including a partner database 1120 and application database 1122, a device registry 1124, and an application registry 1126. The edge device onboarding and provisioning system 1112, via the rendezvous server 1114 and onboarding/provisioning server 1116, communicate with the edge devices 1103 using either a firmware-based agent (e.g., secure micro OS such as the UEFI_OS micro agent) 1130-1 or a runtime agent 1130-2. It should be noted that, in some embodiments, the onboarding/provisioning server 1116 is implemented as separate onboarding and provisioning servers, rather than as a combined onboarding and provision server. The firmware-based agent 1130-1 may be used for initial onboarding and provisioning of a runtime OS on the edge devices 1103, with the runtime agent 1130-2 executing on the runtime OS to provide further provisioning once the runtime OS is up and live on the edge devices 1103.

The firmware-based agent 1130-1 illustratively provides a UEFI_OS-driven onboarding agent that will be used for processing of multiple phases of the MPSZTP process, including for provisioning a runtime OS on the edge devices 1103. The runtime agent 1130-2 is a service that will run on edge devices 1103 (e.g., within the runtime OS provisioned using the firmware-based agent 1130-1). The firmware-based agent 1130-1 and the runtime agent 1130-2 provide various functionality, including but not limited to: requesting actions pending from the control plane 1101; calling home to deliver to the control plane 1101 current status updates (e.g., in accordance with some configurable frequency); receiving update BLOBs (e.g., bundles of software and/or instructions) from the control plane 1101; attesting each BLOB that is received using the edge device 1103's private device key (e.g., from TPM); unpacking the bundle into its BLOB and action package parts; and dispatching each action package for serial execution, or for concurrent execution as per the bundle metadata instructions. In some embodiments, it is desired to share as much code as possible between the firmware-based agent 1130-1 and the runtime agent 1130-2.

The device registry 1124 will maintain information for the various edge devices 1103. Such information may include, but is not limited to, device serial number, device trusted public key (e.g., an ownership token that has been signed using a manufacturer or vendor's CA certificate), a current owner ID (e.g., if any), etc.

The rendezvous server 1114 of the edge device onboarding and provisioning system 1112 acts as a key or interface to the device registry 1124 and the onboarding server 1116 for each of the edge devices 1103. The rendezvous server 1114 includes or has access to metadata that describes all actions that need to be taken to pair edge devices 1103 with bundle IDs that are to be deployed to the edge devices 1103. The rendezvous server 1114 will also generate redirect data packet metadata that will be sent to the edge devices 1103. In some embodiments, the rendezvous server 1114 implements a REST application programming interface (API)-based service (or another API or service) that receives and processes incoming requests from the edge devices 1103.

The partner and application onboarding system 1118 provides partner and application onboarding functionality, including maintaining the partner database 1120 (e.g., for partners) and the application database 1122 (e.g., for applications offered by the partners). The application database 1122 may include various information for each application, including but not limited to: an application ID; application packages; installation instructions (e.g., deployment actions); runtime resources definition; runtime communication requirements; etc.

The application registry or repository 1126 may maintain profiles or templates as objects that are created to drive the deployment process (e.g., for applications, OSes, etc.). Each profile or template object may include a bundle description and ID, including bundle metadata and bundle part inventory. For each bundled application or part thereof, the profile or template object may include an application ID, partner ID, partner package ID, and deployment actions. Each profile or template object may also include a summary of runtime resources and a target device serial number or other ID.

The onboarding server 1116 of the edge device onboarding and provisioning system 1112 provides a REST API-based service (or another API or service) that receives and processes incoming requests from the edge devices 1103, and which dispatches or directs requests from the edge devices 1103. The onboarding server 1116 may maintain a database with a queue of all messages and actions pending for transmission from the control plane 1101 to the edge devices 1103. The onboarding server 1116 will also include a service that prepares bundles for transmission to the edge devices 1103. This bundle preparation service provides various functionality, including but not limited to: preparing the bundle metadata (e.g., with a configurable data structure and key); pulling into the binary image bundle each bundle BLOB; pulling into the binary image bundle the action package; updating bundle metadata; repeating until each part of the bundle has been prepared for transmission to an edge device; creating a checksum of the bundle (e.g., which may be stored in a suitable database); digitally signing the bundle with the edge device's ownership token; and adding the resulting bundle to the transmission queue.

The onboarding server 1116 will further include a service that receives messages from the edge devices 1103 that are intended for action within the control plane 1101. This message receiving service may provide various functionality, including but not limited to: ensuring that each bundle that is sent to an edge device 1103 is acknowledged by that edge device 1103, and for maintaining in a queue the communications sequence of responses and replies until a final required action has been completed; receiving and logging information that has been requested as part of an action package sent to the edge device 1103 to execute upon any binary image bundle BLOB; and logging all transactions in a suitable database, with any log information that was defined in an action package as requiring retention. The onboarding server 1116 will also maintain a database of bundles that have been transmitted to each of the edge devices 1103, pending completion of all actions specified in the action packages thereof. The various actions, in some embodiments, are made auditable.

In some embodiments, MPSZTP processing conforms to various platform security standards, such as National Institute of Standards and Technology (NIST) Special Publication (SP)-800-193 Platform Firmware Resiliency Guidelines, NIST SP-800-207 Zero Trust Architecture, Federal Information Processing Standards Publication (FIPS) 140-3 Security Requirements for Cryptographic Modules, and International Standards Organization (ISO) 28000:2007 Specification for security management systems for the supply chain, etc. MPSZTP processing further enables device integrity assurance functionality, including but not limited to: device tamper detection; boot attestation from POST through OS hand-over; continuous Chain-of-Trust from POST via TPM; secure boot with end-to-end cryptographic support; OS MOK cryptographically signed key to device only; OS boot processes which cannot be interrupted or intercepted; hardware configuration change detection and notification; measured boot processing; FIDO compliant secure on-boarding; trusted execution environment (e.g., meeting NIST SP-800-207 Zero Trust Architecture specifications); etc.

MPSZTP further enables IO port control, with internal and external IO ports of edge or other computing devices being set to a default "deny" setting, and ports enabled by policy only when required. Further, USB ports of edge or other computing devices configured for MPSZTP processing are made non-bootable, such that control of such devices may be maintained from the control plane as described elsewhere herein. Using MPSZTP processing, all storage devices may be encrypted (e.g., using cryptographic keys in TPM only, such as a suitable International Telecommunication Union (ITU) X.509 PKI MOK). Further, hardware change control is provided, where all hardware changes must be pre-approved to safe-boot, and where unsafe-boot conditions are capable of being remediated.

Using MPSZTP, an edge or other computing device may be shipped as a "blank" device (e.g., with all storage media blank and all ports disabled). The blank device is configured with MPSZTP for firmware-based secure provisioning (e.g., over a network such as Ethernet, WiFi, 5G, etc.). This conforms to best security practices, with zero trust (e.g., no USB ports, no OS) and trusting the device first as bare metal. In some cases, the firmware-based secure provisioning may be enabled using a USB key, although in other cases USB key provisioning is not permitted for added security and control. The boot device will be unlocked only when a signed OS is validated. MPSZTP also enables devices to be repurposed or reprovisioned in a location independent manner. Using MPSZTP, a device may also be "reset" (e.g., a factory reset). Through the use of MPSZTP, continuity of an unbroken hardware-based root of trust is maintained (e.g., through the firmware-based onboarding and deployment, the ability to sign trusted OS images with a hardware secure key for pre-boot time OS attestation and validation, an unbroken root of trust through the OS, and meeting requirements that secure OS initiation occurs without the ability to intercept or interfere with root processing thus lowering intervention and malicious activity risks). MPSZTP processes may maintain SDO protocols (e.g., as described in further detail below), while adding a DHCP/DNS pre-resolver for the in-field ability to controllably relocate devices (e.g., via the control plane).

MPSZTP meets various challenges and needs. UEFI firmware "personality" may be set in the factory at manufacture of a computing device, with default normal firmware behavior also being maintained through the use of special personality flags which will be set as described in further detail elsewhere herein. Using such personality flags, a computing device (e.g., an edge device) may be "downgraded" to a traditional personality or default normal firmware in the field. To maintain security and control, such downgrade functionality may be made a one-way switch only.

MPSZTP processing provides the ability to deploy, attest and provision computing devices remotely, with no physical IT staff presence required. This advantageously lowers customer costs through the elimination of System Integration (SI) overheads (e.g., including the removal of "second touch" and distribution of SI engineers for integration). MPSZTP processing may be used for self-healing and self-annealing of deployed devices, with the in-field capability to reset devices to "factory clean" condition (e.g., with nothing installed thereon and clean disks). Using MPSZTP, late binding and configuration of devices is enabled, as well as dark site deployments. Devices are vulnerable for interception and injection in the supply chain, but MPSZTP mitigates such risks.

In some embodiments, MPSZTP is enabled through a firmware-based agent that utilizes UEFI code (e.g., a UEFI_OS micro agent as described above and elsewhere herein). Advantageously, hardware attestation is included in such UEFI code. Hardware attestation may utilize PCP as per TCG specifications. Further, consistent hardware attestation is provided without requiring use of a BMC thus lowering costs where it is most significant. MPSZTP enables OS signing per device, using a per-device MOK key (e.g., providing anti-piracy measurement, enabling executables that can only be run on assigned devices, etc.). MPSZTP processing also provides a universal solution for all platforms (e.g., Intel®/AMD® (X86_64), ARM64 (AARCH64)). MPSZTP processing also enables device safety in untrusted environments through a pull method for all control operations, location independent provisioning and operation, implementation of a fully trusted execution environment, etc. Through providing hardware attestation in UEFI code, consistent hardware attestation may be provided even where no remote access controller (e.g., an Integrated Dell Remote Access Controller (iDRAC)) is present.

Figure 12:
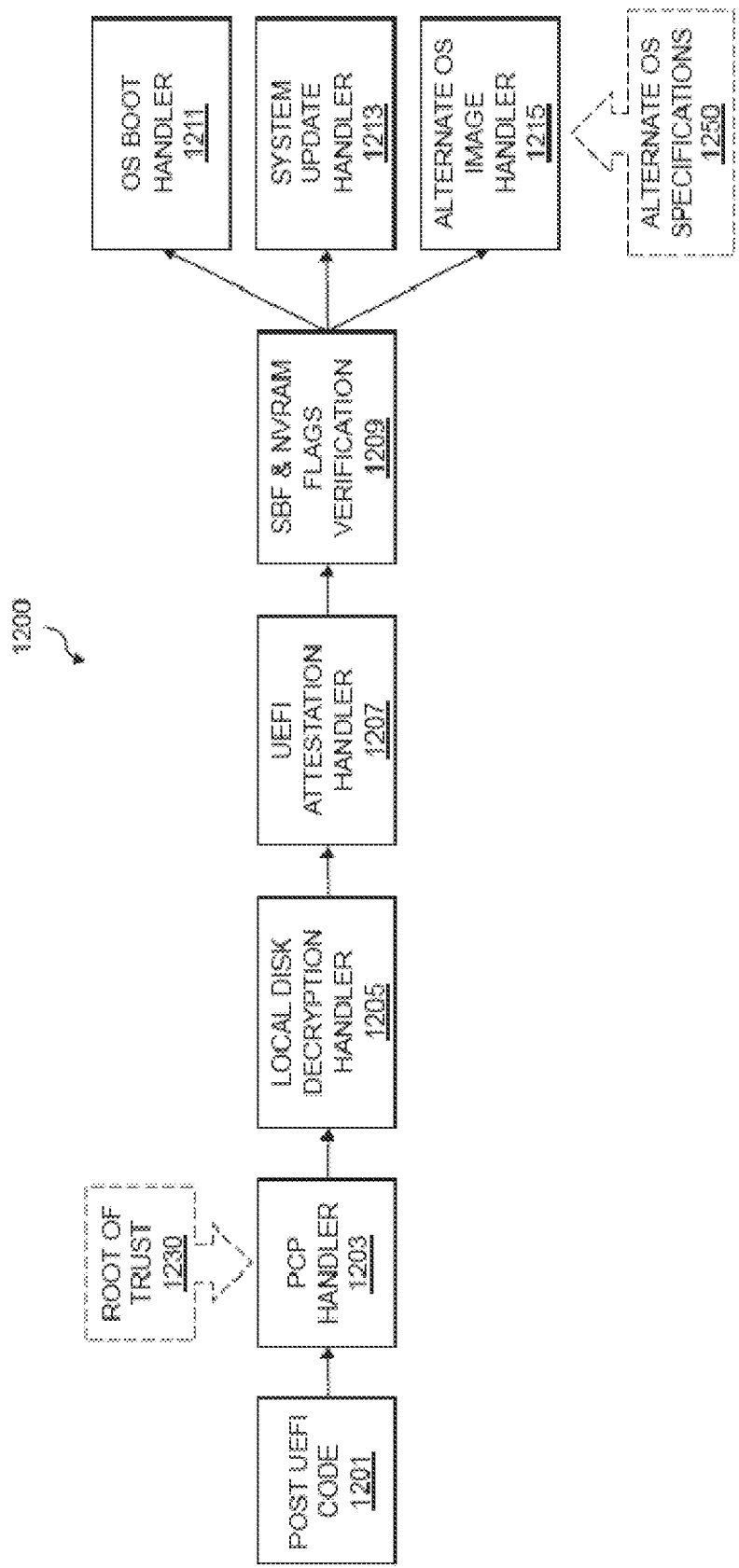
FIG. 12 shows a process flow of capabilities of a firmware-based agent configured for multi-phase secure zero touch provisioning in an illustrative embodiment.

Firmware capabilities of an edge or other computing device configured for MPSZTP will now be described in further detail. FIG. 12 illustrates a system flow 1200 for firmware capabilities of a computing device configured for MPSZTP. POST UEFI code 1201 is initialized, and processing then passes to the PCP handler 1203 providing a root of trust 1230. Processing then proceeds to a local disk decryption handler 1205 (e.g., to decrypt disks if needed), and a UEFI attestation handler 1207 (e.g., to provide hardware attestation of a device), and then to SBF and NVRAM flags verification 1209. Based on the SBF and NVRAM flags verification 1209, processing will then proceed to an OS boot handler 1211, a system update handler 1213 or an alternate OS image handler 1215 having alternate OS specifications 1250 to be determined via an OS installation processor. The OS boot handler 1211 enables booting to a secure, signed OS (e.g., provisioned on the device using MPSZTP processing via the system update handler 1213). The system update handler 1213 is used for MPSZTP processing. The alternate OS image handler 1215 handles booting to other OSes.

Figure 13:
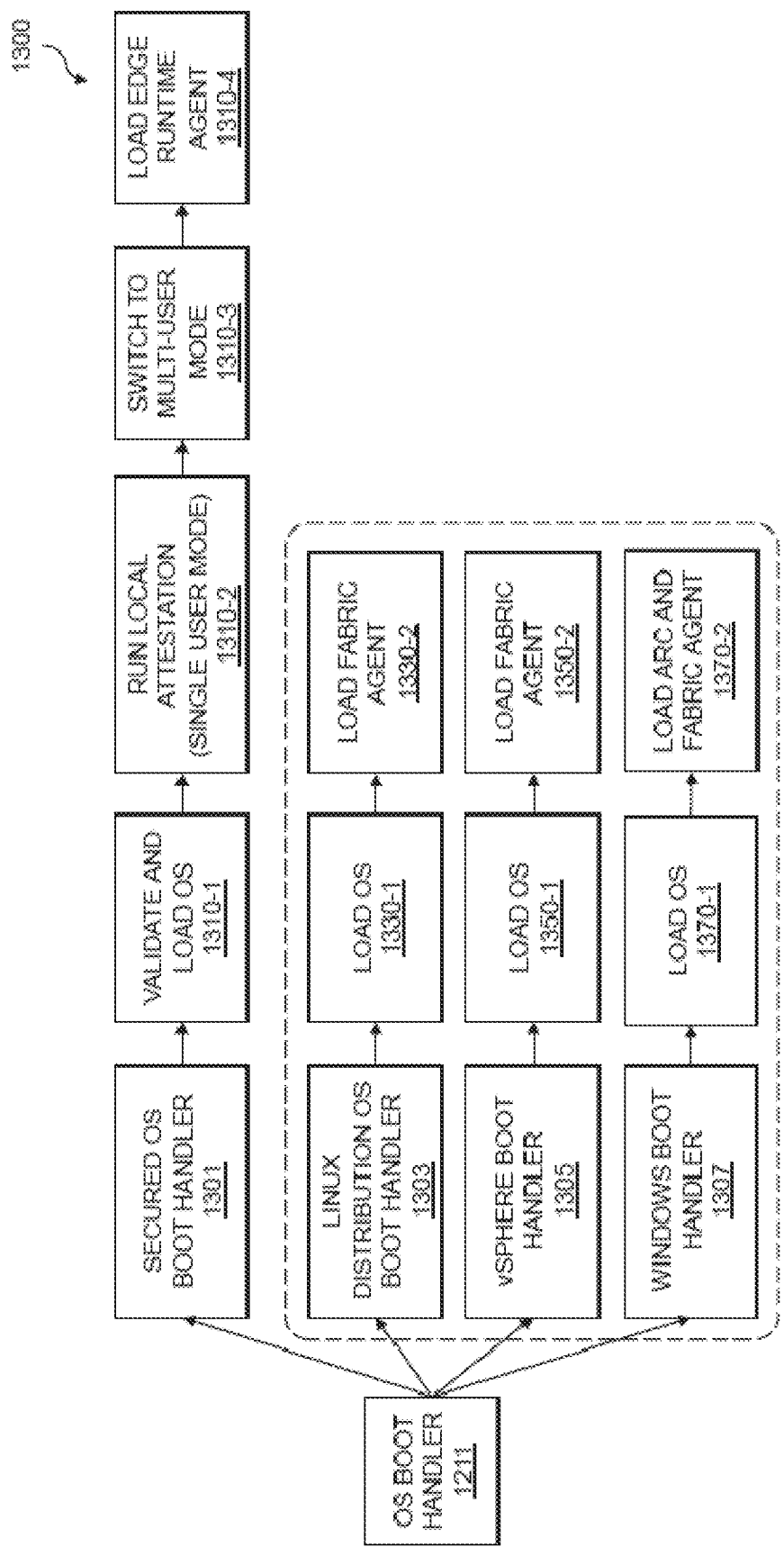
FIG. 13 shows processing flows enabled using an operating system boot handler of the firmware-based agent of FIG. 12 in an illustrative embodiment.

FIG. 13 shows a process flow 1300 of operations of the OS boot handler 1211. From the OS boot handler 1211, several processing paths may be followed, including proceeding to a secured OS boot handler 1301 (e.g., a secure OS provisioned using MPSZTP processing), as well as various other OS boot handling via a Linux distribution OS boot handler 1303, a VMware vSphere® or other server virtualization OS boot handler 1305, a Microsoft Windows® OS boot handler 1307, etc. The non-secured OS boot handlers 1303, 1305 and 1307 in some embodiments are compatible with the UEFI OS Boot Loader process that utilizes the Shim method. The secured OS boot handler 1301, however, may avoid use of the shim/grand unified bootloader (GRUB) combination for security reasons. The non-secured OS boot handlers 1303, 1305 and 1307 (e.g., using a non-secured traditional UEFI OS Boot Loader) can be provisioned using UEFI micro OS-based tooling that benefits from the MPSZTP enabled step-wise sequential deployment of such unsecured runtime OSes and any software applications that may be deployed to the unsecured runtime OSes, but without the restricted and secured boot signing processes specified for use with the secured OS boot handler 1301. In the secured OS boot handler 1301 path, processing proceeds to validate and the load the OS 1310-1, followed by running local attestation in a single user mode 1310-2. A switch may then be made to a multi-user mode 1310-3, and an edge runtime agent (e.g., 1130-2) is loaded 1310-4. The boot handlers 1303, 1305 and 1307 are examples of unsecured boot handlers (e.g., for booting OSes not provisioned and secured or signed using MPSZTP processing). From the boot handlers 1303, 1305 and 1307, processing proceeds to load the associated OS 1330-1, 1350-1 and 1370-1, and then to loading fabric agents 1330-2, 1350-2 and 1370-2. In the Windows OS boot handler 1307 path, loading the fabric agent 1370-2 may include loading Microsoft Azure Arc™.

FIGS. 14A-14E show a process flow 1400 of operations of the system update handler 1213, which may be viewed as providing a BLOB template metadata sequencer 1231. The system update handler 1213 may follow various processing paths, such as a FIDO onboarding processing path 1401, a download instruction handler processing path 1403, a local storage handler processing path 1405, and a payload processor path 1407. Details of the paths 1401, 1403, 1405 and 1407 are illustrated in FIGS. 14B, 14C, 14D and 14E, respectively.

Figure 14A:
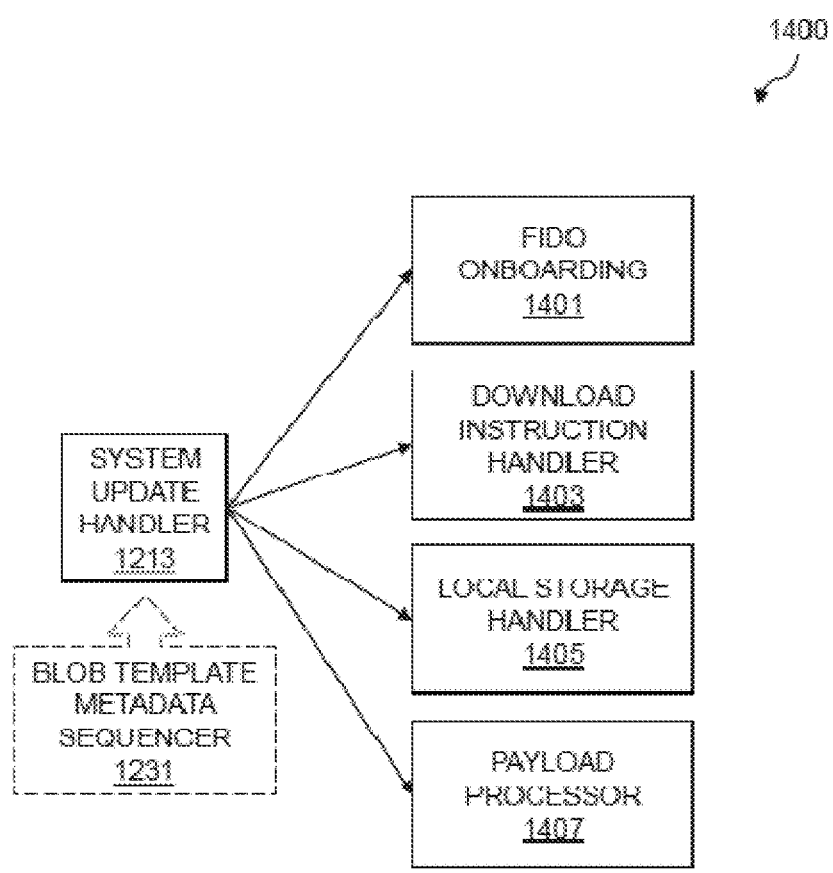
FIGS. 14A-14E show processing flows enabled using a system update handler of the firmware-based agent of FIG. 12 in an illustrative embodiment.
Figure 14B:
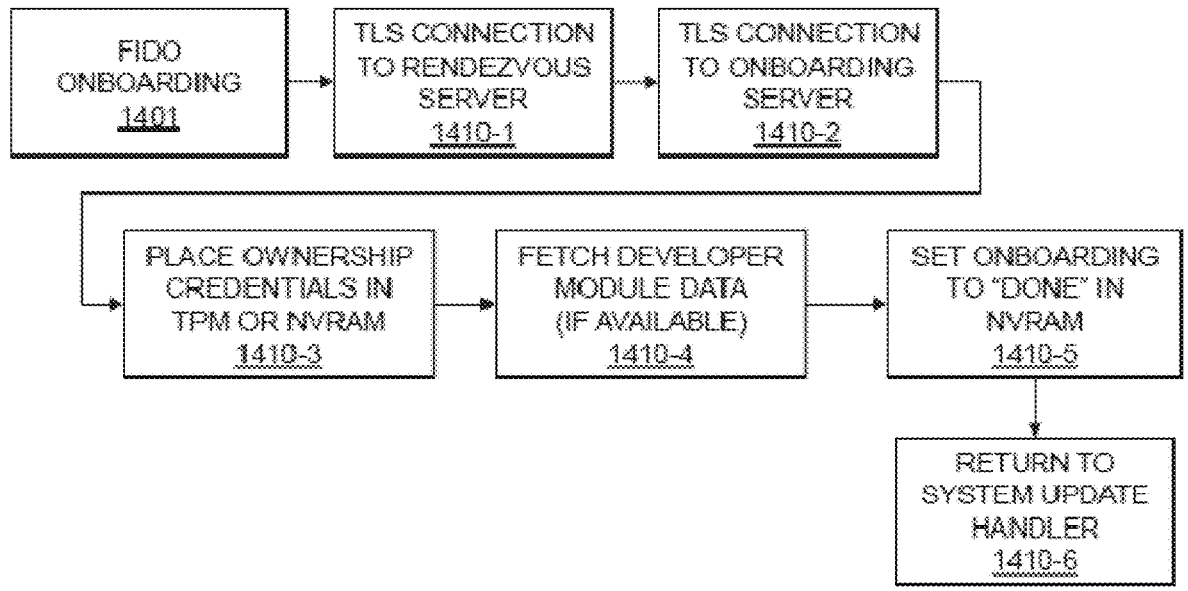

FIG. 14B shows the FIDO onboarding processing path 1401, which includes establishing a TLS or other secured connection to a rendezvous server 1410-1 (e.g., rendezvous server 1114), establishing a TLS or other secured connection to an onboarding server 1410-2 (e.g., onboarding/provisioning server 1116), placing ownership credentials in a TPM or NVRAM 1410-3, fetching developer module (DevMod) data 1410-4 (if available), setting onboarding to "done" in NVRAM 1410-5, and returning 1410-6 to the system update handler 1213.

Figure 14C:
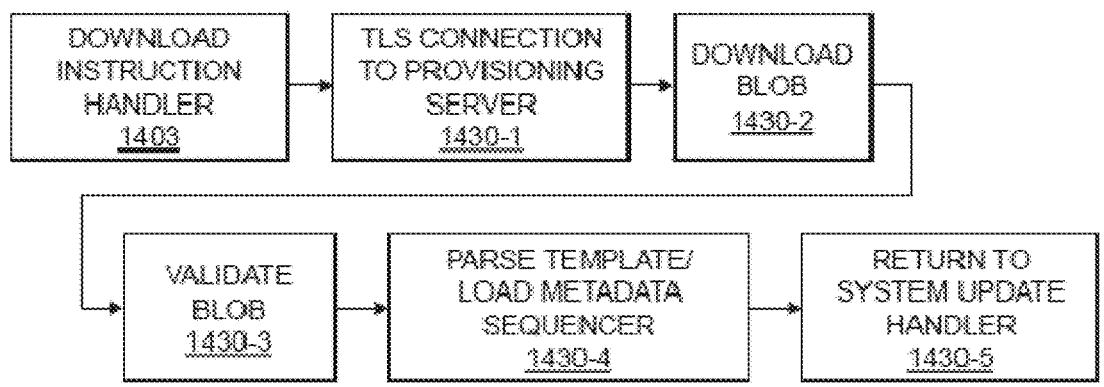

FIG. 14C shows the download instruction handler processing path 1403, which includes establishing a TLS or other secure connection to a provisioning server 1430-1 (e.g., onboarding/provisioning server 1116), downloading one or more BLOBs 1430-2, validating the one or more BLOBs 1430-3, parsing a template and loading a metadata sequencer specified in the validated BLOBs 1430-4, and returning 1430-5 to the system update handler 1213.

Figure 14D:
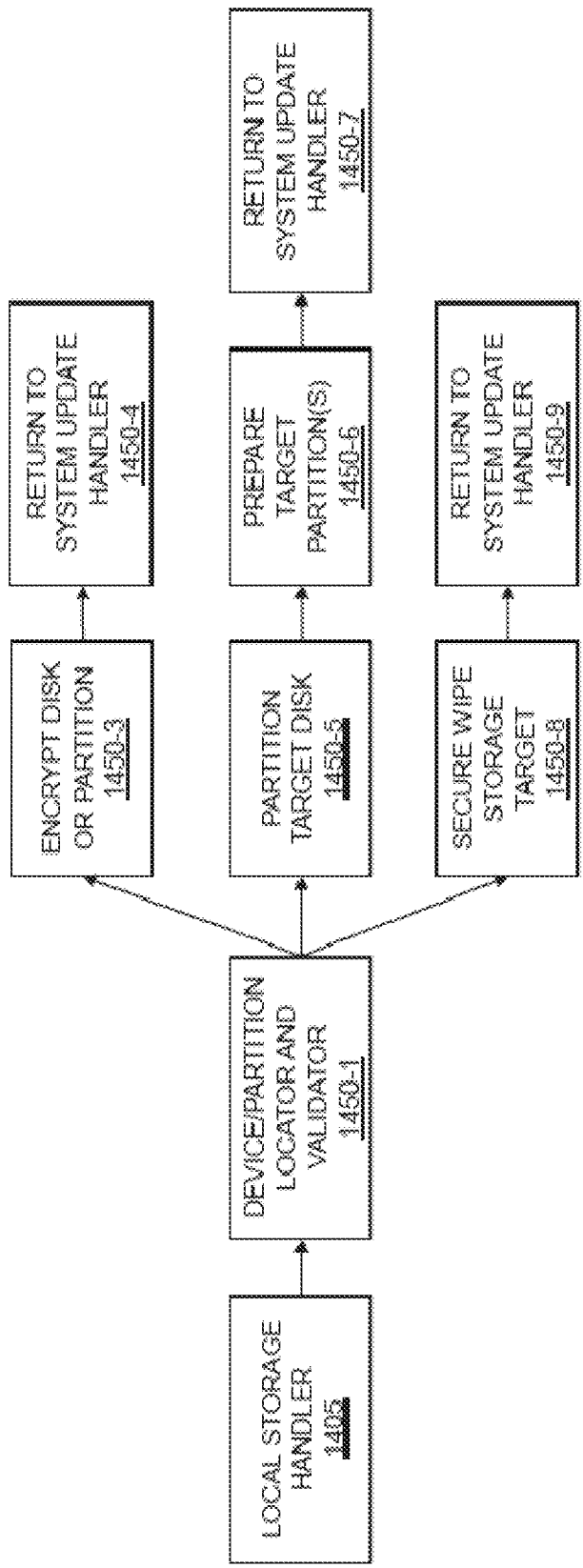

FIG. 14D shows the local storage handler processing path 1405, which includes utilizing a device/partition locator and validator 1450-1 to enter one of the three processing paths. The first path includes encrypting a disk or partition 1450-3 and then returning 1450-4 to the system update handler 1213. The second path includes partitioning a target disk 1450-5, preparing one or more target partitions on the partitioned target disk 1450-6, and returning 1450-7 to the system update handler 1213. The third path includes performing a secure wipe of one or more storage targets 1450-8, and returning 1450-9 to the system update handler 1213.

Figure 14E:
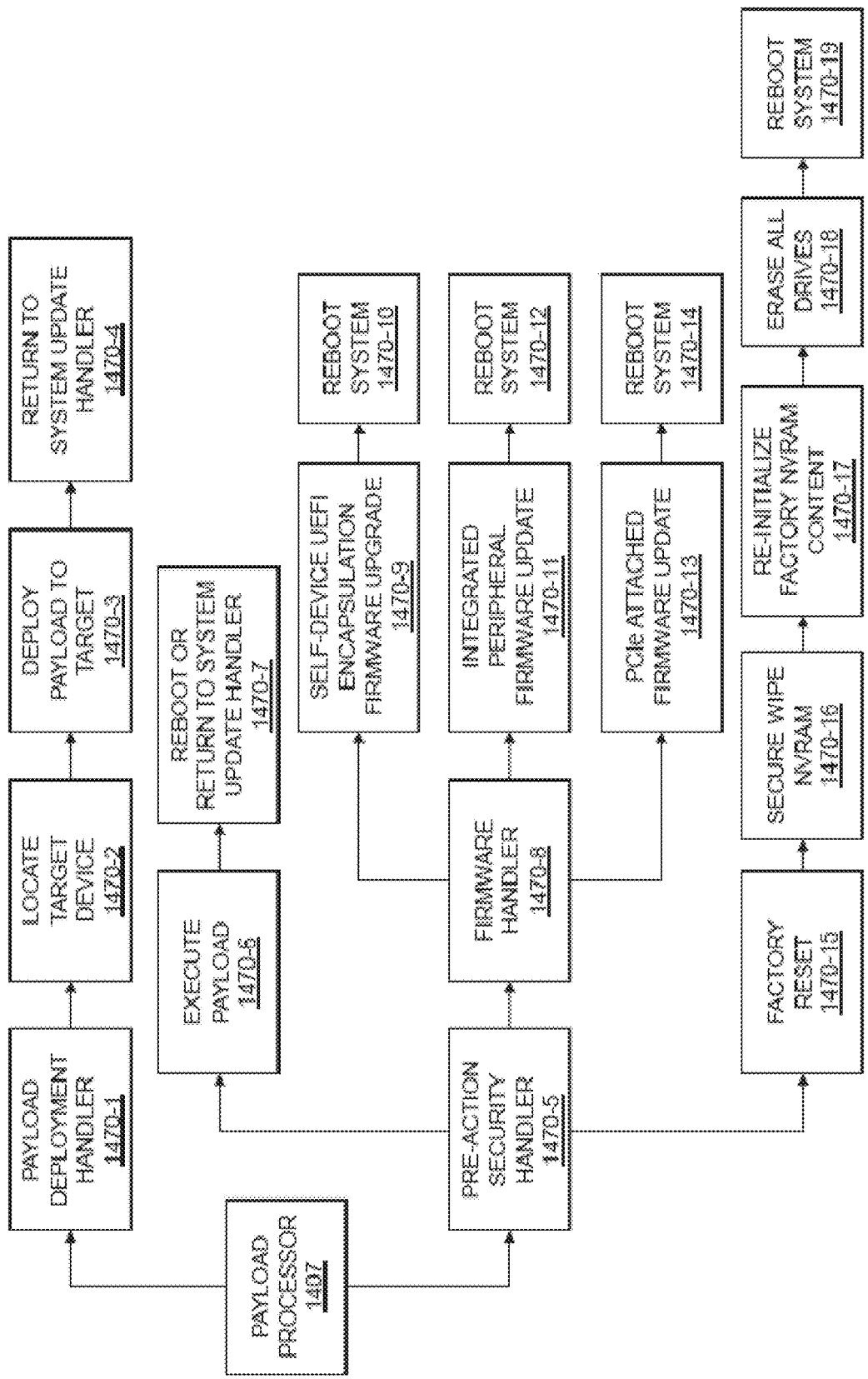

FIG. 14E shows the payload processor path 1407, which may include utilizing a payload deployment handler 1470-1 or a pre-action security handler 1470-5. The payload deployment handler 1470-1 is used to deploy a payload (e.g., from one or more BLOBs obtained via the download instruction handler processing path 1403), and includes locating a target device 1470-2, deploying the payload to the target 1470-3, and returning 1470-4 to the system update handler 1213. The pre-action security handler 1470-5 may follow one of three paths. The first path includes executing a payload 1470-6, where the payload may have been deployed to a target using the payload deployment handler 1470-1. After executing the payload 1470-6, processing either reboots the system or returns 1470-7 to the system update handler 1213. The second path includes a firmware handler 1470-8 which may follow one of three firmware sub-paths. The first firmware sub-path includes self-device UEFI encapsulation firmware upgrade 1470-9 followed by reboot 1470-10 of the system. The second firmware sub-path includes integrated peripheral firmware update 1470-11 also followed by reboot 1470-12 of the system. The third firmware sub-path includes Peripheral Component Interconnect Express (PCIe) attached device firmware update 1470-13, also followed by reboot 1470-14 of the system. The third path from the pre-action security handler 1470-5 is performing a factory reset 1470-15, which includes performing a secure wipe of NVRAM 1470-16, re-initializing factory NVRAM content 1470-17, erasing all drives 1470-18, and rebooting 1470-19 the system.

It should be noted that the MPSZTP processing enables the system update handler 1213 to iterate through multiple phases along different ones of the processing paths shown and described with respect to FIGS. 14A-14E. As described above, various of such paths end with returning to the system update handler 1213, such that another processing path (or another instance of the same processing path) may be executed. For example, processing may proceed initially to FIDO onboarding processing path 1401, followed by multiple instances of the download instruction handler processing path 1403 (e.g., to download different BLOBs for installing a secure OS, or applications or functionality thereof, on the system), and multiple instances of the payload processor path 1407 (e.g., to actually install the secure OS or applications or functionality thereof on the system). During such processing of installing the secure OS (or applications or functionality thereof), the local storage handler processing path 1405 may be used to prepare the system by appropriately preparing the disks or storage where the secure OS, or applications or functionality thereof, is to be installed. Various other examples are possible, such as where the system update handler 1213 is entered after a secure OS has already been installed thereon (e.g., to update firmware thereof utilizing the firmware handler 1470-8 in the payload processor path 1407, to perform a factory reset 1470-15, etc.). It will be appreciated that any desired number and sequence of such processing paths may be used to implement different phases of MPSZTP of a particular device.

Figure 15:
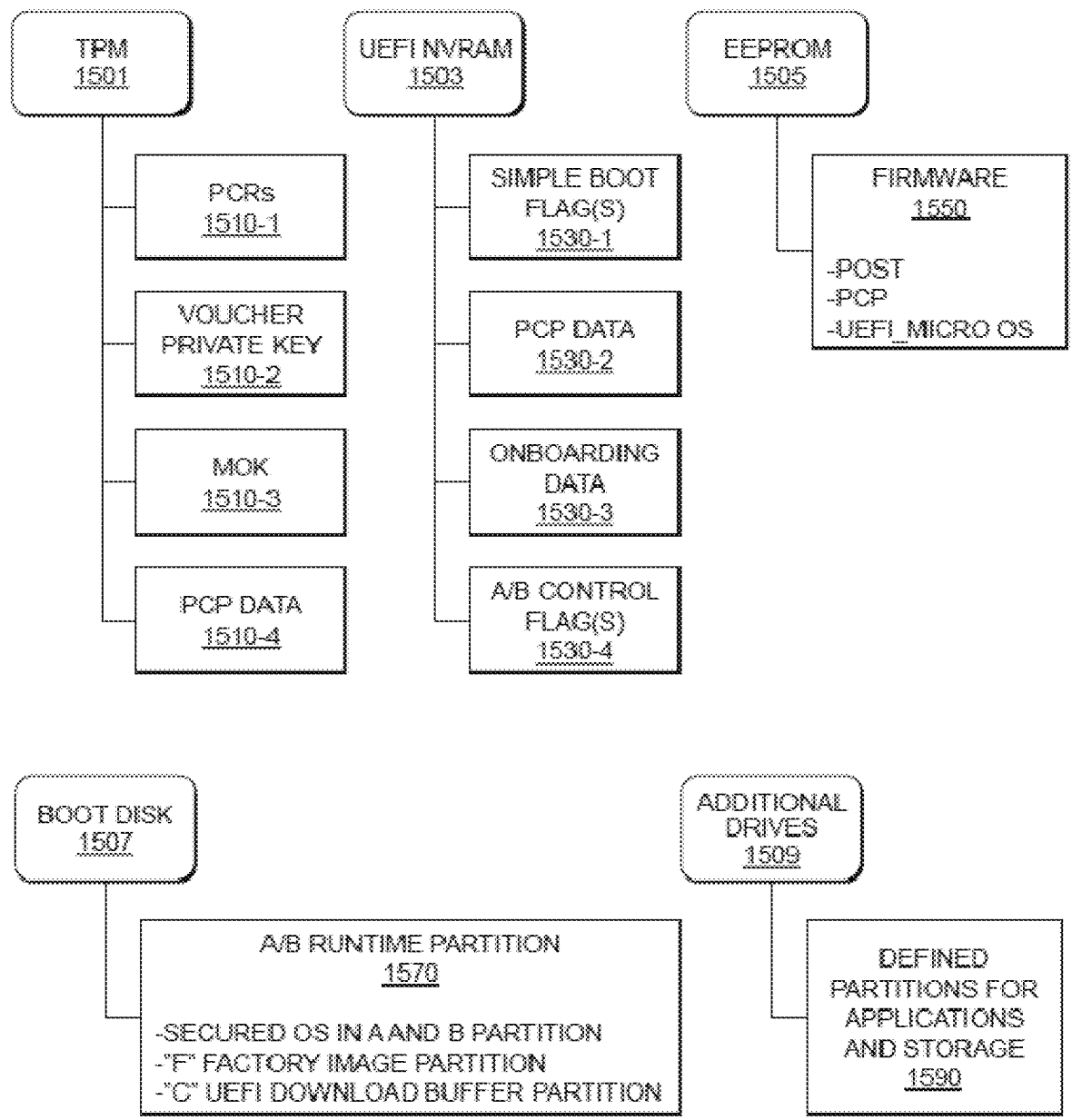
FIG. 15 shows data stored in various storage locations of a computing device configured with firmware-based and runtime agents configured for multi-phase secure zero touch provisioning in an illustrative embodiment.

FIG. 15 shows examples of storage locations (e.g., persistent storage locations) where various information that is to be utilized during MPSZTP may be stored. Such storage locations include the TPM 1501, UEFI NVRAM 1503, Electronically Erasable Programmable Read-Only Memory (EEPROM) 1505, boot disk 1507, and additional drives 1509. The TPM 1501 may store PCRs 1510-1, a voucher private key 1510-2, MOK 1510-3 and PCP data 1510-4. The UEFI NVRAM 1503 may store the SBF 1530-1, PCP data 1530-2, onboarding data 1530-3 (e.g., FDO onboarding data), and A/B control flags 1530-4 (e.g., for A and B OSes). The EEPROM 1505 may store all firmware 1550, including firmware for POST, PCP and the UEFI_OS micro kernel (e.g., a firmware-based agent). The boot disk 1507 may store an A/B runtime partition 1570, including a secured OS in "A" and "B" partitions, a factory image partition, and a "C" UEFI download buffer partition. The additional drivers 1509 may store defined partitions 1590 for applications and storage.

Figure 16:
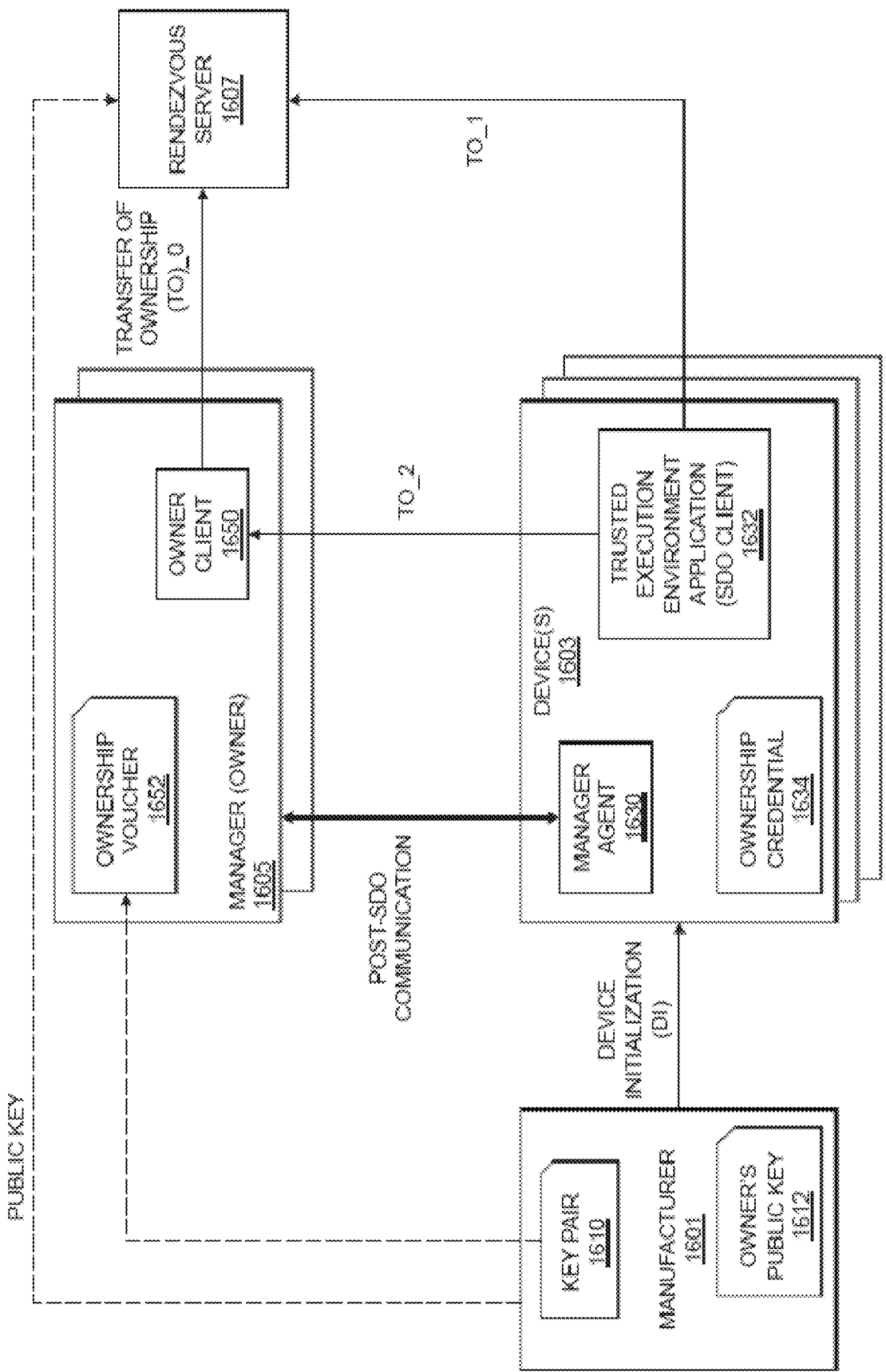
FIG. 16 shows a system flow for a secure device onboarding protocol that may be enabled utilizing multi-phase secure zero touch provisioning in an illustrative embodiment.

FIG. 16 shows an example of an FDO or SDO protocol, involving a manufacturer 1601, one or more devices 1603, a manager or owner 1605, and a rendezvous server 1607. The manufacturer 1601 manufactures the devices 1603. The manufacturer 1601 has an associated key pair 1610 and the owner's public key 1612. The devices 1603 implement a manager agent 1630 and a trusted execution environment (TEE) application (e.g., an FDO/SDO client 1632), and have an ownership credential 1634. The manager or owner 1605 of the devices 1603 implements an owner client 1650 and has an ownership voucher 1652. The devices 1603 may be shipped from the manufacturer 1601 (e.g., to one or more customer locations) independent of the ownership voucher 1652, and ownership may be transferred multiple times until the devices 1603 are powered on. The rendezvous server 1607 enables multiple instances of the manager 1605 to each register a range of devices which that manager 1605 owns. Device initialization (DI) includes the key pair 1610 of the manufacturer 1601 being used to create an initial credential and ownership voucher. The manufacturer 1601's certificate (e.g., public key 1612) is published to the rendezvous server 1607. A device string is configured by the manufacturer 1601 and rendezvous server 1607 uniform resource locator (URL).

Transfer of ownership (TO) will now be described. TO may involve multiple steps or phases, denoted TO_0, TO_1 and TO_2. In TO0, the owner client 1650 has the device ID, ownership voucher 1652, private key and IP address of the manager 1605. The owner client 1650 registers with the rendezvous server 1607 using the device ID and ownership voucher 1652. The rendezvous server 1607 verifies the manufacturer 1601's public key from the ownership voucher 1652, and sets a timer to wait for TO_1. If the device 1603 does not contact the rendezvous server 1607 within a set time interval, the rendezvous server 1607 clears registration and the owner client 1650 must repeat TO_0. TO_1 includes the device 1603 contacting the rendezvous server 1607 with the device ID, and the rendezvous server 1607 returning the manager's URL. TO_2 includes the device 1603 reaching out to the owner client 1650. The manager 1605 proves possession of the private key to the device 1603, and sends the ownership voucher 1652. The device 1603 verifies the chain of trust in the ownership voucher 1652, and the manager 1605 resets the credentials. The manager 1605 and device 1603 may then perform any required post-SDO communication.

The rendezvous server 1607 may provide various discovery options, including those specified in: Internet Engineering Task Force (IETF) Request for Comments (RFC) 8572 Secure Zero Touch Provisioning (SZTP)—DHCP option via 143 SZTP server address; IETF RFC 8552 Scoped Interpretation of DNS Resource Records through "Underscored" Naming of Attribute Leaves—DNS resource record locator; etc. In some embodiments, the rendezvous server 1607 may have URLs "rendezvous.customer.com" and "rendezvous.provider.com" where "provider" may be the name of the manufacturer 1601, the manager or owner 1605, etc. For air-gapped devices, Yubico® or a 4G-enabled gateway may be utilized. Yubico Yubikey®, for example, may utilize OpenPGP, Open Authentication Time-Based One-Time Password (OATH-TOTP), a Personal Identity Verification (PIV) smartcard interface, FIDO Universal 2nd Factor Authentication (U2F) or FIDO2, and configuration sets for enabling authentication in air-gapped device scenarios.

Figure 17:
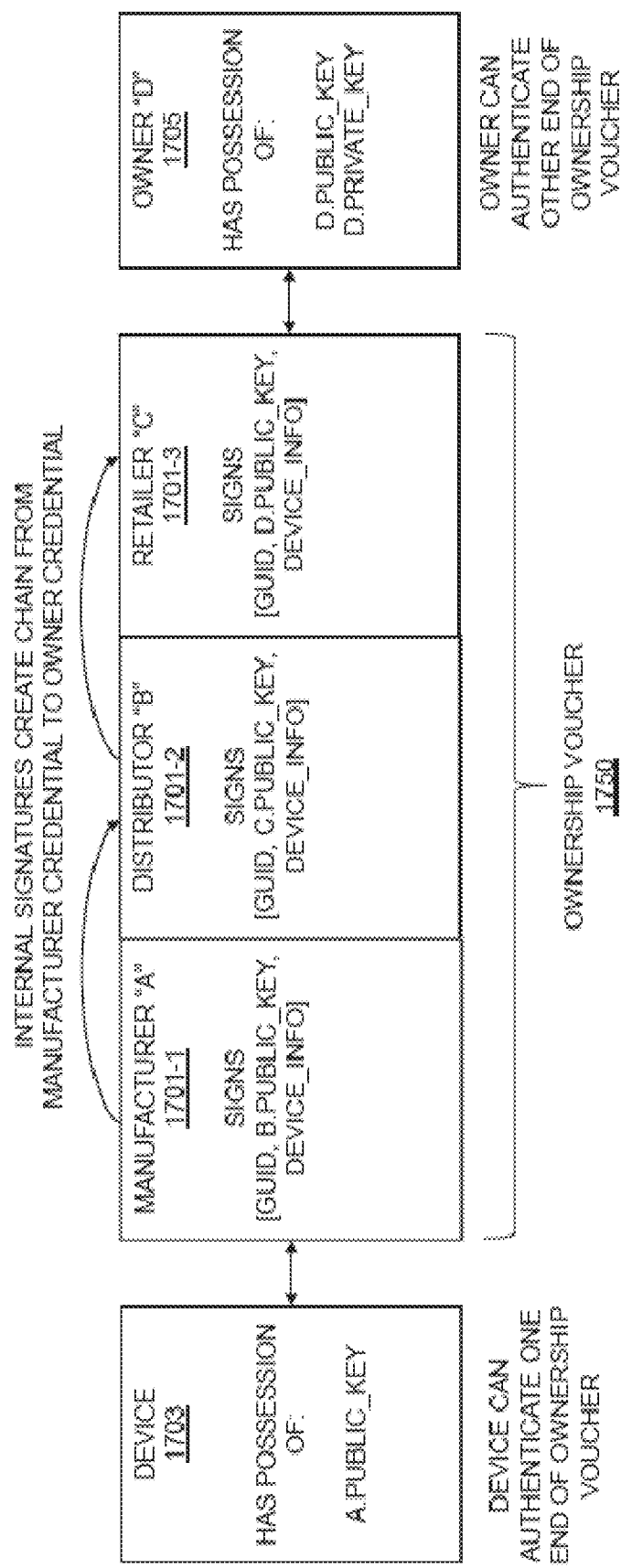
FIG. 17 shows generation of an ownership voucher utilized in secure device onboarding of computing devices in an illustrative embodiment.

FIG. 17 illustrates details of an ownership voucher 1750 that is processed by a manufacturer "A" 1701-1, a distributor "B" 1701-2, and a retailer "C" 1701-3. The manufacturer 1701-1, distributor 1701-2, and retailer 1701-3 provide internal signatures which create a chain from the manufacturer to owner credential in the ownership voucher. The manufacturer 1701-1 signs the ownership voucher 1750 with [GUID, B.Public_Key, Device_Info], the distributor 1701-2 signs the ownership voucher 1750 with [GUID, C.Public_Key, Device_Info], and the retailer 1701-3 signs the ownership voucher 1750 with [GUID, D.Public_Key, Device_Info]. The device 1703 can authenticate one end of the ownership voucher 1750, as it has possession of A.Public_Key. The owner "D" 1705 can authenticate the other end of the ownership voucher 1750, as it has possession of D.Public_Key and D.Private_Key. The ownership voucher 1750 is a structured digital document that links the manufacturer 1701-1 with the owner 1705, and includes a chain of signed public keys. Each signature of a public key authorizes the possessor of the corresponding private key to take ownership of the device 1703 or pass ownership through another link in the chain. The signatures in the ownership voucher 1750 thereby create a chain of trust from the manufacturer 1701 to the owner 1705.

Ownership voucher signing includes initializing a TEE with a hash of the manufacturer 1701-1 public key (A.Public_Key). Voucher signing includes encoding the owner 1705's public key and signing using the manufacturer 1701-1's private key, and updating the ownership voucher 1750. The first transfer (e.g., from a first owner to a second owner) of the ownership voucher 1750 includes encoding the second owner's public key and signing using the first owner's private key, and updating the voucher. In the FIG. 17 example, the transfer between the manufacturer 1701-1 and the distributor 1701-2 would thus include the manufacturer 1701-1 encoding the distributor 1701-2's public key (B.Public_Key) and signing using the manufacturer 1701-1's private key (A.Private_Key). Similar processing would be utilized for transfer of the ownership voucher 1750 from the distributor 1701-2 to the retailer 1701-3, and so on.

Verification of the ownership voucher 1750 may proceed as follows. The owner 1705 may sign a nonce using its private key (D.Private_Key), and send the ownership voucher 1750 with the signature (the signed nonce) to the device 1703. The device 1703 verifies the nonce using the owner 1705's public key (D.Public_Key), which verifies that the owner 1705 has the corresponding private key (D.Private_Key). The device 1703 then gets the manufacturer 1701-1's public key (A.Public_Key) from the first entry of the ownership voucher 1750, and verifies the hash of the manufacturer 1701-1's public key stored in its TEE. The device 1703 can then verify the signatures of the ownership voucher 1750 in sequence, until it comes to the owner 1705's public key (D.Public_Key), which is the last entry of the ownership voucher 1750. This means that the chain of ownership is trusted.

Figure 18A:
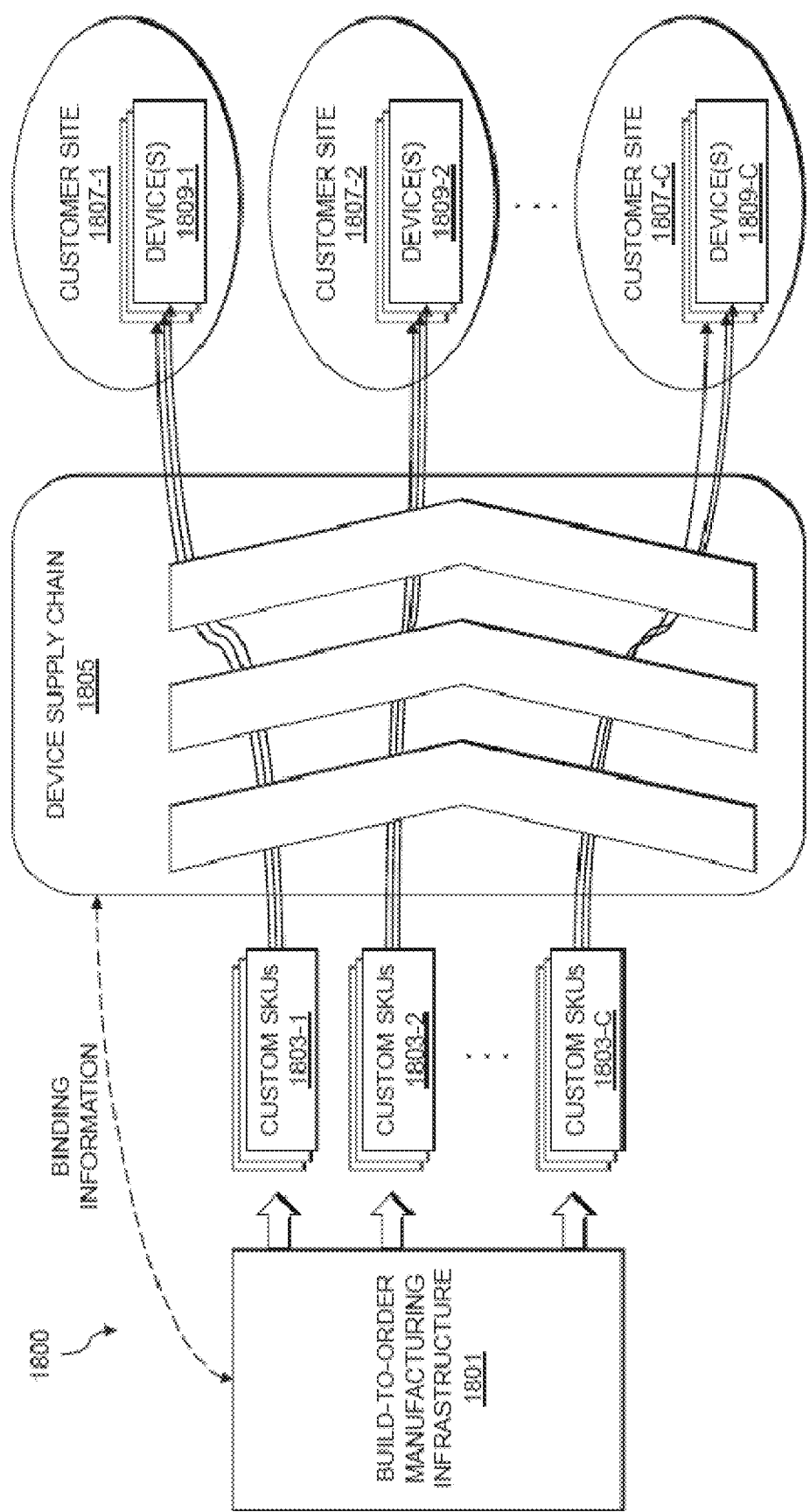
FIGS. 18A and 18B show systems configured for zero touch provisioning without and with the use of late binding utilizing a secure device onboarding protocol in an illustrative embodiment.
Figure 18B:
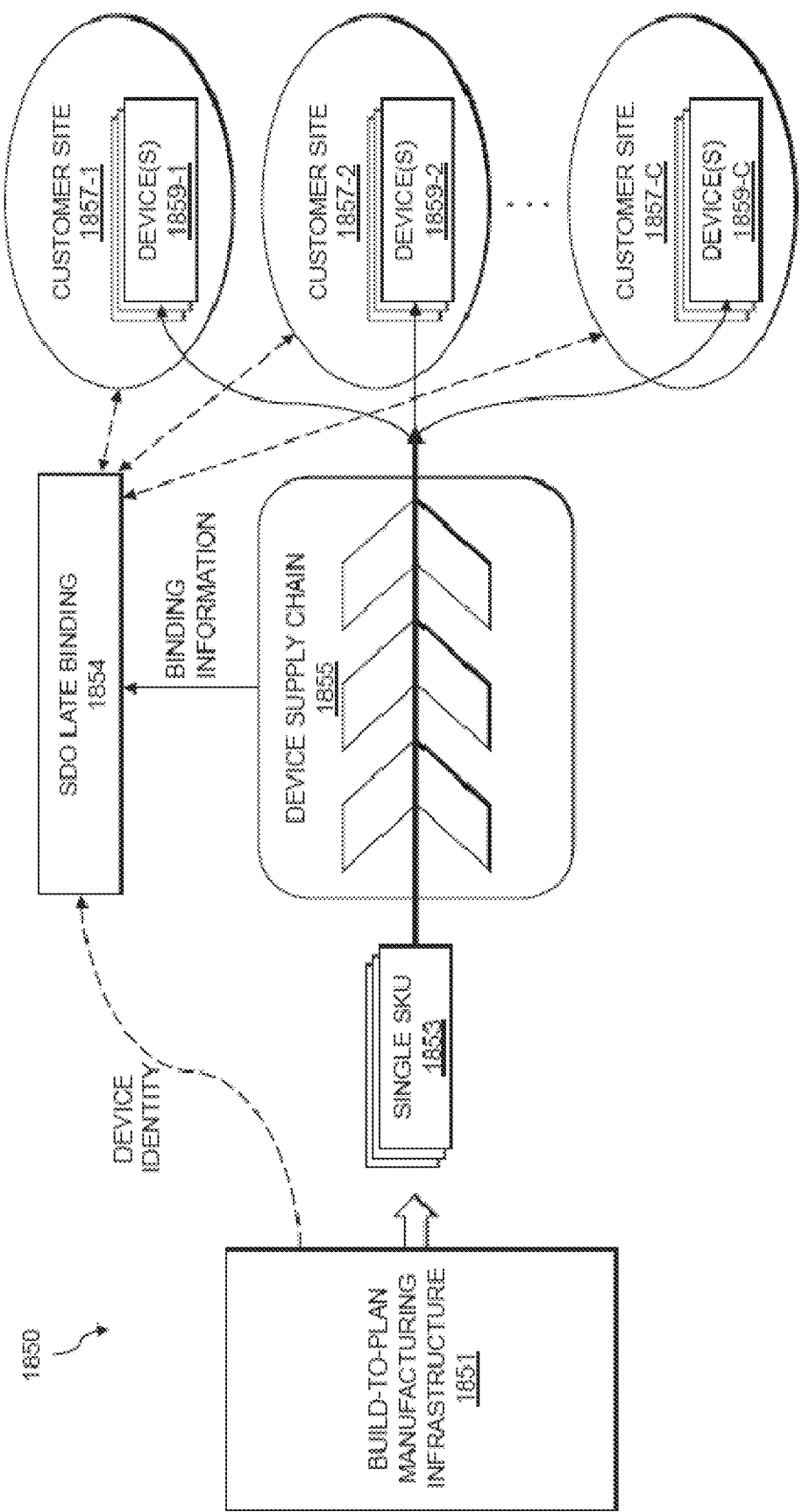

SDO and FDO onboarding specifications may be used for onboarding of devices in some embodiments, and provide functionality for delivering binding at the "end" of the supply chain as illustrated in FIGS. 18A and 18B. FIG. 18A illustrates a system 1800 for zero touch provisioning without FIDO. The system 1800 includes a build-to-order manufacturing infrastructure 1801, which generates sets of custom stock-keeping units (SKUs) 1803-1, 1803-2, . . . 1803-C (collectively, custom SKUs 1803) which are used by different customers 1807-1, 1807-2, . . . 1807-C (collectively, customers 1807). Devices 1809-1, 1809-2, . . . 1809-C (collectively, devices 1809) built using the custom SKUs 1803-1, 1803-2, . . . 1803-C, respectively, are deployed via a device supply chain 1805 from the build-to-order manufacturing infrastructure 1801 to the customers 1807 (e.g., at different customer sites). Binding information is shared between the build-to-order manufacturing infrastructure 1801 and the device supply chain 1805. In some cases, the devices 1809 comprise IoT devices, and the device supply chain 1805 is an IoT device supply chain. The system 1800 provides zero touch provisioning without FIDO, where IoT device software and security customization happens during manufacturing resulting in a complicated build-to-order manufacturing infrastructure 1801 with many different custom SKUs 1803, small lot sizes, long lead times, and higher cost.

FIG. 18B illustrates a system 1850 for zero touch provisioning with FIDO. The system 1850 includes a build-to-plan manufacturing infrastructure 1851, which generates a single SKU 1853 (or relatively few SKUs) which are used by customers 1857-1, 1857-2, . . . 1857-C (collectively, customers 1857). Devices 1859-1, 1859-2, . . . 1859-C (collectively, devices 1859) built using the SKU 1853 are deployed via a device supply chain 1855 from the build-to-plan manufacturing infrastructure 1851 to the customers 1857 (e.g., at different customer sites). Here, an SDO late binding system 1854 is provided, which receives device identity information from the build-to-plan manufacturing infrastructure 1851 and which receives binding information from the device supply chain 1855. The customers 1857 interact with the SDO late binding system 1854 to enable late binding of the devices 1859. Late binding advantageously reduces costs and complexity in the device supply chain 1855 (e.g., through the use of a single SKU 1853 or relatively few SKUs used by multiple customers 1857). In some cases, the devices 1859 comprise IoT devices, and the device supply chain 1855 is an IoT device supply chain. The system 1850 provides zero touch provisioning with FIDO, where device software and security customization for the devices 1859 happens at the end of the device supply chain 1855. This provides numerous benefits through a simplified build-to-plan manufacturing infrastructure 1851, fewer SKUs (e.g., a single SKU 1853 in some embodiments), large lot sizes, enabling stocking distributors, lower customization cost, etc. As a result, the system 1850 enables increased supply chain volume and velocity.

SDO and FDO enable unified provisioning which scales across ecosystems (e.g., using different system architectures, such as Intel®, AMD®, ARM, etc.), for different original equipment manufacturers (OEMs) and original design manufacturers (ODMs), and across different cloud and IoT platforms. SDO and FDO may also utilize various standards, including open source standards.

Figure 19:
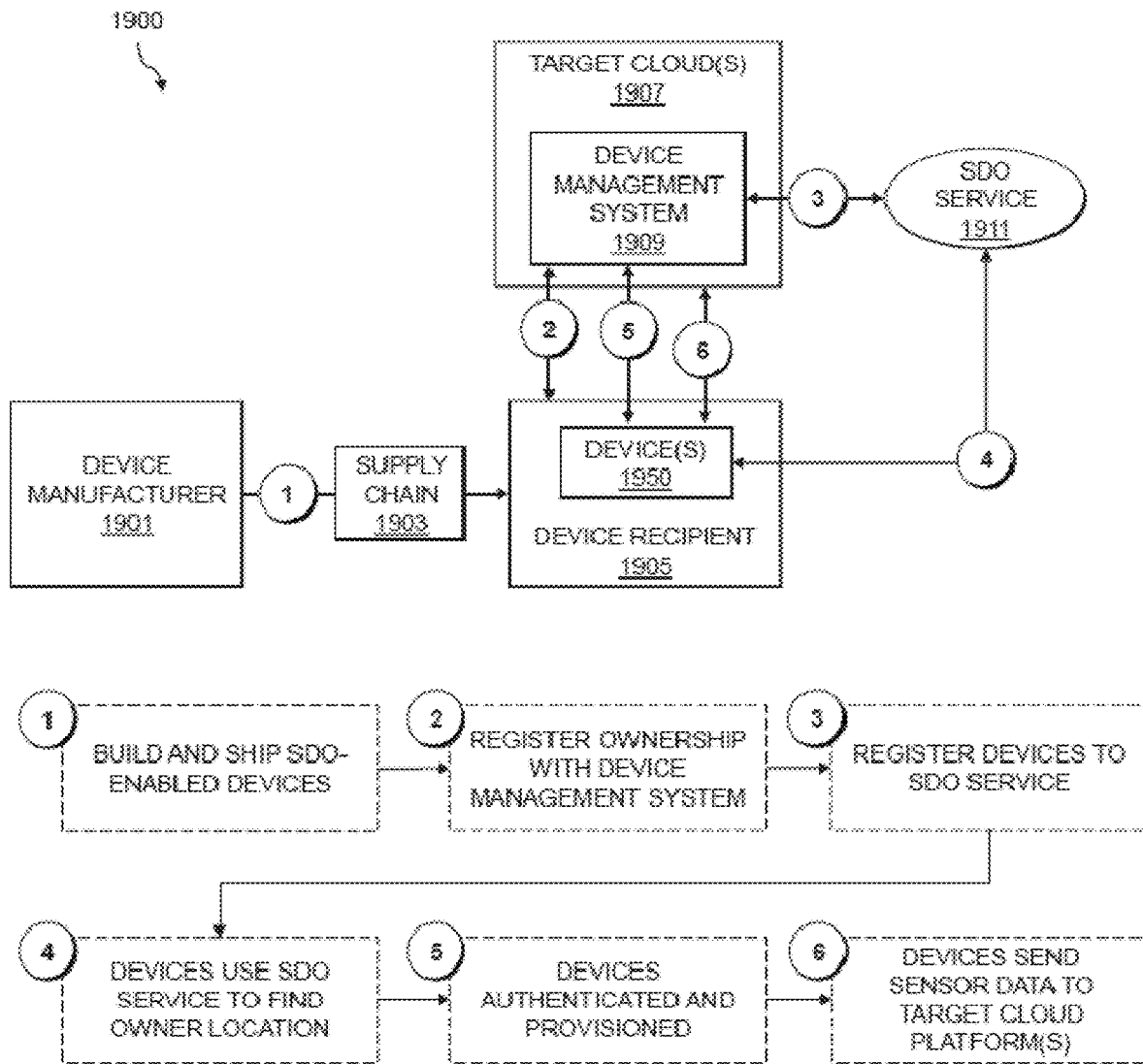
FIG. 19 shows a system architecture and process flow for secure device onboarding provisioning of computing devices in an illustrative embodiment.

FIG. 19 illustrates an overview of provisioning with SDO in a system 1900 including a device manufacturer 1901, a supply chain 1903, a device recipient 1905 receiving one or more devices 1950 from the device manufacturer 1901 via the supply chain 1903, one or more target clouds 1907 implementing a device management system 1909 (e.g., with an integrated SDO owner associated therewith), and an SDO service 1911. It should be appreciated that although the device management system 1909 is shown implemented internal to the target clouds 1907 in the system 1900, in other embodiments the device management system 1909 may be external to the target clouds 1907. The device management system 1909 may provide at least a portion of a control plane used in provisioning the devices 1950.

The device manufacturer 1901 illustratively has a single SKU (or relatively few SKUs) which are used for devices that are built for multiple different target clouds 1907 (e.g., multiple different owners). The SDO service 1911 implements an out-of-box provisioning process, whereby the devices 1950 may be drop-shipped to an installation location of the device recipient 1905. An ownership proxy acts as a "ticket" (e.g., an ownership voucher loaded from the device recipient 1905 to the device management system 1909 at the time of procurement of the devices 1950). The SDO service 1911 may in some embodiments provide for distributed trust, with direct device-to-cloud two-way authentication. Installation of an OS or other software on the devices 1950 is automated (e.g., scripted) to ensure repeatability and reliability. The SDO service 1911 further enables just-in-time installation of certificate binding, and just-in-time installation scripts and procedures which reduce the burden of device management (e.g., for spare and warehoused devices).

SDO provisioning in the system 1900 will now be described with respect to the steps 1-6 shown in FIG. 19:

1. The device manufacturer 1901 builds and ships SDO-enabled devices (e.g., devices 1950), which are provided via the supply chain 1903 to device recipients (e.g., device recipient 1905).
2. The device recipient 1905 registers ownership of the devices 1950 with an associated device management system 1909 (e.g., shown in FIG. 19 as operating within one or more target clouds 1907, though the device management system 1909 in other embodiments may be implemented external to the target clouds 1907). This may include loading an ownership voucher at procurement of the devices 1950.
3. The device management system 1909 utilizes the ownership voucher(s) to register the devices 1950 with the SDO service 1911. The SDO service 1911 may be hosted by a partner of the SDO owner that is integrated with or associated with the device management system 1909.
4. The devices 1950 perform onboarding with the SDO service 1911, which includes using the SDO service 1911 to find the location of their associated "owner" (e.g., the SDO owner integrated with or associated with the device management system 1909).
5. Following onboarding, the devices 1950 are authenticated and provisioned (e.g., using late binding provisioning) with the device management system 1909.
6. The devices 1950, once provisioned, operate as desired. Where the devices 1950 are IoT devices, as an example, such operation may include sending sensor data to one or more IoT platforms implemented by the target clouds 1907. Various other examples are possible.

FIG. 20 shows high-level SDO operation in a system 2000, which includes a computing site 2001 at which one or more devices 2010 are deployed (e.g., from a manufacturer via a device supply chain), as well as an SDO service 2003 and SDO-enabled clouds 2005 including clouds 2050-1, 2050-2, ... 2050-S (collectively, clouds 2050). At device manufacturer, the device 2010 has a processor that contains a unique root of trust key (e.g., generated using an Elliptic Curve Digital Signature Algorithm (ECDSA), an Enhanced Privacy ID (EPID) algorithm, etc.). The OEM inserts a device identifier (e.g., a GUID) into the device 2010 (e.g., with a credential tool). The OEM also installs SDO software on the device 2010, and creates a digital ownership voucher 2007.

SDO provisioning in the system 2000 will now be described with respect to the steps 1-5 shown in FIG. 20:

1. Before installation, the ownership voucher 2007 and GUID (or other device identifier) for the device 2010 are sent to the new device owner, which is a target one of the clouds 2050 (e.g., cloud 2050-1).
2. The GUID or other device identifier, as well as an IP or other network address of the target cloud 2050-1, are sent to the SDO service 2003.
3. At installation, the device 2010 powers on and "dials home" to identify itself to the SDO service 2003.
4. The SDO service 2003 points the device 2010 to its target cloud 2050-1. The target cloud 2050-1 and the device 2010 mutually identify with one another and authenticate each other using the root of trust, GUID or other device identifier, and the ownership voucher 2007. A secure tunnel is then set up between the device 2010 and the target cloud 2050-1.
5. One or more provisioning payloads for the target cloud 2050-1 are then transferred to the device 2010 (e.g., over the secure tunnel).

The target cloud 2050-1, following provisioning, takes control of the device 2010 and the SDO software on the device 2010 may be shutdown.

Figure 21A:
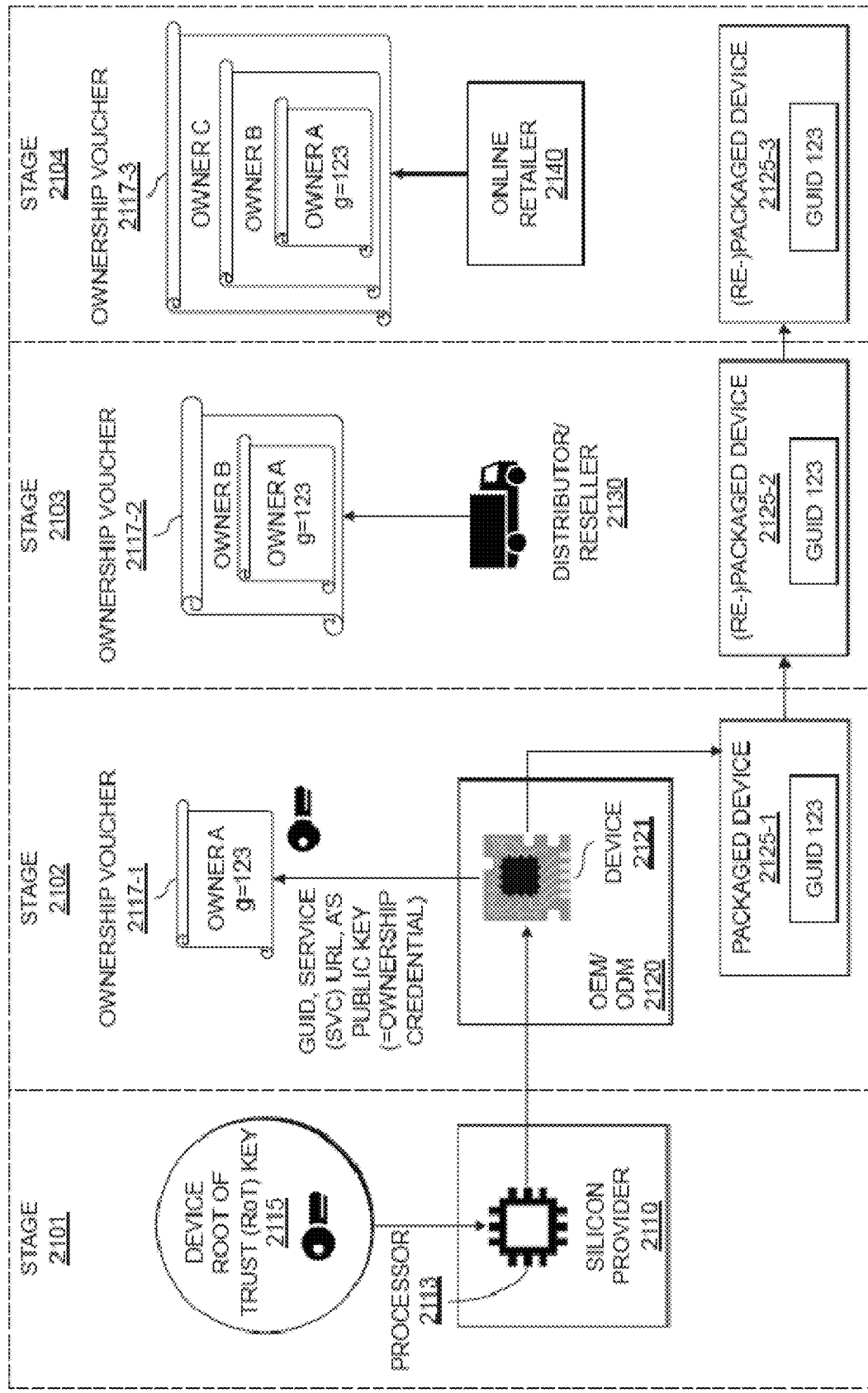
FIGS. 21A and 21B show multiple stages of secure device onboarding with establishment of a chain of trust utilizing ownership vouchers in an illustrative embodiment.
Figure 21B:
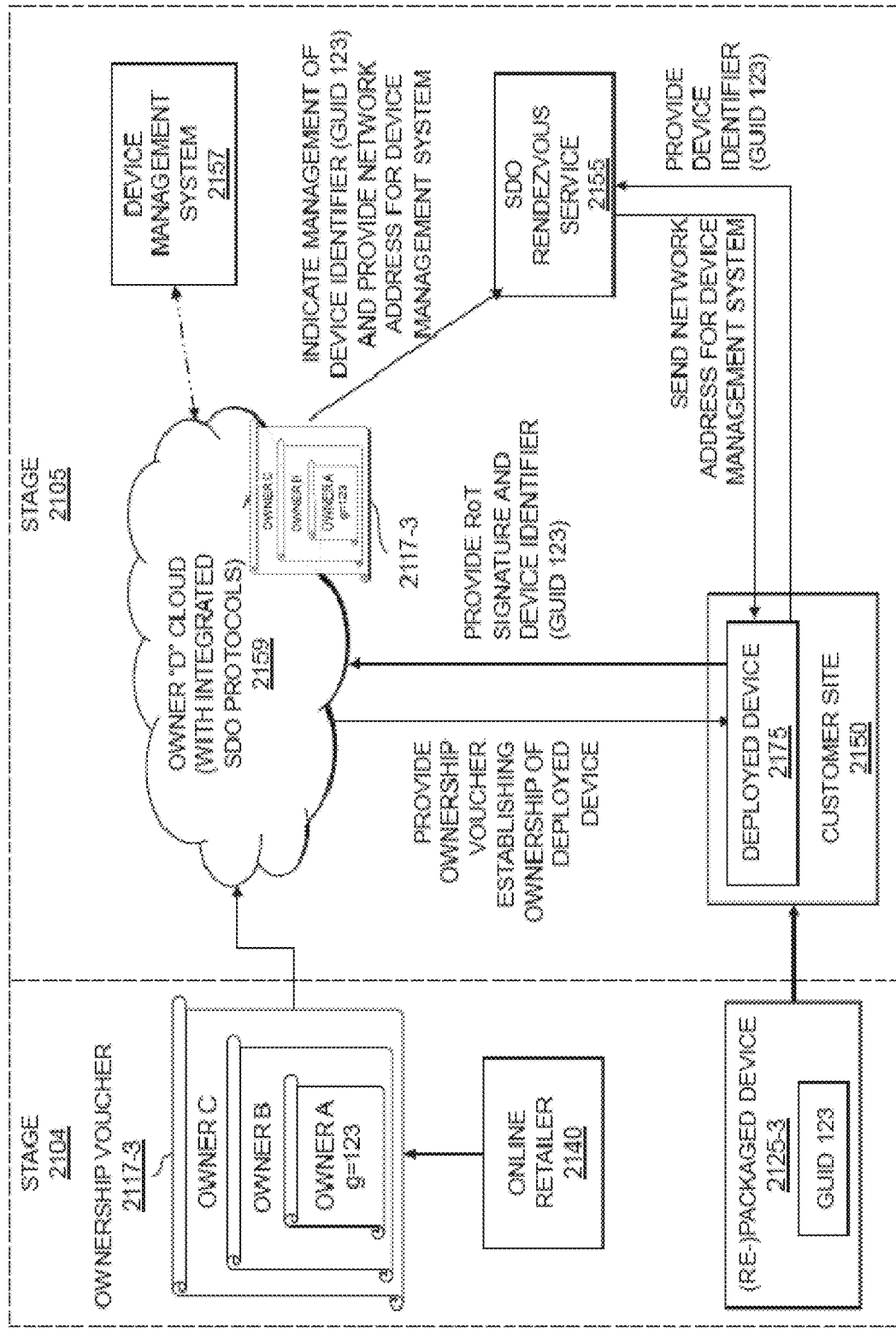

FIGS. 21A and 21B illustrate another view of SDO onboarding, including stages 2101 through 2105. As shown in FIG. 21A, in stage 2101 (e.g., a pre-fabrication stage), a silicon provider 2110 stores a device Root of Trust (RoT) key 2115 in a trusted execution environment of processor 2113. The processor 2113 may use keys generated using EPID, ECDSA, etc. It should be noted that stage 2101 may be considered optional, in that the device RoT key 2115 may alternatively be provisioned by the OEM/ODM 2120. The OEM/ODM 2120 and other entities in the supply chain will use an SDO credentialing tool to activate SDO functions. An ownership voucher is transmitted between entities in the supply chain (e.g., through device "paperwork" communicated via web-based transactions, email attachments, etc.).

In stage 2102, the OEM/ODM 2120 (e.g., an entity "A"), which may represent a board-level manufacturer of device 2121, stores a device identifier (e.g., a GUID such as "123") and a public key of the OEM/ODM 2120 in the device 2121. The OEM/ODM 2120's public key forms the base of a chain of signatures that establishes ownership of the device 2121. The device 2121 is powered off and packaged into packaged device 2125-1. It should be noted that the device identifier (e.g., GUID 123) is designed for use as an identity for SDO only, and may be replaced after ultimate ownership transfer to a customer or other end-user. The OEM/ODM 2120 represents the first "owner" (e.g., Owner A) of the device 2121, and establishes an ownership voucher 2117-1 with the GUID, a service (SVC) URL, and the OEM/ODM 2120's public key as ownership credentials.

The ownership voucher 2117-1 is transmitted along with the packaged device 2125-1 to the next entity in the supply chain in stage 2103. In this example, the next entity in the supply chain is assumed to be a distributor/reseller 2130, which re-packages the device 2121 into re-packaged device 2125-2 and updates the ownership voucher 2117-2 (e.g., as owner "B"), before transmitting the updated ownership voucher 2117-2 and repackaged device 2125-2 to the next entity in the supply chain in stage 2104. In this example, the next entity is an online retailer 2140 which will also re-package the device 2121 into re-packaged device 2125-3 and update the ownership voucher 2117-2 (e.g., as owner "C") to ownership voucher 2117-3. In the example of FIGS. 21A and 21B, the online retailer 2140 is assumed to be the last entity in the supply chain before the re-packaged device 2125-3 is ultimately provided to a customer site 2150 in stage 2105 as illustrated in FIG. 21B. It should be appreciated, however, that there may be any arbitrary number of entities in the supply or distribution chain between the OEM/ODM 2120 and the customer site 2150. Each entity in the supply chain extends the signature chain of the ownership voucher with their own keys (e.g., using SDO credential tools). Such signature extension may be automated, and allows automatic onboarding to happen under various conditions (e.g., where different entities in the supply chain break down pallets and re-sell different packaged devices to different subsequent entities).

As shown in FIG. 21B, in stage 2105 the re-packaged device 2125-3 is deployed at the customer site 2150 as deployed device 2175. An owner "D" operating a cloud 2159 with integrated SDO protocols wishes to install or provision the deployed device 2175 at the customer site 2150, and uses an SDO rendezvous service 2155 and device management system 2157 to do so. Although the SDO rendezvous service 2155 and device management system 2157 are shown as external to the owner cloud 2159 in FIG. 21B, it should be appreciated that in other embodiments one or both of the SDO rendezvous service 2155 and the device management system 2157 may be implemented internal to the owner cloud 2159. Further, the "Owner D" need not necessarily be cloud-implemented. In other embodiments, the owner cloud 2159 may be any Internet-based or on-premises (e.g., at customer site 2150) server. The owner cloud 2159, which is passed the ownership voucher 2117-3 from the online retailer 2140 (or other last entity in the supply chain), registers its network address (e.g., an IP or DNS address) with the SDO rendezvous service 2155 to allow the deployed device 2175 to determine the location of the owner cloud 2159.

When the deployed device 2175 is first powered on at the customer site 2150, it uses the SDO rendezvous service 2155 to determine the prospective owner's IP or other network address. The deployed device 2175 then contacts the prospective owner's SDO implementation (e.g., at owner cloud 2159) directly and establishes trust (e.g., using a RoT signature and the device identifier GUID 123). In some embodiments, trust is established from the deployed device 2175 to the owner cloud 2159 using the device RoT key signature (e.g., generated using EPID, ECDSA, etc.). Trust is established from the owner cloud 2159 to the deployed device 2175 using the ownership voucher 2117-3, which provides the chain of ownership by signing a challenge (e.g., to prove the owner "D" key). This chain of ownership in the example of FIGS. 21A and 21B is as follows, where the OEM/ODM 2120 is Owner A, the distributor/reseller 2130 is Owner B, the online retailer 2140 is owner C, and the owner cloud 2159 is Owner D: Owner A's public key (configured in device 2121 and in ownership voucher 2117-1) is used to verify the signature to allow trust of Owner B's public key □ Owner B's public key (in ownership voucher 2117-2) is used to verify the signature to allow trust of Owner C's public key □ Owner C's public key (in ownership voucher 2117-3) is used to verify the signature to allow trust of Owner D's public key □ Owner D signs a nonce to prove it has the private key corresponding to the end of the signature chain, which started in manufacturing, making it evident that Owner D has received the ownership voucher 2117-3 (e.g., begun in stage 2102 as ownership voucher 2117-1) which permits it to trust the deployed device 2175 as if an installer were typing on the device console of the deployed device 2175.

Figure 22:
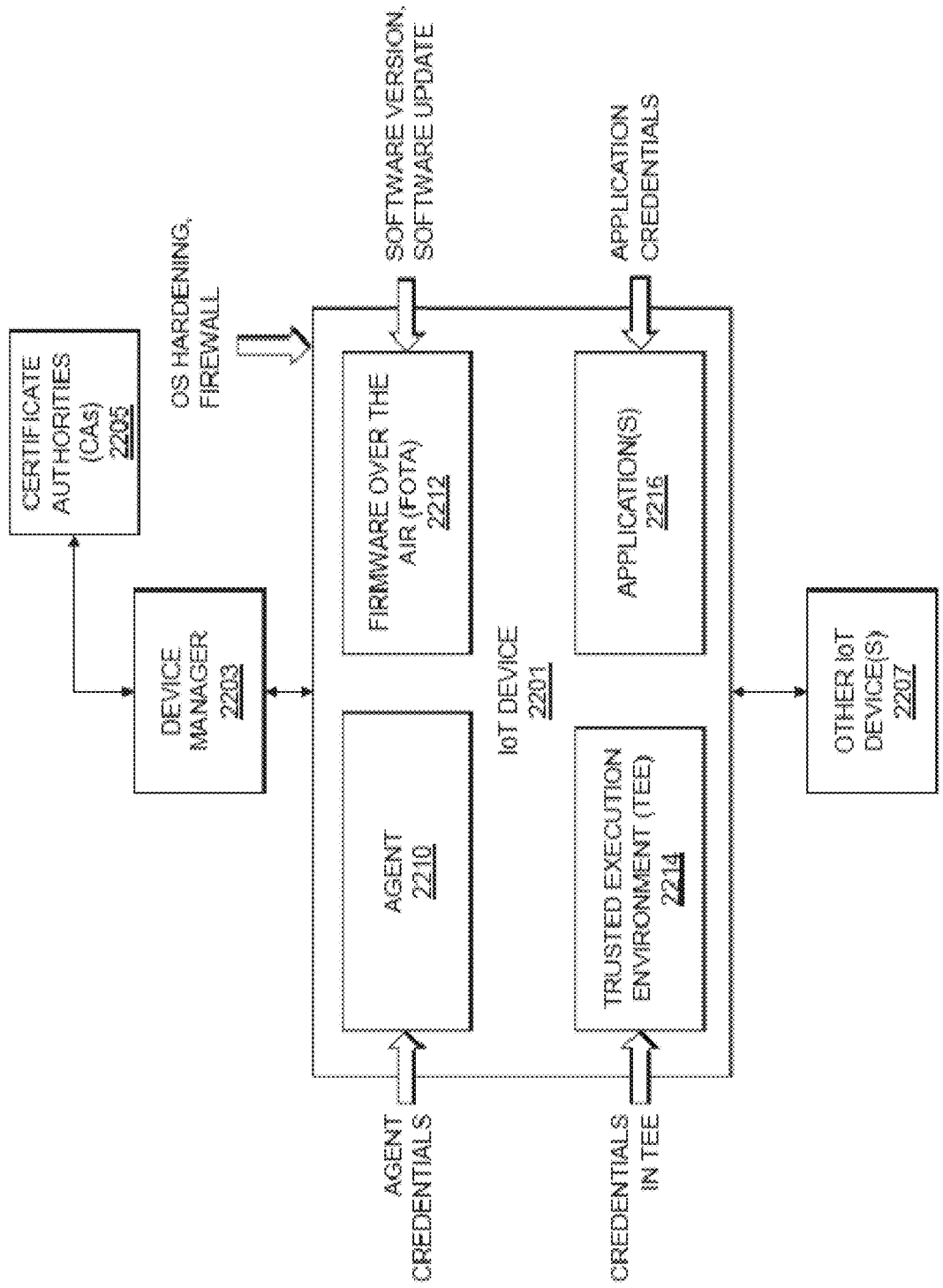
FIG. 22 shows secure device onboarding of an Internet of Things device in an illustrative embodiment.

FIG. 22 illustrates an out-of-box IoT device 2201 that is made "in service" utilizing FDO. The IoT device 2201 includes an agent 2210, Firmware Over the Air (FOTA) 2212, a TEE 2214, and one or more applications 2216. The agent 2210 is configured with agent credentials. The FOTA 2212 is provisioned with software versions and updates. The TEE 2214 has credentials or keys, and the applications 2216 also have credentials or keys. The IoT device 2201 is configured for communication with a device manager 2203, which is in communication with one or more CAs 2205. The IoT device 2201, when provisioned, may also be in communication with one or more other IoT devices 2207. FDO download is used for initialization and hardening scripts to establish the agent 2210. Cryptographic and other credentials may also be downloaded using FDO. Trust for local keys is provided using Certificate Signing Request (CSR) certificates from the CAs 2205. Data files and programs may also be downloaded using FDO. FDO is used to set up or provision the agent 2210, software updates (e.g., leveraging FOTA 2212), and establish connection to the other IoT devices 2207. FDO may also be used to establish the "owner" of the IoT device 2201, and for provisioning keys or other credentials in the TEE 2214 and/or applications 2216. The IoT device 2201 is illustratively in a closed network such as an Intranet, an Internet network behind a firewall, etc.

Illustrative embodiments addresses challenges in bootstrapping computing devices to comply with zero trust computing requirements. Such challenges include the difficulties in deploying an OS image to such computing devices, as well as digitally signing the OS image using a hardware root of trust secure key from an in-field deployment (e.g., without use of a USB device/port). This cannot be done while a disk-based OS image is executing or running. Illustrative embodiments enable such functionality with firmware-based methods to deploy and secure OS images before they are executed. Illustrative embodiments also provide solutions for maintaining root of trust based conditions for high integrity attestation capabilities, and also for taking appropriate actions based on a boot flag status. The boot flag status can be reset from within a control environment to force a factory reset of a computing device to a known trusted good condition.

In some embodiments, a combination of technologies are used to achieve methods for securing a computing device through a potentially complex multi-step or multiphase deployment process without loss of hardware-based root of trust. Advantageously, the solutions described herein recognize the need for flexibility in provisioning firmware updates, OS installation, application deployment and installation, and the desire that such functionality be capable of being performed all at once or in phases or steps with a time gap between each phase or step. For example, a computing device may be shipped from a factory with nothing installed on internal storage devices, and may be subject to OS deployment, deployment of middleware such as libraries and infrastructure services, deployment of application software, and overall system configuration by different entities at different times and in potentially different geographic locations. Illustrative embodiments also provide solutions which meet the need for preserving root of trust integrity throughout such multi-phase deployment processes until the final OS runtime image can be digitally signed and rendered capable of execution and operation.

MPSZTP processes are used to provide a bootstrapping strategy that enables computing devices to securely obtain bootstrapping data with no manual installer action beyond physical device placement and connection of power (and potentially network cables, though it is contemplated that wireless network communication may also be used for computing devices to be provisioned using MPSZTP processes). As such, MPSZTP enables non-technical personnel to bring up computing devices in remote locations without the need for any hands-on operator input. The deployment process can be done in steps that are determined from an externally controlled dashboard management system (e.g., a control plane). MPSZTP processes provide various functionality, including updating the boot image of a computing device, committing an initial configuration of the computing device, and executing arbitrary scripts to address various other auxiliary needs as desired. The updated computing device is subsequently able to establish secure connections with other systems. In some embodiments, MPSZTP defines a computing device's "known good run state" (e.g., in a manner similar to defining a desired state for an object in Kubernetes). This process is handled through a firmware extension, which in some embodiments leverages a UEFI module that is used to provision the computing device and which, at every boot cycle, validates the integrity of the computing device and its OS infrastructure prior to handover of execution to the OS proper. In short, MPSZTP processes attest the integrity of the computing device and its OS infrastructure before booting the installed OS. To do so, some embodiments place a recovery OS inside of firmware (e.g., a UEFI module), and measure successful boot and security (and enable performance of unattended recovery to a known secure or good state). MPSZTP processes may be used in a wide variety of contexts, including the deployment of IoT devices at edge locations, as MPSZTP enables autonomous deployment and recovery of an OS at any location without qualified staff on premises. This thereby solves a major challenge with edge location maintenance and can significantly reduce total cost of ownership (TCO).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for multi-phase secure zero touch provisioning of computing devices will now be described in greater detail with reference to FIGS. 23 and 24. Although described in the context of system 100, these platforms may also be used to implement at least portions of other information processing systems in other embodiments.

Figure 23:
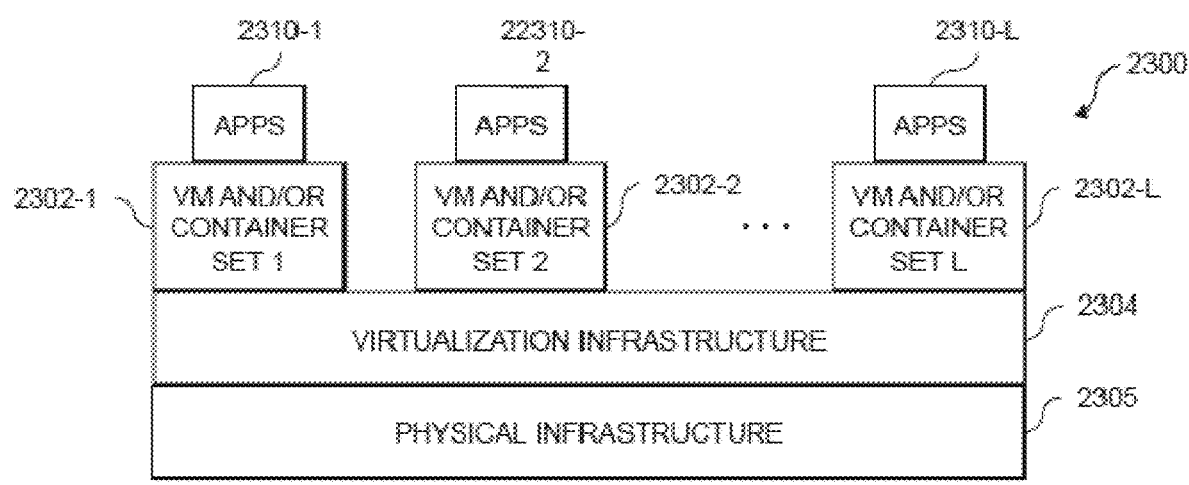
FIGS. 23 and 24 show examples of processing platforms that may be utilized to implement at least a portion of an information processing system in illustrative embodiments.
Figure 24:
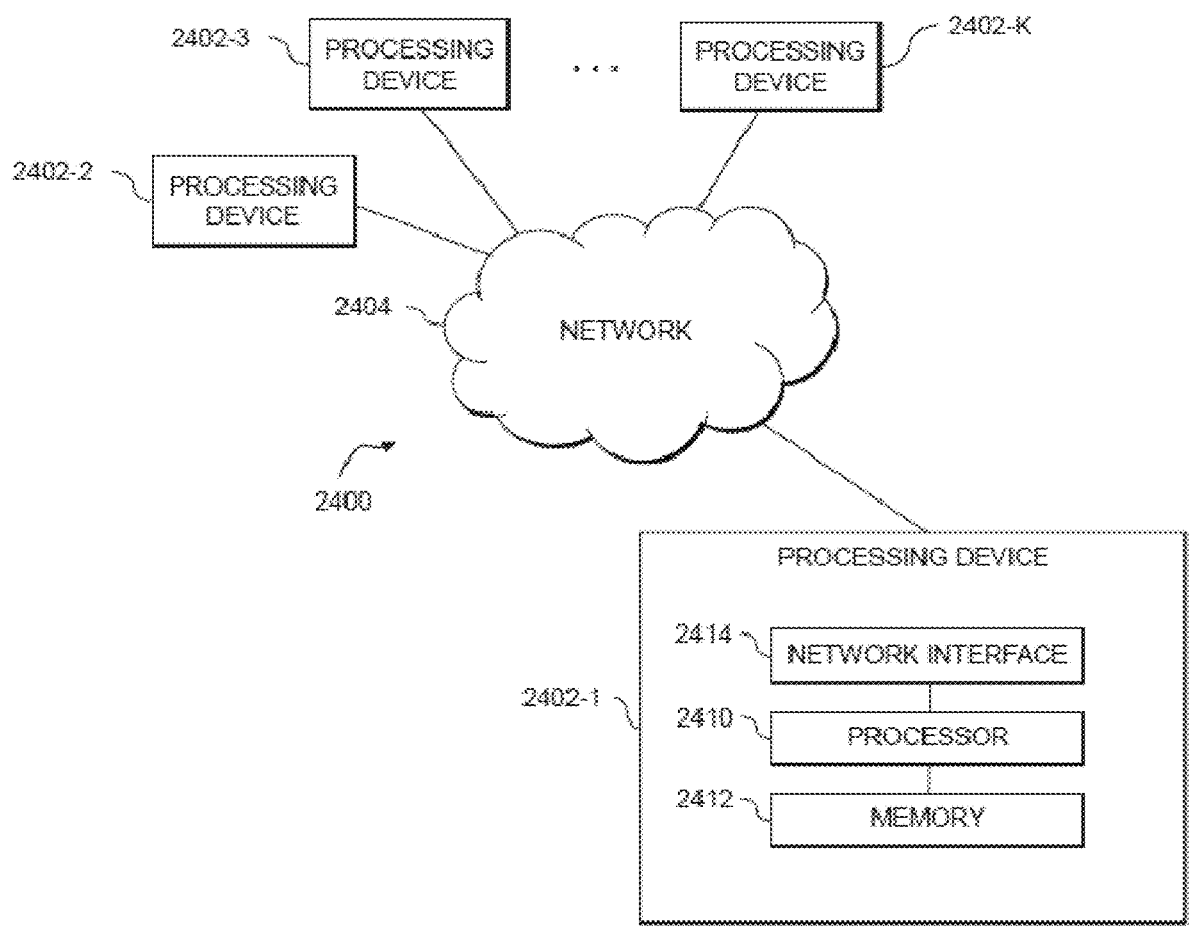

FIG. 23 shows an example processing platform comprising cloud infrastructure 2300. The cloud infrastructure 2300 comprises a combination of physical and virtual processing resources that may be utilized to implement at least a portion of the information processing system 100 in FIG. 1. The cloud infrastructure 2300 comprises multiple virtual machines (VMs) and/or container sets 2302-1, 2302-2, . . . 2302-L implemented using virtualization infrastructure 2304. The virtualization infrastructure 2304 runs on physical infrastructure 2305, and illustratively comprises one or more hypervisors and/or operating system level virtualization infrastructure. The operating system level virtualization infrastructure illustratively comprises kernel control groups of a Linux operating system or other type of operating system.

The cloud infrastructure 2300 further comprises sets of applications 2310-1, 2310-2, . . . 2310-L running on respective ones of the VMs/container sets 2302-1, 2302-2, . . . 2302-L under the control of the virtualization infrastructure 2304. The VMs/container sets 2302 may comprise respective VMs, respective sets of one or more containers, or respective sets of one or more containers running in VMs.

In some implementations of the FIG. 23 embodiment, the VMs/container sets 2302 comprise respective VMs implemented using virtualization infrastructure 2304 that comprises at least one hypervisor. A hypervisor platform may be used to implement a hypervisor within the virtualization infrastructure 2304, where the hypervisor platform has an associated virtual infrastructure management system. The underlying physical machines may comprise one or more distributed processing platforms that include one or more storage systems.

In other implementations of the FIG. 23 embodiment, the VMs/container sets 2302 comprise respective containers implemented using virtualization infrastructure 2304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2300 shown in FIG. 23 may represent at least a portion of one processing platform. Another example of such a processing platform is processing platform 2400 shown in FIG. 24.

The processing platform 2400 in this embodiment comprises a portion of system 100 and includes a plurality of processing devices, denoted 2402-1, 2402-2, 2402-3, . . . 2402-K, which communicate with one another over a network 2404.

The network 2404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2402-1 in the processing platform 2400 comprises a processor 2410 coupled to a memory 2412.

The processor 2410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2412 may comprise random access memory (RAM), read-only memory (ROM), flash memory or other types of memory, in any combination. The memory 2412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2402-1 is network interface circuitry 2414, which is used to interface the processing device with the network 2404 and other system components, and may comprise conventional transceivers.

The other processing devices 2402 of the processing platform 2400 are assumed to be configured in a manner similar to that shown for processing device 2402-1 in the figure.

Again, the particular processing platform 2400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

As more users access sensitive data or utilize their information handling systems also referred to as computing devices in a secured environment, such as a corporate data center, there is a need to ensure that these endpoints are secure. One approach that helps to secure the user's computing device is the zero-trust security model. Securing the computing device, also referred to herein simply as a device, includes ensuring that the hardware and software resources of the device are secure. This means that only secure and verified operating systems and software applications may be used by the user while the device is in a secure environment or accessing sensitive data. Such may be accomplished by logically isolating hardware resources of the device except for the resources that are desirable or needed for provisioning the device with a secure and verified operating system and software applications, such as a network interface.

As disclosed herein, the device may be provisioned using a managed persistent context-aware MPSZTP system based on its context and location. This system and method, which is a derivative of the MPSZTP process discussed above, allows the device to securely operate while in the secured environment. Persistent context-aware provisioning refers to the ability of changes to the operating system and software applications to persist across system reboots. Restarting the device in the same secure environment would allow the device to keep its state of provisioning after validation of the operating system and software application within the current secure context. However, restarting the device in a different environment would return the device to its previous state prior to the provisioning process. As such, the managed persistent context-aware MPSZTP system and method have context and location awareness. Accordingly, having the ability to provision a computing device, and utilizing persistent context-aware and/or location-aware systems and methods are desirable as an automated part of a client or user-driven secure environmental experience.

The managed persistent context-aware MPSZTP may be used in three scenarios: 1) context-aware incremental workspace provisioning, 2) context-aware alternative workspace provisioning, and 3) context-aware security enforcement. In all three scenarios, the operating system and software applications that are provisioned while the device is operational and in the secure environment. In the first scenario, the device may be mobile and has been enabled for context-driven operation. The enablement can be set at the factory or may be set for a managed device. For example, a managed device with a client or edge personality type can be re-assigned as a context-aware device via a configuration in the control plane. In this scenario, the device may have the MPSZTP enabled firmware and has already been provisioned with an operating system and client intelligence software. However, the device may need a temporary context-aware application to be installed prior to booting to the operating system.

The device may be configured to discover and access a control plane from a secure network. The control plane may, after verification, authorize the device as compliant with the requirements of the temporary context-aware application. Additional software applications may be needed or required when the device is moved or deployed to a temporary area or location based on a context. Accordingly, the device may receive a BLOB with a policy-driven set of templates which may be used to download a set of software applications based on the said context. The deployment of the set of software applications may be affected and secured from within the firmware of the device.

In this scenario, the device may have already been pre-provisioned with an operating system and/or software application. Accordingly, the additional software application may be deployed into the existing operating system environment. As such, the device may be booted to the existing operating system and present the user with a logon service. Once the user logs in, he or she may find the device ready and configured for the requirements of the current environment.

When the device is rebooted out of the current environment, the inability of the device to discover and connect the last provisioning control plane may trigger a removal of the latest provisioned policies and/or software applications. This leaves the device in the same condition and/or configuration prior to the latest provisioning of the device in the temporary location.

In the second scenario, the device may have already been provisioned. However, the device may need a temporary context-aware operating environment, which includes an operating system and software application, when it is deployed or moved to the environment. The software application may be required for facilities and/or services in the environment.

The device may be configured to discover and access a control plane from a secure network of the environment. The control plane may, after verification, authorize the device as compliant with the requirements of the environment. The control plane may instruct the device or in particular the firmware-based process, to determine a download space for provisioning of a context-aware persistent workspace. The space may be an internal storage device or a partition thereof leaving the existing operating environment un-touched and isolated from the context-aware operating system. In preparation for the provisioning, the determined download space may be securely erased prior to the download of a BLOB that includes one or more instructions, templates, and/or software applications. The operating system and software application may be installed in the current context-aware workspace and configured for the requirements of the current environment.

When the BLOB is received, an instruction may direct the process to proceed to the metadata sequencer specified in the BLOB. Also, the boot flow controller may be re-programmed to boot to a temporary workspace and present the user with a logon service. Access to the device may be exclusive for users or subscribers of the facilities and/or services provided in the temporary environment. The authorized users or subscribers may be able to work on the context-aware operating environment or workspace as long as the device is in the temporary environment and context. However, the provisioned software application may be cached and may also be removed when the device receives a new function, such that the software application may no longer be required. A new software application associated with the new function may replace the removed software application.

The operating system and software application may be removed when the device is moved out of the temporary location and rebooted. After the reboot, the temporary context-aware operating environment may be removed which leaves the device in the same condition and/or configuration prior to the deployment of the device in the temporary location. As such, the device may reboot to its original workspace.

In the third scenario, the device may be moved or deployed in a restricted area where increased security may be enforced. When the user powers on the device, a firmware-based process may automatically discover a control plane and follow a self-identification protocol and present the control plane, with an inventory of its current infrastructure. The control plane may determine whether the device is authorized and/or compliant to operate in the current environment. If the device is not authorized or compliant the control plane may present a notification to the user to power down the device immediately or within a particular grace period. Otherwise, the device may face a factory reset followed by an installation of a secure and logically isolating the endpoint operating environment by the control plane. The factory reset may wipe out any previous operating system and software application.

Once the device boots to the newly provisioned operating environment, a logon service may be presented, wherein the user can log in to the said operating environment which is configured for the current context. When the device is rebooted outside of the current environment or network context, an inability to reach the last provisioning control plane may trigger a removal of the provisioned operating environment including the operating system, policies, templates, and software applications. As such the device may be returned to its previous known configuration state.

In each of the three scenarios above with the persistent context-aware workspace provisioning, the control plane may be local in a local network of the device or is accessible remotely via discovery mechanisms such as via Zero Configuration Networking™, multicast domain name system, etc. Further, a portable or mobile computing device may be provisioned with a secure workspace, wherein only a known secure and authorized software application and/or operating system may be downloaded into an execution environment. The context-aware provisioning process is secure as it is conducted only over an encrypted transfer protocol, such as a secure file transfer protocol. When a user powers up the device, a firmware-driven process may discover the presence of the control plane and identify itself. In addition to identifying information, the device may also present an inventory of its current infrastructure or resources/components to the control plane. The inventory may have been encrypted at the factory and verified upon receipt of the device prior to the discovery of the control plane. The control plane then verifies that the device and/or its configuration are authorized and compliant with the context of the secure environment. A startup protocol may determine a policy to be executed on the device based on the information presented, which may include a personality flag. The policy may determine the software application to be downloaded and executed on the device.

The control plane may monitor the continued presence of the device within its secured network context. In addition, runtime transactions of the device may be monitored and controlled from the control place, wherein the control plane may be aware of the state of the downloaded software applications. The persistent context-aware operating system may make use of the local application environment execution with various resources such as interactive video and user input devices like a keyboard, mouse, scanner, etc. The persistent context-aware operating environment may be bound to the device until it is no longer needed, the devices leave the secure environment, or can no longer connect to the control plane that most recently provisioned the system.

When the device is rebooted outside of the network context or a different environment, the device may not be able to discover and connect to the control plane that last provisioned the device. This may trigger de-provisioning of the device that includes the removal of the set of software applications that were deployed earlier in the previous environment and/or associated templates and policies which would return the device to its last known configuration.

Illustrative embodiments of the present disclosure provide techniques for multi-phase secure zero touch provisioning of computing devices. In one embodiment, an apparatus comprises at least one processing device comprising a processor coupled to a memory. The at least one processing device is configured to perform the step of determining, utilizing a firmware-based agent running in firmware of the at least one processing device comprising a processor coupled to a memory, a boot flag status during a boot process of the at least one processing device. The at least one processing device is also configured to perform the step of executing, responsive to the boot flag status being a first value, a system update handler of the firmware-based agent configured for provisioning of a secured runtime operating system on the at least one processing device, wherein the provisioning of the secured runtime operating system comprises digitally signing an image of the secured runtime operating system utilizing a hardware-based root of trust key of the at least one processing device. The at least one processing device is further configured to perform the step of executing, responsive to the boot flag status being a second value, a secured operating system boot handler of the firmware-based agent configured for validating the image of the secured runtime operating system and loading the secured runtime operating system on the at least one processing device responsive to successful validation of the image of the secured runtime operating system, wherein validating the secured runtime operating system image comprises performing attestation of a signature of the image of the secured runtime operating system utilizing the hardware-based root of trust key of the at least one processing device.

Figure 25:
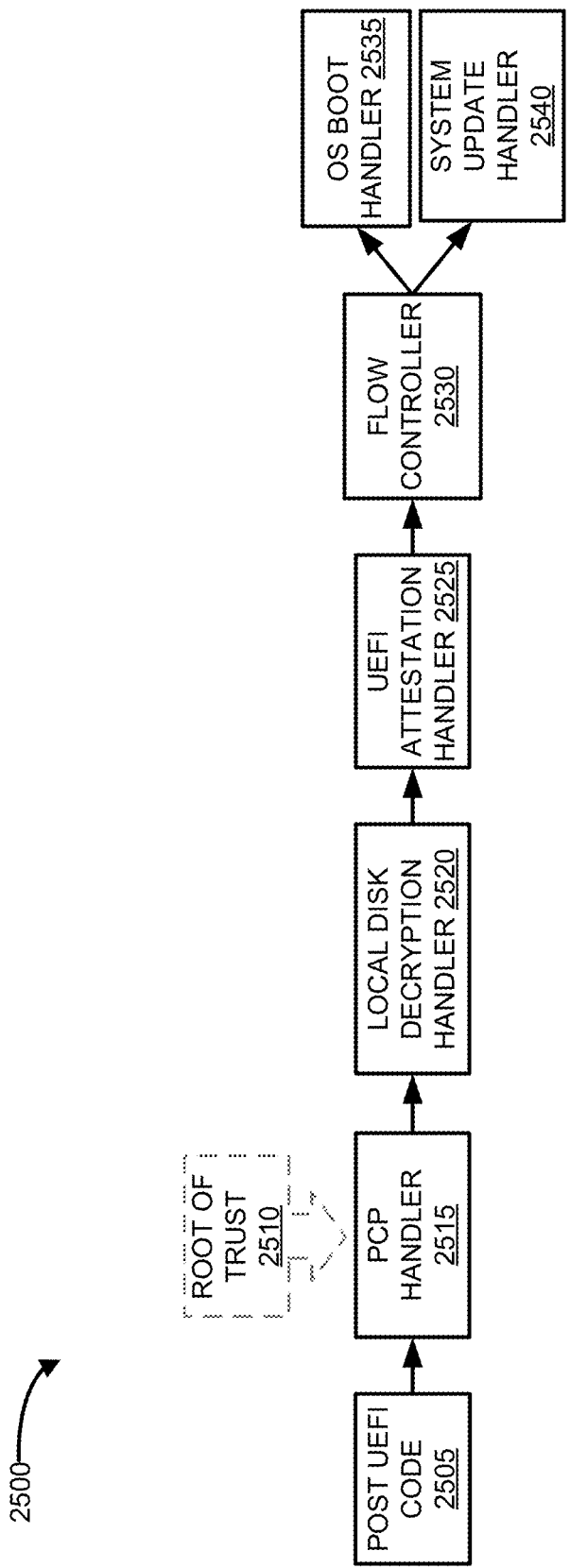
FIG. 25 shows a system flow for firmware capabilities of a computing device configured for a persistent mode of multi-phase secure zero touch provisioning (MPSZTP) in an illustrative embodiment.

FIG. 25 shows a system flow 2500 for firmware capabilities of a computing device configured for a persistent mode of MPSZTP. POST UEFI code 2505 is initialized, and processing then passes to the PCP handler 2515 providing a root of trust 2510. PCP handler 2515 may set a quarantine action metric (QAM) value in the NVRAM. PCP handler 2516 may be configured to perform a secured component verification of one or more components or devices of the system. Processing then proceeds to a local disk decryption handler 2520 (for example, to decrypt disks if needed), a UEFI attestation handler 2525 (for example, to provide hardware attestation of a device), and then to flow controller 2530. The UEFI attestation handler 2525 may increment the QAM value if there is a discrepancy found during the device and/or firmware attestation. Flow controller 2530 may be configured to perform verification of SBF, personality, and NVRAM flags. Flow controller 2530 may also verify the QAM and sequencer values. Flow control handler may be configured to perform compensatory behavior based on a declared setting that described processing requirements to accommodate managed device personality sub-types. Processing will then proceed to an OS boot handler 2535 or system update handler 2540 based on the verification performed. The OS boot handler 2535 enables booting to a secure, signed OS (for example, persistent mode provisioning on the device using MPSZTP processing via the system update handler 2540). The system update handler 2540 is used for MPSZTP persistent mode processing.

The flow control may be determined based on parameter value(s) as shown in table 1 below. Table 2 includes a mapping of actions to be taken by the control plane and/or the device based on the value of the personality flag which may be initially set at the factory and used to indicate a personality type that includes an unmanaged device or a managed device. Although the personality type may have been initially set at the factory, the control plane may also be used to assign a different personality type to the managed device which the managed device may conform to from thereon. Because an unmanaged device may not have access to the control plane, the unmanaged device is typically not registered with the control plane. Accordingly, the unmanaged device cannot be controlled by the control plane.

A managed device includes edge, client, and context-aware personality sub-types. The managed system may be configured to automatically discover and connect to the control plane. For example, when the personality flag of the device is set to context-aware, the system update handler to perform several operations, such as auto-discovery and connection to an external control plane using a self-identification protocol on a secure network. For example, the self-identification protocol may include presenting identifying information such as security keys and a trusted key pair also referred to as an ownership token that is typically stored in the TPM or NVRAM.

The device may request the next step which can be a payload with an execution or deployment template. Processing may then pass to the sequencer to perform instructions based on the execution or deployment template. The personality type of the device may be reset in the control plane by a user or administrator within a role-based access control authority. As such, the device may be re-deployed with a different personality than initially set at the factory.

If the managed device is registered with the control plane, the control plane may apply a policy-driven secure profile to the device. The secure profile may be used to determine and predicate local network context services and facilities associated with the device. For example, the secure profile may identify one or more templates for the managed device. The device may be provisioned with an additional software application or a full temporary persistent workspace that may include a secure persisting operating system in addition to the software application. In highly secure or restricted environments, if the device is not registered with the control plane, the control plane may provide the user with a window of opportunity to power down the device within a grace period. Otherwise, the device may be registered and subject to a factory reset by the control plane.

Upon reboot subsequent to the factory reset, the system image based on a secure profile may be deployed on the device. The system image may include an instruction, template, a secure persistent operating system, and/or a software application. The secure persistent operating system may be a micro-operating system or a full-blown operating system that is downloaded to the device in a secure manner. The device may then boot into the secure persistent operating system. In addition, the managed device may be secured by the control plane by logically isolating one or more of its hardware resources. For example, its port may be logically isolated and network devices may be re-provisioned or reset, such as a 5G device being reset to a different operating profile. To perform the above, the control plane may have privileged access to the device while the device is registered with the control plane. When the device is deregistered from the secure environment, the device may be rebooted and returned to its previous known configuration, that is the secure persistent operating system and/or software application that was provisioned on the device may be securely removed from the device prior to the reboot.

TABLE 1

| | Flow Control Heuristics | | | |
|---|---|---|---|---|
| Flow Control Flag | Description | How Set | Override Impact | Notes |
| QAM | The QAM may also set a severity flag | May be securely set at the factory and verified by the PCP handler and the PCR# attestation handler. | If the severity flag is set, this overrides all other firmware action and shall directly proceed to the quarantine processor via the system update handler | The component verification policy filler value and the PCR#1 policy filter value can be initially factory set. These may also be overridden via the control plane. |

TABLE 1-continued

Flow Control Heuristics

| Flow Control Flag | Description | How Set | Override Impact | Notes |
| --- | --- | --- | --- | --- |
| Personality Flag | The personality flag sets the immediate path that may be followed when the device enters a secured area. | The personality flag maybe initially set at the factory. It can be reset from the control plane with strict role-based access control. | See notes below for further personality flag values and resulting boot behavior. | See below. |
| Sequencer Control Flag | The sequencer control flag is set at all times when a downloaded BLOB has been placed in the download buffer (partition C). The sequencer control flag may also be set based on the template instructions in the queue buffer of the metadata sequencer. | The sequencer control shall be set only by the download handler and the sequencer itself. | The sequencer control flag shall not be overridden. | This is an internal control flag and should not be interfered with. |
| Simple Boot Flag | The simple boot flag determines whether to boot with the installed operating system or to go directly to the system update handler. | Initially set the factory. Will be reset by the payload deployment handler and success or failure of a boot sequence. | The personality flag may override the behavior based on the simple boot flag. | The simple boot flag works in tandem with the personality flag. When the personality flag is set to context-aware in the boot process the device may first discover and call the control plane to receive any outstanding override command. |

TABLE 2

Personality Flag Values

| Personality Flag Value | Actions Taken | Notes |
| --- | --- | --- |
| Unmanaged Device | Quarantine severity handling may be set from the factory if set at all The setting of this value should invoke normative device BIOS behavior. | Unmanaged device users are not likely to have access to a control plane service thus the benefits of advanced firmware capabilities are not available to them. |
| Managed Edge Device | An edge may execute the FIDO onboarding process prior to any further processing. If an operating system has been provisioned (either from the factory or from prior deployment action) it may be executed directly following on-boarding. | When an operating system installer has been provisioned into the factory drive partition (partition F), then may be executed via a control plane instruction that is derived from DevMod response to FIDO on-boarding. |
| Managed Client Device | A client device may be provisioned with an operating system from the factory. In addition, the design of the boot flow handling may also be performed at the factory. | |

TABLE 2-continued

Personality Flag Values

| Personality Flag Value | Actions Taken | Notes |
| --- | --- | --- |
| Managed Context-Aware Device | The context-aware type device may always automatically discover the control plane via the download handler as its first step in the control of boot flow The context-aware personality flag value includes two provisioning types:<br>A) Ephemeral - no persistent installation or context-aware operation may be permitted.<br>B) Persistent - the device may be provisioned to persist context-aware operation across the system reboot. | This is the mechanism by which the device boot sequence may be altered or hooked into a persistent provisioning process For devices other than those predicated for persistent operating system boot, this process may allow persistent or temporary insertion of applications into the host operating system It may also be used to completely re-image the system in some cases. |

Figure 26:
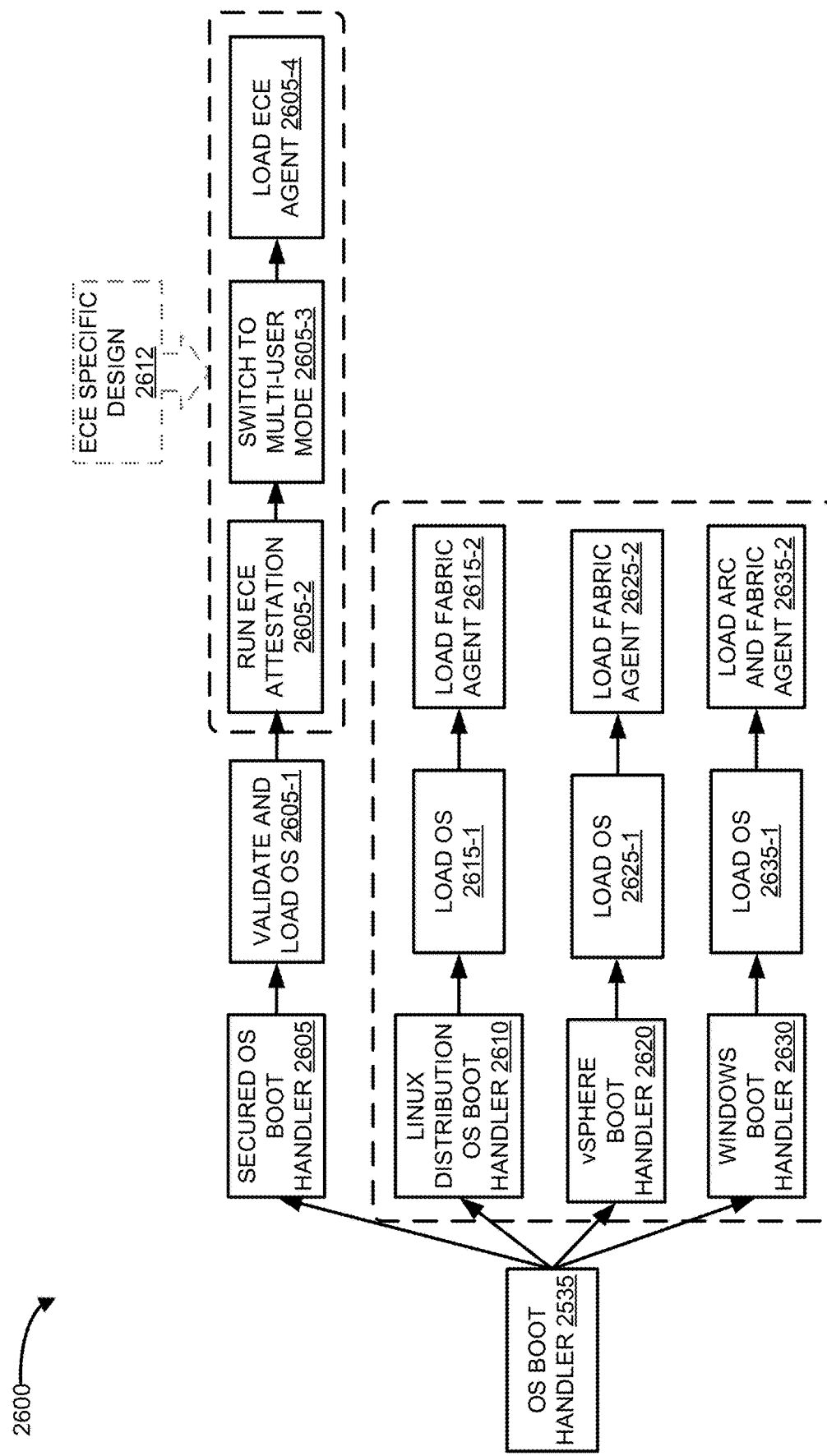
FIG. 26 shows a process flow of operations of the OS boot handler in an illustrative embodiment.

FIG. 26 shows a process flow 2600 of operations of the OS boot handler 2535. From the OS boot handler 2535, several processing paths may be followed, including proceeding to a secured OS boot handler 2605 (for example, a secure OS provisioned using MPSZTP processing), as well as various other OS boot handling such as via a Linux distribution OS boot handler 2610, a vSphere OS boot handler 2620, a Windows OS boot handler 2630, other server virtualization, etc.

The non-secured OS boot handlers 2610, 2620, and 2630 in some embodiments are compatible with the UEFI OS boot loader process that utilizes the shim method. The secured OS boot handler 2605, however, may avoid the use of the shim/GRUB combination for security reasons. The non-secured OS boot handlers 2610, 2620, and 2630 (for example, using a non-secured traditional UEFI OS Boot Loader) can be provisioned using UEFI micro OS-based tooling that benefits from the MPSZTP enabled step-wise sequential deployment of such unsecured runtime OSes and any software applications that may be deployed to the unsecured runtime OSes, but without the restricted and secured boot signing processes specified for use with the secured OS boot handler 2605.

In the secured OS boot handler 2605 path, processing proceeds to validate and load the OS 2605-1, followed by ECE specific design which includes running an edge cloud endpoint (ECE) attestation in a single user mode 2605-2. A switch may then be made to a multi-user mode 2605-3, and an ECE agent (for example, agent 1130-2) is loaded at 2605-4. The ECE agent may be configured to allow the control plane to interact with an edge cloud endpoint. For example, the ECE agent may receive an instruction from the control plane that is executed on the device. The instruction may include creating a virtual machine, creating a storage instance on the device and attach it to the virtual machine, provision the virtual machine with a host image or a container execution framework, etc.

The non-secure OS boot handlers 2610, 2620, and 2630 are examples of unsecured boot handlers (for example, for booting OSes not provisioned and secured or signed using MPSZTP processing). From the non-secured OS boot handlers 2610, 2620, and 2630, processing proceeds to load the associated OS 2615-1, 2625-1, and 2635-1, and then to loading fabric agents 2615-2, 2625-2, and 1370-2. In the Windows OS boot handler 2630 path, loading the fabric agent 2635-2 may include loading the Microsoft Azure Arc. The boot path does not require an "on-disk" operating system handling and could be driven from in-memory storage.

FIGS. 27A-27H show a process flow 2700 of operations of the system update handler 2540. The system update handler 2540 may follow various processing paths, such as a FIDO onboarding processing path 2702, a download handler processing path 2704, a quarantine processor path 2706, and a sequencer processing path 2708. In addition, system update handler 2540 may have been optimized to allow recursive re-entry. The download handler 2704 may perform a discovery process for a service type, such as an edge orchestrator, client controller, or context-aware controller. The service type may be determined by the personality flag. The download handler 2704 may also be configured to receive instructions, a template, and/or a payload from the control plane. The template may be capable of being converted into instructions that may be executed on the device either within the firmware-based micro-operating system or within the runtime host operating system. Although the payload is optional, if the payload is provided then the template includes instructions by which the payload can be dissipated or deployed.

Figure 27A:
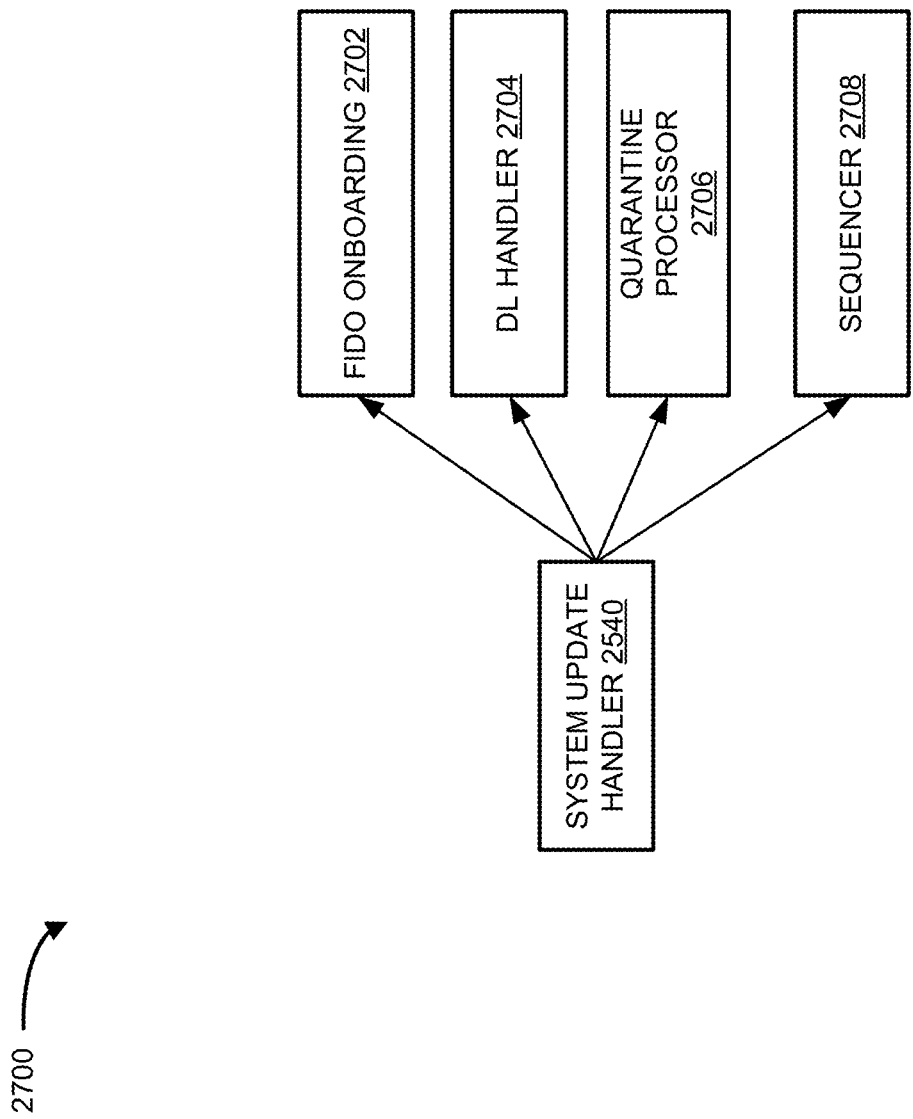
FIGS. 27A-27H show a process flow of operations of the system update handler in illustrative embodiments.
Figure 27B:
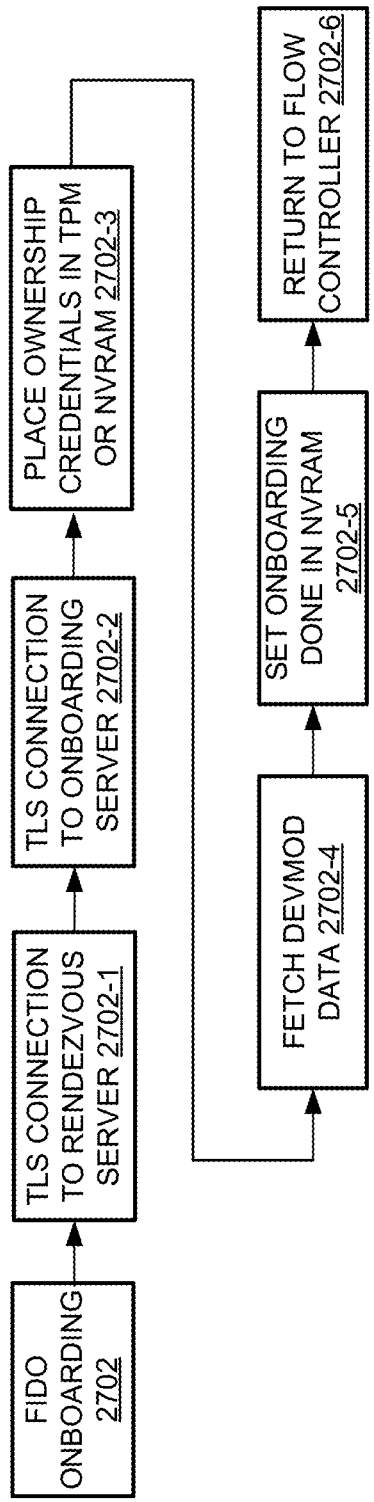

FIG. 27B shows the FIDO onboarding processing path 2702, which includes establishing a TLS or other secured connection to a rendezvous server 2702-1 (for example, rendezvous server 1114), establishing a TLS or other secured connection to an onboarding server 2702-2 (for example, onboarding/provisioning server 1116), placing ownership credentials in a TPM or NVRAM 2702-3, fetching DevMod data 2704-4 (if available), setting onboarding to "done" in NVRAM 2702-5, and returning to flow controller 2702-6, such as flow controller 2530. The rendezvous and onboarding servers may be configured according to the FIDO secure device onboarding protocol. Establishing the TLS or other secured connection to the rendezvous server may be performed using transfer ownership protocol 1, wherein the device identifies itself to the rendezvous server and obtains mapping to connect to the onboarding server. Establishing the TLS or other secured connection to the onboarding server may be performed using transfer ownership protocol 2, wherein trust is established prior to the placing of the ownership credentials in the TPM or NVRAM.

Figure 27C:
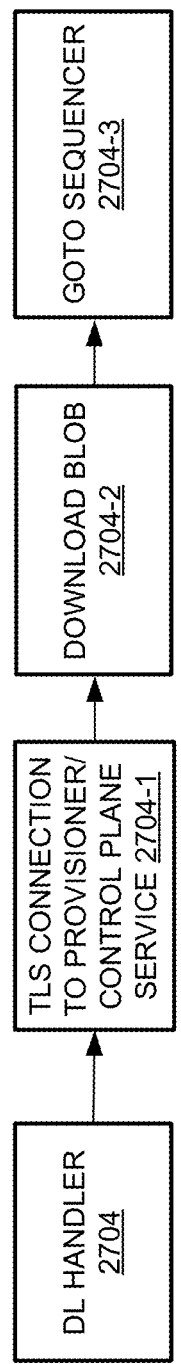

FIG. 27C shows the download handler processing path 2704, which includes establishing a TLS or other secure connection to a provisioning server or control plane service 2704-1 (for example, onboarding/provisioning server 1116 or control plane 1101), downloading one or more BLOBs 2704-2, and proceeding to sequencer 2704-3 (for example, metadata sequencer 1231).

Figure 27D:
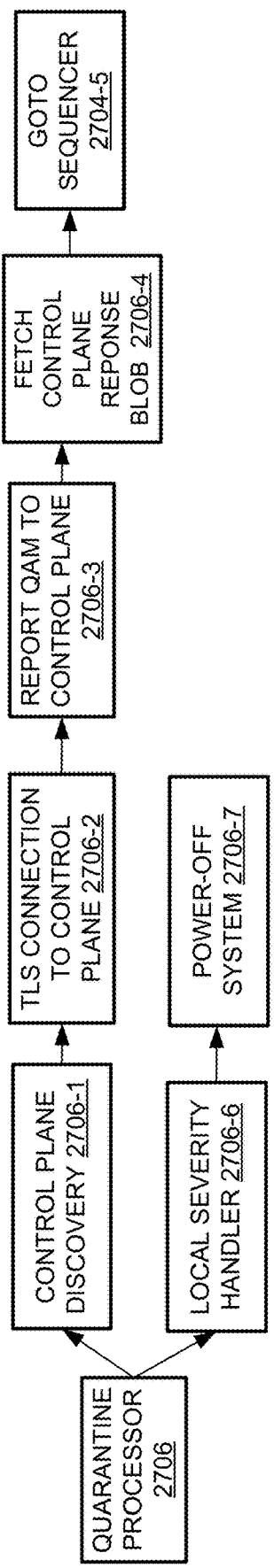

FIG. 27D shows the quarantine processor path 2706 may follow several processing paths such as control plane discovery processing path 2706-1 and local severity handler processing path 2706-6. The control plane discovery processing path 2706-1 includes establishing a TLS connection to control plane 2706-2, reporting QAM to control plane 2706-3, fetching control plane response BLOB 2706-4, and proceeding sequencer 2704-5. The local severity handler processing path 2706-6 includes powering off system 2706-7.

Figure 27E:
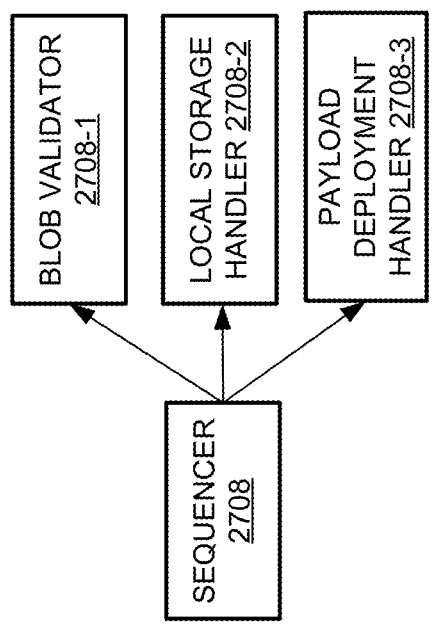
Figure 27F:
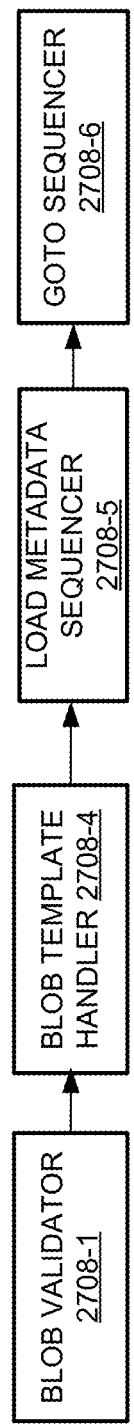
Figure 27G:
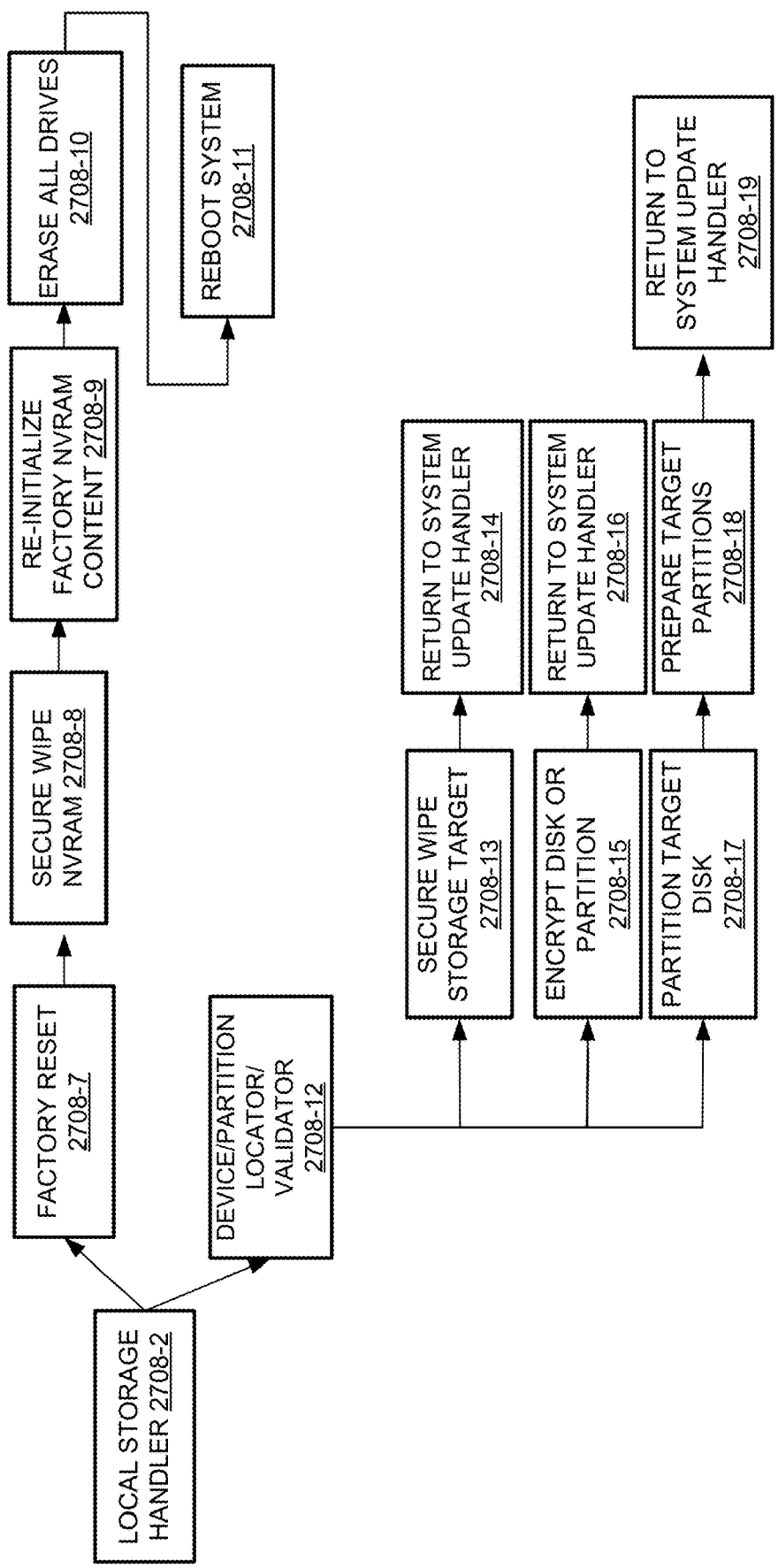

FIG. 27E shows the sequencer processing path 2708 which may follow several processing paths such as validating the BLOB validator processing path 2708-1, a local storage handler processing path 2708-2, and a payload deployment handler processing path 2708-3. FIG. 27F shows the BLOB validator 2708-1 processing path. If the BLOB validator 2708-1 is successful, then processing proceeds to processing the BLOB at 2708-4 using a BLOB template handler. After processing the BLOB, the metadata sequencer is loaded at 2708-5 and proceeds to the sequencer at 2708-6. If the BLOB validator 2708-1 is not successful, then the processing proceeds to quarantine processor path 2706.

FIG. 2G shows the local storage handler processing path 2708-2 which may follow several processing paths such as factory reset processing path 2708-7 and device/partition locator/validator processing path 2708-12. The factory reset processing path 2708-7 includes securely wiping the NVRAM at 2708-8 and re-initializing factory NVRAM content 2708-9, erasing all drives at 2708-10, and rebooting the system at 2708-11. The device/partition locator/validator processing path 2708-12 may follow several processing paths such as securely wiping storage target 2708-13, encrypting disk or partition processing path 2708-15, and partitioning target disk processing path 2708-17. The securely wiping storage target processing path 2708-13 includes returning to system update handler 2708-14. The encrypting disk or partition processing path 2708-15 includes a return to system update handler 2708-16. The partitioning target disk processing path 2708-17 includes preparing target partitions 2708-18 and returning to system update handler 2708-19.

Figure 27H:
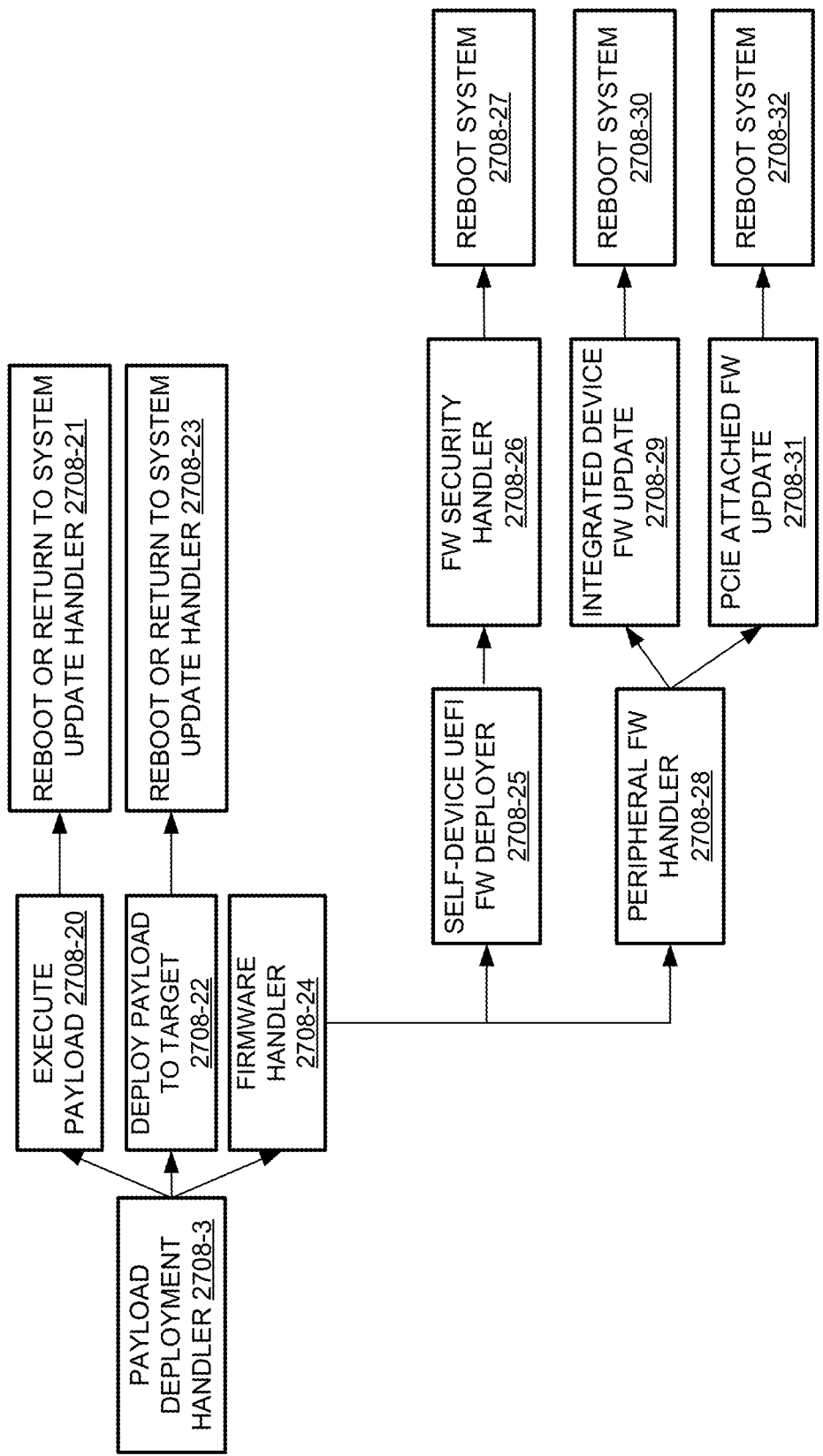

FIG. 27H shows the payload deployment handler processing path 2708-3, which may follow several processing paths such as an executing payload processing path 2708-20, a deploying payload to target processing path 2708-22, and firmware handler processing path 2708-24. The executing payload processing path 2708-20 includes rebooting to returning to system update handler 2708-21. The deploying payload to target 2708-22 includes rebooting or returning to system update handler 2708-23. The firmware handler processing path 2708-24 may follow several processing paths such as self-device UEFI firmware deployment processing path 2708-25 and peripheral firmware handler processing path 2708-28. The self-device UEFI firmware deployment processing path 2708-25 includes firmware security handling 2708-26 and rebooting the system 2708-27. The peripheral firmware handler 2708-28 may follow several processing paths such as an integrated device firmware update processing path 2708-29 and PCIe attached firmware update processing path 2708-31 which includes rebooting the system 2708-32. The integrated device firmware update processing path 2708-29 may include rebooting the system 2708-30.

Figure 28A:
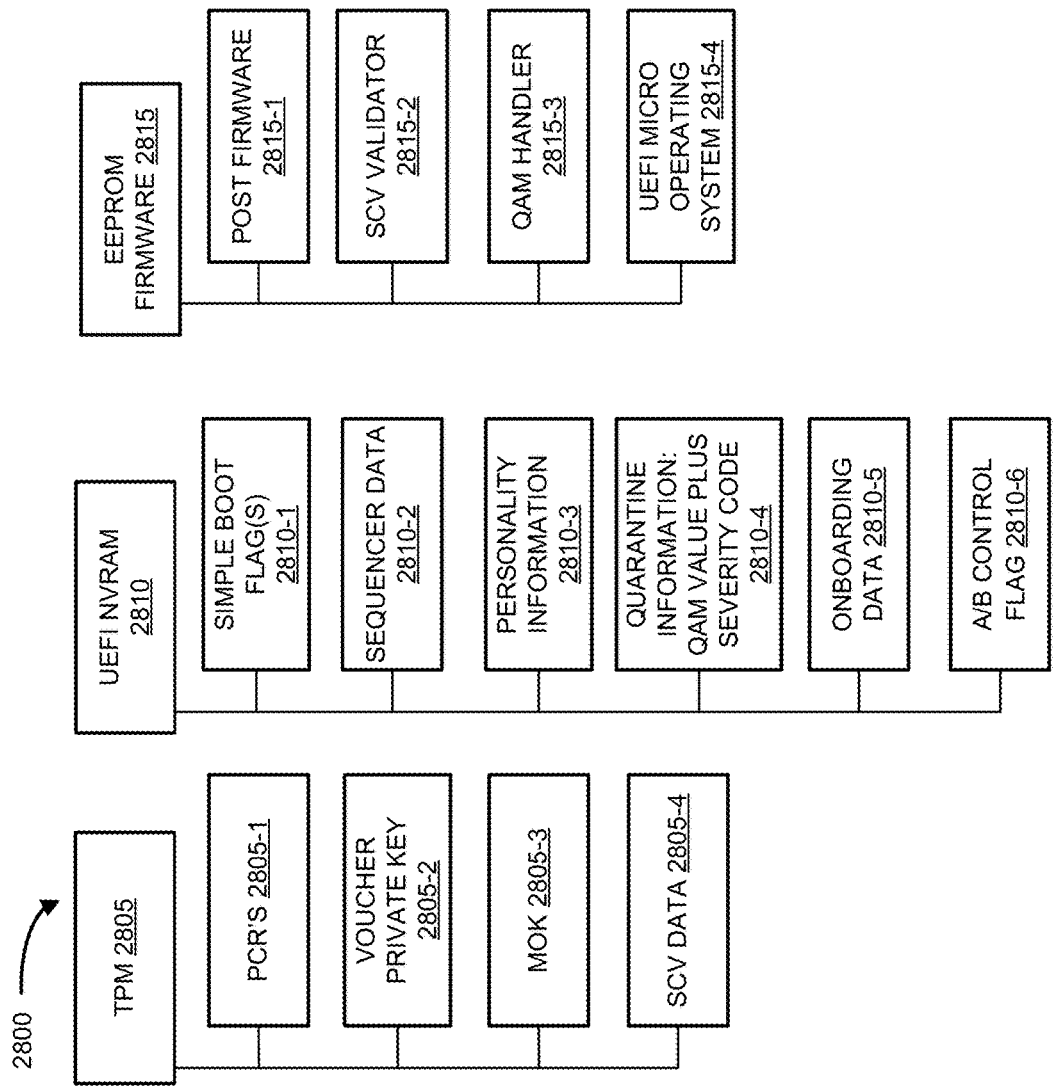
FIGS. 28A and 28B show examples of storage locations where various information to be utilized for automated persistent context-aware device provisioning during MPSZTP may be stored in illustrative embodiments.
Figure 28B:
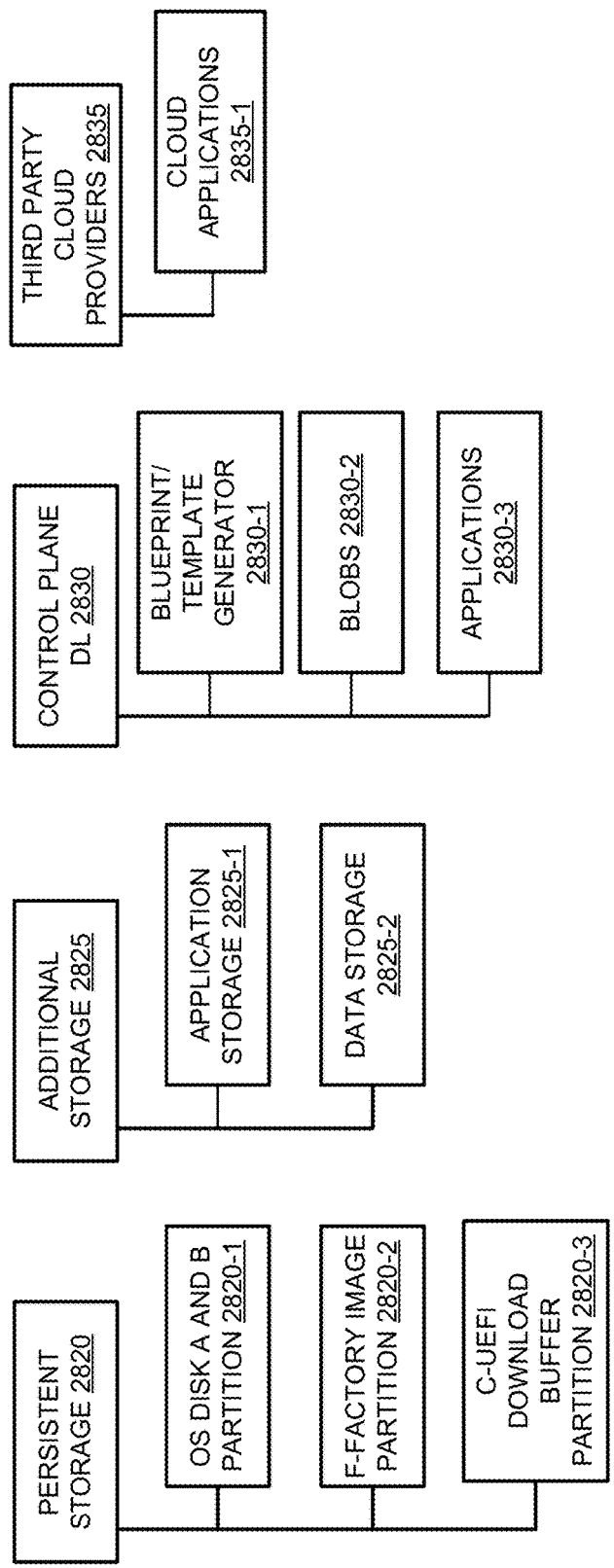

FIGS. 28A and 28B show examples of storage locations (for example, persistent storage locations) where various information to be utilized for automated persistent context-aware device provisioning during MPSZTP may be stored. Such storage locations include the TPM 2805, UEFI NVRAM 2810, Electronically Erasable Programmable Read-Only Memory (EEPROM) 2815, persistent storage 2820, and additional storage 2825, control plane DL 2830, and third-party cloud providers 2835. The TPM 2805 may store PCRs 2805-1, a voucher private key 2805-2, MOK 2805-3, and SCV data 2805-4. The UEFI NVRAM 2810 may store the SBF 2810-1, sequencer data 2810-2, personality information 2810-3, quarantine information which may include QAM value and severity code 2810-4, onboarding data 2810-5 (for example, FDO onboarding data), and A/B control flags 2810-6 (for example, for A and B OSes). The EEPROM 2815 may store all firmware, including firmware for POST 2815-1, SCV validator 2815-2, QAM handler 2815-3, and the UEFI micro OS 2815-4 (for example, a firmware-based agent). The persistent storage 2820 may store a secured OS in "A" and "B" disk partitions 2820-1, a factory image partition 2820-2, and a "C" UEFI download buffer partition 2820-3. The additional storage 2825 may store application storage 2825-1 and data storage 2825-2. The control plane DL 2830 may store blueprint/template generator 2830-1, BLOBS 2830-2, and applications 2380-3. The third-party cloud providers 2835 may store cloud applications 2835-1.

The persistent context-aware provisioning may be used in various scenarios: 1) deployment of alternative runtime software on a single-purpose device, 2) semi-persistent deployment of temporary software, and 3) upon moving or registration in a high-security operating environment. In one example of the first scenario, a store may have a specific software application for its store, products, or services. Assuming that the store does not have a clustered backend, if the software application or the server hosting the software application goes down, a system administrator may need hours to fix the issue and get the server re-provisioned along with one or more drivers to connect to various devices and restore its services. In other to get the store operational as quickly as possible, another server may be temporarily re-provisioned with the said software application in a persistent manner using an on-site control plane remotely.

In one example of the second scenario, a contractor with a mobile device may move between work locations. Here, eSim™ profiles specific to each of his work locations may be deployed in the user's device, wherein the eSim profiles may be used for 5G© broadband connectivity. Upon arrival to onsite to one work location, the device may automatically connect to a physical network via Ethernet and be verified to have been authorized and/or registered with the control panel. Subsequently, the mobile device may receive a context-aware firmware update for the mobile device and a modem is initiated. In another example, the worker may require temporary access to a specific software application. In this example, the worker may be a security contractor that will audit security measures in various locations. As such, the worker may be associated with a security profile that may be used to provision the mobile device with a software application to a particular configuration. Such configuration allows said worker with access to a particular on-site data which gets deleted when the software application detects that the device is outside the location and cannot be reached by the control plane.

In one example of the third scenario, the worker goes to a restricted location where strict security policies may be enforced. The worker powers on the mobile device and during the boot process, the control panel may determine whether the mobile device is authorized and/or registered with the control panel. Subsequent to determining that the mobile device is unauthorized and/or unregistered, the worker may be instructed to power off the device within a grace period or the device may be factory reset followed by installation of a secured and logically isolated workspace. If the worker does not power off the device within the grace period, the contents of the workspace may be erased and overwritten.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for multi-phase secure zero-touch provisioning of computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, provisioning processes, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

Although the figures show example blocks of the methods in some implementations, the methods may include additional blocks, fewer blocks, different blocks, or differently arranged blocks than those depicted in the figures. Those skilled in the art will understand that the principles presented herein may be implemented in any suitably arranged processing system. Additionally, or alternatively, two or more of the blocks of the methods may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
a processor; and
a memory device storing firmware code that when executed causes the processor to perform operations, the operations including:
determining a personality flag value during a boot process of the information handling system;
executing, responsive to detecting that the information handling system entered a secure environment and based on the personality flag value, a system update handler configured for discovering and connecting to a control plane;
provisioning by the system update handler a software application in a current operating system environment of the information handling system, wherein the provisioning of the software application includes, subsequent to determining that the information handling system is registered with the control plane, receiving the software application responsive to a secure profile and validating the software application prior to loading;

rebooting the information handling system subsequent to deregistering the information handling system from the control plane; and de-provisioning the information handling system when the information handling system is deregistered from the control plane.

2. The information handling system of claim 1, wherein the information handling system is recognized as compliant with requirements of the secure environment.

3. The information handling system of claim 2, wherein the operations further include providing the control plane with identifying and configuration information.

4. The information handling system of claim 1, wherein the information handling system retains its provisioned state across reboots until the information handling system is deregistered from the control plane.

5. The information handling system of claim 1, wherein the de-provisioning the information handling system includes removal of the software application.

6. The information handling system of claim 1, wherein the operations further include rebooting the information handling system to operating system in an internal storage of the information handling system when the information handling system is deregistered from the control plane.

7. The information handling system of claim 1, wherein the information handling system is enabled as a context-aware device.

8. A method comprising:
determining, by a firmware-based agent of a processor, a personality flag value during a boot process of an information handling system;

executing, responsive to detecting that the information handling system entered a secure environment and based on the personality flag value, a system update handler of the firmware-based agent configured for discovering and connecting to a control plane;

provisioning by the system update handler a secure persistent operating system, wherein the provisioning of the secure persistent operating system includes receiving an image of the secure persistent operating system from the control plane responsive to a secure profile and validating the image prior to loading the secure persistent operating system to a workspace of the information handling system; and triggering a removal of the workspace from the information handling system in response to rebooting the information handling system in another environment, wherein the information handling system returning to its previous known configuration state subsequent to the rebooting.

9. The method of claim 8, wherein the provisioning of the secure persistent operating system includes determining and securely erasing a download area for the secure persistent operating system.

10. The method of claim 8, further comprising the control plane applying a policy-driven secure profile to the information handling system, responsive to the information handling system being registered with the control plane.

11. A non-transitory computer-readable media storing instructions that are executable to perform operations comprising:

determining a personality flag value during a boot process of an information handling system;

executing, responsive to detecting that the information handling system entered a restricted environment and based on the personality flag value, a system update handler of a firmware-based agent configured for connecting to a control plane;

provisioning a secure persistent operating system on the information handling system, in response to not powering the information handling system within a grace period subsequent to a notification from the control plane, wherein the information handling system is unregistered with the control plane;

de-provisioning the information handling system when the information handling system is deregistered from the control plane;

performing a factory reset on the information handling system; and subsequent to the factory reset, rebooting and registering the information handling system with the control plane and applying a policy-driven secure profile to the information handling system.

12. The non-transitory computer-readable media of claim 11, wherein the provisioning of the secure persistent operating system includes erasing contents of an internal storage of the information handling system.

13. The non-transitory computer-readable media of claim 11, the operations further comprising discovering the control plane.

14. The non-transitory computer-readable media of claim 11, further comprising logically isolating a hardware resource of the information handling system.

15. The non-transitory computer-readable media of claim 11, wherein the control plane has privileged access to the information handling system.

16. The non-transitory computer-readable media of claim 11, further comprising, securely removing a software application provisioned on the information handling system prior to the rebooting of the information handling system.

17. The non-transitory computer-readable media of claim 16, further comprising subsequent to the securely removing a software application, returning the information handling system to a last known configuration.

* * * * *